(12) United States Patent
Alkatout et al.

(10) Patent No.: US 7,875,697 B2
(45) Date of Patent: Jan. 25, 2011

(54) POLY(ORTHOESTER) POLYMERS, AND METHODS OF MAKING AND USING SAME

(75) Inventors: Julie A. Alkatout, Minneapolis, MN (US); Michael Eric Benz, Ramsey, MN (US); Randall V. Sparer, Andover, MN (US)

(73) Assignee: Medtronic, Inc., Minneapolis, MN (US)

( * ) Notice: Subject to any disclaimer, the term of this patent is extended or adjusted under 35 U.S.C. 154(b) by 43 days.

(21) Appl. No.: 11/824,504

(22) Filed: Jun. 29, 2007

(65) Prior Publication Data

US 2008/0033140 A1 Feb. 7, 2008

Related U.S. Application Data

(60) Provisional application No. 60/817,560, filed on Jun. 29, 2006.

(51) Int. Cl.
C08G 67/02 (2006.01)
C08G 59/00 (2006.01)
C08G 65/00 (2006.01)
A61K 9/14 (2006.01)

(52) U.S. Cl. .................. 528/392; 528/406; 424/489

(58) Field of Classification Search .............. 528/392, 528/406
See application file for complete search history.

(56) References Cited

U.S. PATENT DOCUMENTS

| | | | |
|---|---|---|---|
| 2,957,856 A * | 10/1960 | Guest et al. ............ | 528/244 |
| 4,079,038 A | 3/1978 | Choi et al. | |
| 4,093,709 A | 6/1978 | Choi et al. | |
| 4,131,648 A | 12/1978 | Choi et al. | |
| 4,136,252 A * | 1/1979 | Capozza ............. | 528/403 |
| 4,138,344 A | 2/1979 | Choi et al. | |
| 4,180,646 A | 12/1979 | Choi et al. | |
| 4,304,767 A | 12/1981 | Heller et al. | |
| 4,489,056 A | 12/1984 | Himmelstein et al. | |
| 4,513,143 A | 4/1985 | Ng et al. | |
| 4,532,335 A | 7/1985 | Helwing | |
| 4,549,010 A | 10/1985 | Sparer et al. | |
| 4,638,045 A | 1/1987 | Kohn et al. | |
| 4,639,366 A | 1/1987 | Heller | |
| 4,735,804 A | 4/1988 | Caldwell et al. | |
| 4,758,436 A | 7/1988 | Caldwell et al. | |
| 4,764,364 A | 8/1988 | Heller et al. | |
| 4,765,973 A | 8/1988 | Heller | |
| 4,767,627 A | 8/1988 | Caldwell et al. | |
| 4,780,319 A | 10/1988 | Zentner et al. | |
| 4,855,132 A | 8/1989 | Heller et al. | |
| 4,898,928 A | 2/1990 | Heller et al. | |
| 4,946,931 A | 8/1990 | Heller et al. | |
| 4,957,998 A | 9/1990 | Heller et al. | |
| 5,013,821 A | 5/1991 | Heller et al. | |
| 5,030,457 A | 7/1991 | Ng et al. | |
| 5,108,755 A | 4/1992 | Daniels et al. | |
| 5,211,951 A | 5/1993 | Sparer et al. | |
| 5,254,345 A * | 10/1993 | Pogany et al. ............ | 424/426 |
| 5,336,505 A | 8/1994 | Ng et al. | |
| 5,374,681 A * | 12/1994 | Kroner et al. ............ | 525/79 |
| 5,461,140 A | 10/1995 | Heller et al. | |
| 5,587,507 A | 12/1996 | Kohn et al. | |
| 5,618,563 A | 4/1997 | Berde et al. | |
| 5,700,485 A | 12/1997 | Berde et al. | |
| 5,747,058 A | 5/1998 | Tipton et al. | |
| 5,747,060 A | 5/1998 | Sackler et al. | |
| 5,824,343 A | 10/1998 | Ng et al. | |
| 5,837,228 A | 11/1998 | Shih et al. | |
| 5,919,473 A | 7/1999 | Elkhoury | |
| 5,939,453 A | 8/1999 | Heller et al. | |
| 5,942,241 A | 8/1999 | Chasin et al. | |
| 5,968,542 A | 10/1999 | Tipton | |
| 5,968,543 A | 10/1999 | Heller et al. | |
| 6,096,344 A | 8/2000 | Liu et al. | |
| 6,120,491 A | 9/2000 | Kohn et al. | |
| 6,133,402 A | 10/2000 | Coates et al. | |
| 6,214,387 B1 | 4/2001 | Berde et al. | |
| 6,238,702 B1 | 5/2001 | Berde et al. | |
| 6,248,345 B1 | 6/2001 | Goldenheim et al. | |
| 6,413,536 B1 | 7/2002 | Gibson et al. | |
| 6,514,516 B1 | 2/2003 | Chasin et al. | |
| 6,524,606 B1 | 2/2003 | Ng et al. | |
| 6,524,607 B1 | 2/2003 | Goldenheim et al. | |

(Continued)

FOREIGN PATENT DOCUMENTS

EP 0 168 277 B1 8/1990

(Continued)

OTHER PUBLICATIONS

Anderson et al., "General Acid Catalysis of Ortho Ester Hydrolysis," *J. Org. Chem.*, Jun. 16, 1972; 37(12):1993-1996.
Barr et al., "Post surgical pain management with poly(ortho esters)," *Adv. Drug Deliv. Rev.*, Oct. 16, 2002; 54(7):1041-1048.
Chiang et al., "Effect of Phenyl Substitution on Ortho Ester Hydrolysis," *J.A.C.S.*, Jul. 10, 1974; 96(14):4494-4499.
Crivello et al., "Ketene Acetal Monomers: Synthesis and Characterization," *J. Polymer Sci. Part A: Polymer Chem.*, Nov. 15, 1996; 34(15):3091-3102.
Heller et al., "The Effect of Copolymerized 9,10-Dihydroxystearic acid on Erosion Rates of Poly(ortho esters) and Its Use in the Delivery of Levonorgestrel," *J. Controlled Release*, Sep. 1987; 5(2):173-177.

(Continued)

*Primary Examiner*—Mark Eashoo
*Assistant Examiner*—Liam J Heincer
(74) *Attorney, Agent, or Firm*—Mueting, Raasch & Gebhardt, P.A.

(57) ABSTRACT

Poly(orthoester) polymers, and methods of making and using such poly(orthoester) polymers are provided. The poly (orthoester) polymers can be useful for applications including, for example, medical devices and pharmaceutical compositions. In a preferred embodiment, the poly(orthoester) polymers are biodegradable.

26 Claims, 24 Drawing Sheets

U.S. PATENT DOCUMENTS

| | | | |
|---|---|---|---|
| 6,534,081 | B2 | 3/2003 | Goldenheim et al. |
| 6,602,975 | B2 | 8/2003 | Hubbell et al. |
| 6,613,355 | B2 | 9/2003 | Ng et al. |
| 6,667,371 | B2 | 12/2003 | Ng et al. |
| 6,699,908 | B2 | 3/2004 | Sackler et al. |
| 6,790,458 | B2 | 9/2004 | Ng et al. |
| 6,793,938 | B2 | 9/2004 | Sankaram |
| 6,822,000 | B2 | 11/2004 | Ng et al. |
| 6,861,068 | B2 | 3/2005 | Ng et al. |
| 6,863,782 | B2 | 3/2005 | Newsome et al. |
| 6,921,541 | B2 | 7/2005 | Chasin et al. |
| 6,933,328 | B2 | 8/2005 | Schacht |
| 6,946,145 | B2 | 9/2005 | Ng et al. |
| 7,045,589 | B2 * | 5/2006 | Heller et al. ........... 528/403 |
| 7,163,694 | B2 * | 1/2007 | Heller et al. ........... 424/468 |
| 7,288,609 | B1 * | 10/2007 | Pacetti ........... 525/539 |
| 7,319,132 | B2 * | 1/2008 | Musa ........... 528/392 |
| 2002/0037300 | A1 | 3/2002 | Ng et al. |
| 2002/0114835 | A1 | 8/2002 | Sackler et al. |
| 2002/0176844 | A1 | 11/2002 | Ng et al. |
| 2003/0138474 | A1 | 7/2003 | Ng et al. |
| 2003/0152630 | A1 | 8/2003 | Ng et al. |
| 2003/0185873 | A1 | 10/2003 | Chasin et al. |
| 2003/0212148 | A1 | 11/2003 | Ng et al. |
| 2004/0001872 | A1 | 1/2004 | Shih et al. |
| 2004/0033251 | A1 | 2/2004 | Sparer et al. |
| 2004/0039437 | A1 | 2/2004 | Sparer et al. |
| 2004/0047911 | A1 | 3/2004 | Lyu et al. |
| 2004/0086569 | A1 | 5/2004 | Sparer et al. |
| 2004/0096506 | A1 | 5/2004 | Heller et al. |
| 2004/0101557 | A1 | 5/2004 | Gibson et al. |
| 2004/0109893 | A1 | 6/2004 | Chen et al. |
| 2004/0115273 | A1 | 6/2004 | Sparer et al. |
| 2004/0127978 | A1 | 7/2004 | Sparer et al. |
| 2004/0146550 | A1 * | 7/2004 | Ng et al. ........... 424/450 |
| 2004/0156907 | A1 | 8/2004 | Ng et al. |
| 2005/0025834 | A1 * | 2/2005 | Guo et al. ........... 424/486 |
| 2005/0042194 | A1 | 2/2005 | Ng et al. |
| 2005/0064005 | A1 | 3/2005 | Dinh et al. |
| 2005/0064038 | A1 | 3/2005 | Dinh et al. |
| 2006/0235083 | A1 * | 10/2006 | Heller ........... 514/772.1 |
| 2007/0265355 | A1 * | 11/2007 | Benz et al. ........... 514/772.3 |
| 2008/0286326 | A1 * | 11/2008 | Benco ........... 424/423 |

FOREIGN PATENT DOCUMENTS

| | | | |
|---|---|---|---|
| EP | 0 208 617 | B1 | 9/1990 |
| EP | 0 202 159 | B1 | 7/1991 |
| EP | 0 168 277 | B2 | 12/1992 |
| EP | 0 524 831 | A1 | 1/1993 |
| EP | 0 473 223 | B1 | 5/1995 |
| EP | 1 142 596 | A1 | 10/2001 |
| EP | 1225172 | A1 * | 7/2002 |
| WO | WO 90/12605 | A1 | 11/1990 |
| WO | WO 97/25366 | A1 | 7/1997 |
| WO | WO 01/85139 | A2 | 11/2001 |
| WO | WO 01/85139 | A3 | 4/2002 |
| WO | WO 02/38185 | A2 | 5/2002 |
| WO | WO 02/092661 | A1 | 11/2002 |
| WO | WO 02/38185 | A3 | 1/2003 |
| WO | WO 2005/009408 | A2 | 2/2005 |
| WO | WO 2005/009408 | A3 | 1/2006 |

OTHER PUBLICATIONS

Heller et al., "Development of poly(ortho esters) and their application for bovine serum albumin and bupivacaine delivery," *J. Controlled Release*, Jan. 17, 2002; 78(1-3):133-141.

Heller et al., "Injectable Semi-Solid Poly (Ortho Esters) for the Controlled Delivery of Therapeutic Agents: Synthesis and Applications," *Drug Deliv. Tech.*, Jan.-Feb. 2002; 2(1); 6 pgs.

Heller et al., "Poly(ortho esters): synthesis, characterization, properties and uses," *Adv. Drug Deliv. Rev.*, Oct. 16, 2002; 54(7):1015-1039.

Heller et al., "Poly(ortho esters)—From Concept to Reality," a paper presented at the ICMAT 2003 Conference, (International Conference on Materials for Advanced Technologies), Singapore, Jun. 29-Jul. 4, 2003. *Biomacromolecules*, 2004; 5(5):1625-1632. Published online Aug. 17, 2004.

Heller, "Ocular Delivery using poly(ortho esters)," *Adv. Drug Deliv. Rev.*, Dec. 13, 2005; 57(14):2053-2062. Published online Nov. 8, 2005.

Hemmerich, "Polymer Materials Selection for Radiation-Sterilized Products," *Medical Device and Diagnostic Industry Magazine*, Feb. 22, 2000.;(Part 2):78-89. [Retrieved online Sep. 17, 2007]. Retrieved from the Internet: <URL:http://www.devicelink.com/mddi/archive/00/02/006.html>; 5 pgs.

Kohn et al., "Bioresorbable and Bioerodible Materials," *Biomaterials Science: An Introduction to Materials in Medicine*, San Diego, CA, 1996; title page, copyright page, and pp. 64-72.

Lyu et al., "Analytical Solutions to Mathematical Models of the Surface and Bulk Erosion of Solid Polymers," *J Polymer Sci., Part B: Polymer Physics*, Feb. 15, 2005; 43(4):383-397.

Merkli et al., "Purity and stability assessment of a semi-solid poly(ortho ester) used in drug delivery systems," *Biomaterials*, May 1996; 17(9):897-902.

Moore et al., "Mechanism of the alternating copolymerization of epoxides and CO2 using beta-diiminate zinc catalysts: evidence for a bimetallic epoxide enchainment," *J.A.C.S.*, Oct. 1, 2003; 125(39):11911-11924.

Ng et al., "Poly (Ortho Esters) by the Addition of Diols to a Diketene Acetal" *Macromolecular Syntheses*, vol. 11, MRG Polymer Press (Tirrell et al., eds.), Hattiesburg, MS, 1992; pp. 23-26.

Ng et al., "Synthesis and Erosion Studies of Self-Catalyzed Poly(ortho ester)s," *Macromolecules*, Feb. 24, 1997; 30(4):770-772.

Ng et al., "Development of a poly(ortho ester) prototype with a latent acid in the polymer backbone for 5-fluorouracil delivery," *J. Controlled Release*, Apr. 3, 2000; 65(3):367-374.

Nguyen et al., "Hydrolysis of Some Poly(ortho-ester)s in Homogeneous Solutions," *J. Pharm. Sci.*, Nov. 1984; 73(11):1563-1568.

Nguyen et al., "Some equilibrium and kinetic aspects of water sorption in poly(ortho esters)s," *Int'l J. Pharms.*, Jun. 1985; 25(1):1-12.

Pogény et al., "Gas Chromatographic Assay for 3,9-diethylidene-2,4,8,10-tetraoxaspiro[5.5]undecane," *J. Chromatography A*, 1990; 508:179-186.

Schwach-Abdellaoui et al., "Hydrolysis and Erosion Studies of Autocatalyzed Poly(ortho esters) Containing Lactoyl-Lactyl Acid Dimers," *Macromolecules*, 1999; 32(2):301-307. Published online Jan. 5, 1999.

Schwach-Abdellaoui et al., "Synthesis and characterization of self-catalyzed poly(ortho esters) based on decanediol and decanediol-lactate," *J. Biomater. Sci. Polymer Edn.*, 1999; 10(3):375-389.

Schwach-Abdellaoui et al., "Control of Molecular Weight for Auto-Catalyzed Poly(ortho ester) Obtained by Polycondensation Reaction," *Int'l J. Polymer Anal. Charact.*, Jan. 2002; 7(1-2):145-161.

Shakesheff et al., "Release of Protein from a Poly(ortho ester) Film during Surface Erosion Studied by in Situ Atomic Force Microscopy," *Langmuir*, Jul. 1995; 11(7):2547-2553.

Shih, "A Graphical Method for the Determination of the Mode of Hydrolysis of Biodegradable Polymers," *Pharm. Research*, Dec. 1995; 12(12):2036-2040.

Shih, "Calculation of Hydrolytic Rate Constants of Poly(ortho ester)s from Molecular Weights Determined by Gel Permeation Chromatography," *Pharm. Research*, Dec. 1995; 12(12):2041-2048.

Sintzel et al., "Synthesis and characterization of self-catalyzed poly(ortho ester)," *Biomaterials*, Apr.-May 1998; 19(7-9):791-800.

Yang et al., "POE-PEG-POE triblock copolymeric microspheres containing protein. I. Preparation and characterization," *J. Controlled Release*, Jul. 10, 2001; 75(1-2):115-128.

Zignani et al., "New generation of poly(ortho esters): synthesis, characterization, kinetics, sterilization and biocompatibility," *J. Controlled Release*, Oct. 13, 1997; 48(2):115-129.

\* cited by examiner

MW Decrease between start and end of hydrolysis study-
effect of diethyl tartrate MW Decrease between start and end of hydrolysis study- effect
of TEG Kinetic Constants--- Copolymers of tchdm, DET, and TEG Cumulative Release (%) of Dexamethasone from POE Thin Films at 5wt% Drug in PBS pH 7.4 at 37C Average % mass loss rate vs. % DET Lag Time to Mass Loss Fig. 17   1/Mn (Chain Ends) versus Time for POEs of varying DET Composition Average Hydrolysis Rate and Std Dev versus % DET Hydrolysis Rate vs. MW for same POE compostions

Relationship between lag time and % diethyl tartrate (balance tchdm)

$y = -5.9286x + 31.524$
$R^2 = 0.9988$

POE-DOE 5% DXAC from Rods

PDP Peak intensity vs. time for POE with 30% CHD

Kinetics rate vs. % 1,4-cycloHD for a 25mg POE sample dissolved in 0.75ml of d-THF

Fig. 34

Percent Orthoester Bond remaining vs. Time for Various POE Compositions
30% Test Diol, Balance tCHDM

POLY(ORTHOESTER) POLYMERS, AND METHODS OF MAKING AND USING SAME

This application claims the benefit of U.S. Provisional Application No. 60/817,560, filed 29 Jun. 2006, which is hereby incorporated by reference in its entirety.

BACKGROUND

Biodegradable polymers have found uses in a wide variety of applications ranging from trash bags that decompose in landfills to implantable medical devices that biodegrade in the body. Most of these applications require that such polymers have adequate physical properties and stability to provide for suitable handling and utility prior to being subjected to end use conditions that promote biodegradation. Further, it is often preferable that these same polymers rapidly or controllably biodegrade once subjected to such end use conditions. In addition, it is often desired that biodegradable polymers used for implantable medical devices be converted under physiological conditions to materials that do not irritate or harm the surrounding tissue. Many biodegradable polymers known in the art lack the combination of physical and/or chemical properties desired to meet the needs for specific applications.

Current and new applications for biodegradable polymers continue to create a need for new polymers that provide some or all of the above-described properties.

SUMMARY

Poly(orthoester) polymers, and methods of making and using poly(orthoester) polymers are disclosed herein. Poly(orthoester) polymers as disclosed herein, and compositions including such poly(orthoester) polymers, can be useful for applications including, for example, medical devices and pharmaceutical compositions. In a preferred embodiment, the poly(orthoester) polymers disclosed herein are biodegradable.

The presently disclosed poly(orthoester) polymers can preferably offer advantages over poly(orthoester) polymers known in the art. For example, the presently disclosed poly(orthoester) polymers can hydrolyze at a sufficient rate to be useful for applications that require biodegradable properties, without the necessity of admixing and/or incorporating, for example, basic or acidic components (e.g., lactides and/or glycolides) to enhance the hydrolysis rate.

In one aspect, the present disclosure provides a polymer including two or more repeat units selected from the group consisting of: a repeat unit of the formula (Formula VI):

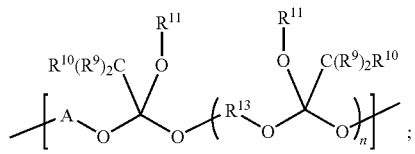

a repeat unit of the formula (Formula VII):

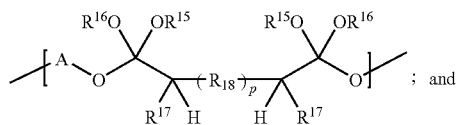

combinations thereof; wherein: each $R^9$, $R^{10}$, and $R^{17}$ independently represents hydrogen or an organic group; each $R^{11}$, $R^{13}$, $R^{15}$, and $R^{16}$ independently represents an organic group; $R^{18}$ represents oxygen or an organic group and p=0 or 1; n=0 or 1; each $R^{11}$ can optionally be joined with $R^{13}$ to form one or more rings; geminal $R^{15}$ and $R^{16}$ groups can optionally be joined to each other to form rings; each A is selected from the group consisting of —C($R^1$)($R^2$)—(C($R^5$)$_2$)$_r$—C($R^3$)($R^4$)—, —$Ar^{het}$—, —$Ar^1$C($R^6$)($R^7$)—, a group of the formula (Formula III) —$Ar^2$—C($R^8$)$_2$—$Ar^2$—(B)$_m$—, and combinations thereof; each $R^1$, $R^2$, $R^3$, $R^4$, and $R^5$ independently represents hydrogen or an organic group, r is 0 to 20 (preferably 0 to 15 and more preferably 0 to 10), and one or more of $R^1$, $R^2$, $R^3$, $R^4$, and $R^5$ can optionally be joined with one another to form one or more rings, with the proviso that at least one of $R^1$, $R^2$, $R^3$, and $R^4$ is selected from the group consisting of an ester-containing group, an amide-containing group, a nitrile-containing group, an ether-containing group, and combinations thereof; $Ar^{het}$ represents a 1,2-heteroarylene group; $Ar^1$ represents a 1,2- or a 1,3-arylene group, or a 1,2- or a 1,3-heteroarylene group, $R^6$ and $R^7$ independently represent hydrogen or an organic group, and $R^6$ and/or $R^7$ can optionally be joined with each other or with the $Ar^1$ group to form one or more rings; and each $Ar^2$ independently represents an arylene group, each $R^8$ independently represents an organic group, B represents an aromatic-containing organic group having a linking oxygen attached to the aromatic ring, and m=0 or 1, with the proviso that HO—$Ar^2$—C($R^8$)$_2$—$Ar^2$—(B)$_m$—OH does not represent bisphenol-A.

In another aspect, the present disclosure provides a method of preparing a polymer. In one embodiment, the method includes: combining components including: at least one hydroxy-containing compound of the formula (Formula I) HO-A-OH; and at least one orthoester of the formula (Formula II)

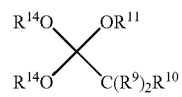

under conditions effective to polymerize at least a portion of the orthoester; and removing byproducts including $R^{14}$OH; wherein each $R^9$ and $R^{10}$ independently represents hydrogen or an organic group; each $R^{11}$ and $R^{14}$ independently represents an organic group; each A is selected from the group consisting of —C($R^1$)($R^2$)—(C($R^5$)$_2$)$_r$—C($R^3$)($R^4$)—, —$Ar^{het}$—, —$Ar^1$C($R^6$)($R^7$)—, a group of the formula (Formula III) —$Ar^2$—C($R^8$)$_2$—$Ar^2$—(B)$_m$—, and combinations thereof; each $R^1$, $R^2$, $R^3$, $R^4$, and $R^5$ independently represents hydrogen or an organic group, r is 0 to 20 (preferably 0 to 15 and more preferably 0 to 10), and one or more of $R^1$, $R^2$, $R^3$, $R^4$, and $R^5$ can optionally be joined with one another to form one or more rings, with the proviso that at least one of $R^1$, $R^2$, $R^3$, and $R^4$ is selected from the group consisting of an ester-containing group, an amide-containing group, a nitrile-containing group, an ether-containing group, and combinations thereof; $Ar^{het}$ represents a 1,2-heteroarylene group; $Ar^1$ represents a 1,2- or a 1,3-arylene group, or a 1,2- or a 1,3-heteroarylene group, $R^6$ and $R^7$ independently represent hydrogen or an organic group, and $R^6$ and/or $R^7$ can optionally be joined with each other or with the $Ar^1$ group to form one or more rings; and each $Ar^2$ independently represents an arylene group, each $R^8$ independently represents an organic group, B represents an aromatic-containing organic group having a linking oxygen attached to the aromatic ring, and m=0 or 1, with the proviso that HO—$Ar^2$—C($R^8$)$_2$—$Ar^2$—(B)$_m$—OH does not represent bisphenol-A.

In another aspect, the present disclosure provides another method of preparing a polymer. In one embodiment, the method includes combining components including at least one hydroxy-containing compound of the formula (Formula I) HO-A-OH and at least one ketene acetal under conditions effective to polymerize at least a portion of the at least one ketene acetal, wherein the at least one ketene acetal is selected from the group consisting of: a compound of the formula (Formula IV)

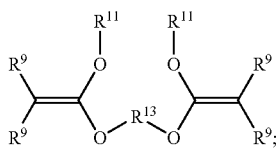

a compound of the formula (Formula V)

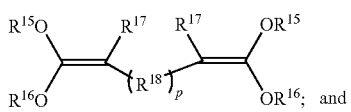

combinations thereof; wherein: each $R^9$ and $R^{17}$ independently represents hydrogen or an organic group; each $R^{11}$, $R^{13}$, $R^{15}$, and $R^{16}$ independently represents an organic group; $R^{18}$ represents oxygen or an organic group and p=0 or 1; each $R^{11}$ can optionally be joined with $R^{13}$ to form one or more rings; geminal $R^{15}$ and $R^{16}$ groups can optionally be joined to each other to form rings; each A is selected from the group consisting of —C($R^1$)($R^2$)—(C($R^5$)$_2$)$_r$—C($R^3$)($R^4$)—, —Ar$^{het}$—, —Ar$^1$C($R^6$)($R^7$)—, a group of the formula (Formula III)—Ar$^2$—C($R^8$)$_2$—Ar$^2$—(B)$_m$—, and combinations thereof; each $R^1$, $R^2$, $R^3$, $R^4$, and $R^5$ independently represents hydrogen or an organic group, r is 0 to 20 (preferably 0 to 15 and more preferably 0 to 10), and one or more of $R^1$, $R^2$, $R^3$, $R^4$, and $R^5$ can optionally be joined with one another to form one or more rings, with the proviso that at least one of $R^1$, $R^2$, $R^3$, and $R^4$ is selected from the group consisting of an ester-containing group, an amide-containing group, a nitrile-containing group, an ether-containing group, and combinations thereof; Ar$^{het}$ represents a 1,2-heteroarylene group; Ar$^1$ represents a 1,2- or a 1,3-arylene group, or a 1,2- or a 1,3-heteroarylene group, $R^6$ and $R^7$ independently represent hydrogen or an organic group, and $R^6$ and/or $R^7$ can optionally be joined with each other or with the Ar$^1$ group to form one or more rings; and each Ar$^2$ independently represents an arylene group, each $R^8$ independently represents an organic group, B represents an aromatic-containing organic group having a linking oxygen attached to the aromatic ring, and m=0 or 1, with the proviso that HO—Ar$^2$—C($R^8$)$_2$—Ar$^2$—(B)$_m$—OH does not represent bisphenol-A.

In another aspect, the present disclosure provides a method of hydrolyzing a poly(orthoester) polymer. The method includes: providing a poly(orthoester) polymer that is substantially free of acidic groups, glycolide groups, and lactide groups; exposing the poly(orthoester) polymer to an aqueous environment; and allowing the poly(orthoester) polymer to hydrolyze. Preferably, the hydrolysis rate and/or drug release rate of the poly(orthoester) polymer is sufficiently high to allow the poly(orthoester) polymer to be used in applications requiring biodegradability and/or bioerodibility. Preferably, when the poly(orthoester) polymer is used in an application requiring biodegradability and/or bioerodibility, hydrolyzing the poly(orthoester) polymer includes forming substantially no acidic byproducts at the hydrolysis site.

In another aspect, the present disclosure provides a poly(orthoester) polymer that is substantially free of acidic groups, glycolide groups, and lactide groups. Preferably, the hydrolysis rate and/or drug release rate of the poly(orthoester) polymer is sufficiently high to allow the poly(orthoester) polymer to be used in applications requiring biodegradability and/or bioerodibility.

In another aspect, the present disclosure provides a poly(orthoester) polymer having a glass transition temperature ($T_g$) of at least 57° C. Preferably, the hydrolysis rate and/or drug release rate of the poly(orthoester) polymer is sufficiently high to allow the poly(orthoester) polymer to be used in applications requiring biodegradability and/or bioerodibility.

In another aspect, the present disclosure provides a polymer including two or more repeat units selected from the group consisting of:

a repeat unit of the formula (Formula VI):

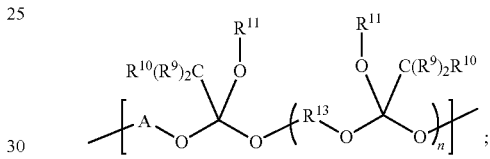

a repeat unit of the formula (Formula VII):

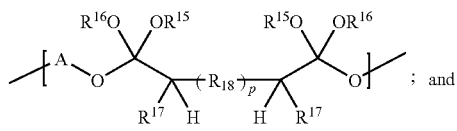

combinations thereof; wherein: each $R^9$, $R^{10}$, and $R^{17}$ independently represents hydrogen or an organic group; each $R^{11}$, $R^{13}$, $R^{15}$, and $R^{16}$ independently represents an organic group; $R^{18}$ represents oxygen or an organic group and p=0 or 1; n=0 or 1; each $R^{11}$ can optionally be joined with $R^{13}$ to form one or more rings; geminal $R^{15}$ and $R^{16}$ groups can optionally be joined to each other to form rings; each A represents the non-cyclic group —CH($R^1$)—(C($R^3$)$_2$)$_r$—CH($R^2$)—; each $R^1$ and $R^2$ independently represents an organic group; each $R^3$ independently represents hydrogen or an organic group; and r is 0 to 20.

In another aspect, a method of preparing a polymer is disclosed. The method includes: combining components including: at least one non-cyclic polyol having no primary hydroxy groups; and at least one orthoester of the formula (Formula II)

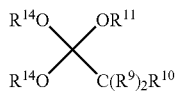

under conditions effective to polymerize at least a portion of the orthoester; and removing byproducts including $R^{14}$OH;

wherein each $R^9$ and $R^{10}$ independently represents hydrogen or an organic group; and each $R^{11}$ and $R^{14}$ independently represents an organic group.

In another aspect, a method of preparing a polymer is disclosed. The method includes combining components including at least one non-cyclic polyol having no primary hydroxy groups and at least one ketene acetal under conditions effective to polymerize at least a portion of the at least one ketene acetal, wherein the at least one ketene acetal is selected from the group consisting of: a compound of the formula (Formula IV)

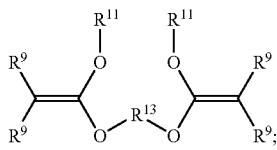

a compound of the formula (Formula V)

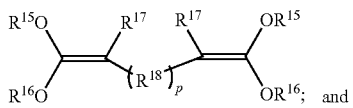

combinations thereof; wherein: each $R^9$ and $R^{17}$ independently represents hydrogen or an organic group; each $R^{11}$, $R^{13}$, $R^{15}$, and $R^{16}$ independently represents an organic group; $R^{18}$ represents oxygen or an organic group and $p=0$ or 1; each $R^{11}$ can optionally be joined with $R^{13}$ to form one or more rings; and geminal $R^{15}$ and $R^{16}$ groups can optionally be joined to each other to form rings.

The terms "comprises" and variations thereof do not have a limiting meaning where these terms appear in the description and claims.

As used herein, "a," "an," "the," "at least one," and "one or more" are used interchangeably.

Also herein, the recitations of numerical ranges by endpoints include all numbers subsumed within that range (e.g., 1 to 5 includes 1, 1.5, 2, 2.75, 3, 3.80, 4, 5, etc.).

The above summary is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIG. 23) and dexamethasone actetate (DXAC; FIG. 24) versus time from thin films of various polyorthoester polymers as described in Example 8.

FIG. 27) and dexamethasone actetate (DXAC; FIG. 29) from rods versus time for various polyorthoesters as described in Example 9.

FIG. 30) and dexamethasone actetate (DXAC; FIG. 31) from rods for various polyorthoesters as described in Example 9.

FIG. 34 is a graphical representation of the percent orthoester bonds (OE) remaining versus time for various polyorthoester polymers as described in Example 11.

DETAILED DESCRIPTION OF ILLUSTRATIVE EMBODIMENTS

Figure 1:
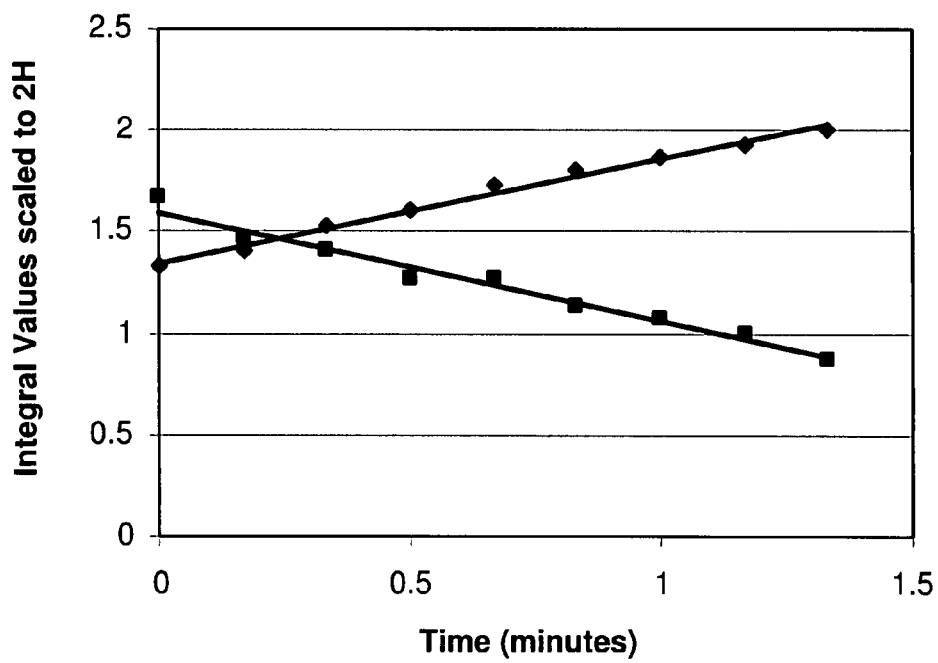
FIG. 1 is a graphical illustration of the kinetic data measured for hydrolysis of monomeric compounds of the formula (Formula VIII) as described in Example 3.

A wide variety of biodegradable and/or bioerodible polymers are known in the art. As used herein, "biodegradable" and "bioerodible" are used interchangably and are intended to broadly encompass materials including, for example, those that tend to break down upon exposure to physiological environments. Biodegradable and/or bioerodible polymers known in the art include, for example, linear aliphatic polyester homopolymers (e.g., polyglycolide, polylactide, polycaprolactone, and polyhydroxybutyrate) and copolymers (e.g., poly(glycolide-co-lactide), poly(glycolide-co-caprolactone), poly(glycolide-co-trimethylenecarbonate), poly(lactic acid-co-lysine), poly(lactide-co-urethane), poly(ester-co-amide)); polyanhydrides; and poly(orthoesters). However, many of these polymers lack the combination of physical and/or chemical properties desired for certain applications, particularly in the medical and pharmaceutical fields.

For example, polyglycolide and polylactide homo- and co-polymers are converted under physiological conditions to products including glycolic acid and lactic acid, respectively. For certain medical device applications, the formation of acidic products can limit the utility of such biodegradable polymers. Further, many of the biodegradable polymers noted above biodegrade at a slower rate than desired for specific applications.

Certain poly(orthoesters) are also known to be biodegradable polymers. As used herein, a "poly(orthoester)" refers to a homo- or co-polymer that includes two or more (i.e., a plurality) of orthoester repeat units. As used herein, an "orthoester" repeat unit is a unit including an orthoester-containing group that is repeated in the polymer at least once.

An orthoester group is a group that includes an RC(OR)$_3$ functionality (e.g., an —O—C(R)(OR)—O— or —O—C(OR)$_2$— functionality), with the proviso that R is not oxygen.

The presently disclosed poly(orthoester) polymers can preferably offer advantages over poly(orthoester) polymers known in the art. For example, the presently disclosed poly(orthoester) polymers can hydrolyze at a sufficient rate to be useful for applications that require biodegradable properties, without the necessity of admixing and/or incorporating, for example, basic or acidic components (e.g., lactides and/or glycolides) to enhance the hydrolysis rate.

Poly(orthoester) polymers and convenient methods of preparing such polymers are disclosed herein. Notably the presently disclosed poly(orthoesters) include polymers that are not converted under physiological conditions to acidic products. Further, the present disclosure provides poly(orthoester) polymers that can biodegrade at a sufficiently high rate to enable them to be considered for use in specific applications.

In one aspect, methods of preparing poly(orthoester) polymers are disclosed herein. In one embodiment, such methods include combining components including at least one hydroxy-containing compound and at least one orthoester, as further described herein below. In another embodiment, such methods include combining components including at least one hydroxy-containing compound and at least one ketene acetal, as further described herein below.

For some embodiments, suitable hydroxy-containing compounds include compounds of the formula (Formula I) HO-A-OH. A can be selected from the group consisting of —C(R$^1$)(R$^2$)—(C(R$^5$)$_2$)$_r$—C(R$^3$)(R$^4$)—, —Ar$^{het}$—, —Ar$^1$C(R$^6$)(R$^7$)—, a group of the formula (Formula III)—Ar$^2$—C(R$^8$)$_2$—Ar$^2$—(B)$_m$—, and combinations thereof. Each R$^1$, R$^2$, R$^3$, R$^4$, and R$^5$ independently represents hydrogen or an organic group, r is 0 to 20 (preferably 0 to 15 and more preferably 0 to 10), and one or more of R$^1$, R$^2$, R$^3$, R$^4$, and R$^5$ can optionally be joined with one another to form one or more rings, with the proviso that at least one of R$^1$, R$^2$, R$^3$, and R$^4$ is selected from the group consisting of an ester-containing group, an amide-containing group, a nitrile-containing group, an ether-containing group, and combinations thereof. Ar$^{het}$ represents a 1,2-heteroarylene group. Ar$^1$ represents a 1,2- or a 1,3-arylene group, or a 1,2- or a 1,3-heteroarylene group. R$^6$ and R$^7$ independently represent hydrogen or an organic group, and R$^6$ and/or R$^7$ can optionally be joined with each other or with the Ar$^1$ group to form one or more rings. Each Ar$^2$ independently represents an arylene group, each R$^8$ independently represents an organic group, B represents an aromatic-containing organic group having a linking oxygen attached to the aromatic ring, and m=0 or 1, with the proviso that HO—Ar$^2$—C(R$^8$)$_2$—Ar$^2$—(B)$_m$—OH does not represent bisphenol-A.

A wide variety of hydroxy-containing compounds of the formula (Formula I) can be used including, for example, diethyl tartrate, 2-hydroxybenzyl alcohol, 3-hydroxybenzyl alcohol, 2,3-dihydroxypyridine, 4,4'-(1-phenylethylidene)bisphenol, 4,4'-isopropylidenebis(2,6-dimethylphenol), 4,4'-(1,4-phenylenediisopropylidene)bisphenol, and combinations thereof.

As used herein, the term "organic group" is used to mean a hydrocarbon group that is classified as an aliphatic group, cyclic group, or combination of aliphatic and cyclic groups (e.g., alkaryl and aralkyl groups). In the context of the present disclosure, suitable organic groups for polymerization components and polymers disclosed herein are those that do not interfere with the polymerization reactions disclosed herein. In the context of the present disclosure, the term "aliphatic group" means a saturated or unsaturated linear or branched hydrocarbon group. This term is used to encompass alkyl, alkenyl, and alkynyl groups, for example. The term "alkyl group" means a saturated linear or branched monovalent hydrocarbon group including, for example, methyl, ethyl, n-propyl, isopropyl, tert-butyl, amyl, heptyl, and the like. The term "alkenyl group" means an unsaturated, linear or branched monovalent hydrocarbon group with one or more olefinically unsaturated groups (i.e., carbon-carbon double bonds), such as a vinyl group. The term "alkynyl group" means an unsaturated, linear or branched monovalent hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.).

As a means of simplifying the discussion and the recitation of certain terminology used throughout this application, the terms "group" and "moiety" are used to differentiate between chemical species that allow for substitution or that may be substituted and those that do not so allow for substitution or may not be so substituted. Thus, when the term "group" is used to describe a chemical substituent, the described chemical material includes the unsubstituted group and that group with nonperoxidic O, N, S, Si, or F atoms, for example, in the chain as well as carbonyl groups or other conventional substituents. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, tert-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, tert-butyl, and the like.

For some other embodiments, suitable hydroxy-containing compounds include non-cyclic polyols having no primary hydroxy groups. Such non-cyclic polyols having non primary hydroxy groups include, for example, diols having two secondary hydroxy groups.

Non-cyclic polyols having no primary hydroxy groups can be of the formula HO—CH($R^1$)—(C($R^3$)$_2$)$_r$—CH($R^2$)—OH; wherein: each $R^1$ and $R^2$ independently represents an organic group (e.g., an organic moiety such as methyl); each $R^3$ independently represents hydrogen or an organic group (e.g., an organic moiety); and r is 0 to 20. In certain preferred embodiments each $R^1$ and $R^2$ represents methyl; each $R^3$ represents hydrogen; and r is 0 to 2. Exemplary non-cyclic polyols having no primary hydroxy groups include, but are not limited to, 2,3-butanediol, 2,4-pentanediol, 2,5-hexanediol, and combinations thereof.

In one embodiment, a method of preparing a poly(orthoester) polymer includes: combining components including: at least one hydroxy-containing compound of the formula (Formula I) HO-A-OH as described herein above; and at least one orthoester of the formula (Formula II)

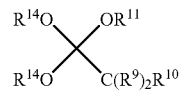

under conditions effective to polymerize at least a portion of the orthoester. The at least one hydroxy-containing compound of the formula (Formula I) HO-A-OH and the at least one orthoester of the formula (Formula II) can be combined in a ratio selected to provide, for example, oligomers, low molecular weight polymers, and/or high molecular weight polymers. For embodiments in which polymers are desired (e.g., high molecular weight polymers), the at least one hydroxy-containing compound of the formula (Formula I) HO-A-OH and the at least one orthoester of the formula (Formula II) typically are combined approximately in a 1:1 molar ratio, respectively, although ratios of from 0.9:1 to 1.1:1, respectively can be used in certain embodiments. The method further includes removing byproducts including $R^{14}OH$. Each $R^9$ and $R^{10}$ independently represents hydrogen or an organic group. Each $R^{11}$ and $R^{14}$ independently represents an organic group. The components combined can also include a polymerization agent as described herein below.

Optionally, the components can further include, for example, at least one diol different than the at least one hydroxy-containing compound of the formula (Formula I). A wide variety of diols can be used including, for example, ethyleneglycol, diethyleneglycol, triethyleneglycol, tetra (ethyleneglycol), 1,3-propanediol, 1,4-butanediol, neopentyl glycol, 2,5-hexanediol, 1,6-hexanediol, 1,12-dodecanediol, 1,4-cyclohexanedimethanol, 4-hydroxybenzyl alcohol, 4,4'-biphenol, bis(4-hydroxyphenyl)methane, bisphenol-A, hydroquinone, 1,4-benzenedimethanol, 2-methoxyhydroquinone, 2,3-dimethylhydroquinone, and combinations thereof.

In another embodiment, a method of preparing a poly (orthoester) polymer includes: combining components including: at least one non-cyclic polyol having no primary hydroxy groups as described herein above; and at least one orthoester of the formula (Formula II)

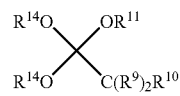

under conditions effective to polymerize at least a portion of the orthoester. The at least one non-cyclic polyol having no primary hydroxy groups and the at least one orthoester of the formula (Formula II) can be combined in a ratio selected to provide, for example, oligomers, low molecular weight polymers, and/or high molecular weight polymers. For embodiments in which polymers are desired (e.g., high molecular weight polymers), the at least one non-cyclic polyol having no primary hydroxy groups and the at least one orthoester of the formula (Formula II) typically are combined approximately in a 1:1 molar ratio, respectively, although ratios of from 0.9:1 to 1.1:1, respectively can be used in certain embodiments. The method further includes removing byproducts including $R^{14}OH$. Each $R^9$ and $R^{10}$ independently represents hydrogen or an organic group. Each $R^9$ and $R^{14}$ independently represents an organic group. The components combined can also include a polymerization agent as described herein below.

Optionally, the components can further include, for example, at least one diol different than the at least one non-cyclic polyol having no primary hydroxy groups. A wide variety of diols can be used including, for example, ethyleneglycol, diethyleneglycol, triethyleneglycol, tetra(ethyleneglycol), 1,3-propanediol, 1,4-butanediol, neopentyl glycol, 1,6-hexanediol, 1,12-dodecanediol, 1,4-cyclohexanedimethanol, 4-hydroxybenzyl alcohol, 4,4'-biphenol, bis(4-hydroxyphenyl)methane, bisphenol-A, hydroquinone, 1,4-benzenedimethanol, 2-methoxyhydroquinone, 2,3-dimethylhydroquinone, and combinations thereof.

For at least some of the above-described embodiments, conditions effective to polymerize include combining at least a portion of the components without adding a solvent. In other embodiments, conditions effective to polymerize further include combining a solvent, preferably a dry organic solvent. In certain embodiments, the solvent preferably forms an azeotrope with $R^{14}OH$. Suitable solvents include, for example, tetrahydrofuran, dioxane, toluene, methylene chloride, chloroform, N-methylpyrrolidone, N,N-dimethylacetamide, N,N-dimethylformamide, and combinations thereof. In certain embodiments, at least a portion of the components are combined under an inert atmosphere.

Byproducts of the reaction including, for example, $R^{14}OH$, can be removed, for example, by application of heat and/or vacuum to the reaction mixture. When a solvent is added, a convenient method of removing such byproducts includes distilling the byproducts under azeotropic conditions.

Optionally, combining components can further include combining an additional polymerizable compound. A wide variety of additional polymerizable compounds can be used including, for example, ketene acetals, monofunctional orthoesters, polyfunctional orthoesters, imagable compounds, compounds having latent reactive sites, and combinations thereof. The additional polymerizable compound can also be an orthoester different than the at least one orthoester described herein above.

In another embodiment, a method of preparing a poly (orthoester) polymer includes: combining components including at least one hydroxy-containing compound of the formula (Formula I) HO-A-OH as described herein above and at least one ketene acetal under conditions effective to polymerize at least a portion of the at least one ketene acetal. The at least one ketene acetal is selected from the group consisting of: a compound of the formula (Formula IV)

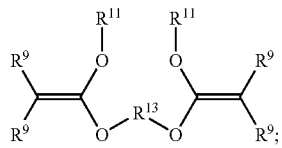

a compound of the formula (Formula V)

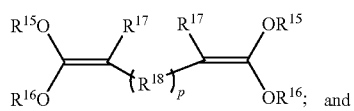

combinations thereof. Each $R^9$ and $R^{17}$ independently represents hydrogen or an organic group. Each $R^{11}$, $R^{13}$, $R^{15}$, and $R^{16}$ independently represents an organic group. $R^{18}$ represents oxygen or an organic group and p=0 or 1. Each $R^{11}$ can optionally be joined with $R^{13}$ to form one or more rings, and geminal $R^{15}$ and $R^{16}$ groups can optionally be joined to each other to form rings. Preferably the at least one ketene acetal of Formula IV and/or Formula V have a purity of at least 98 wt-%, more preferably at least 99 wt-%, and most preferably at least 99.5 wt-% as measured using the procedure of Pogany et al., *J. of Chromatography*, 508:179-186 (1990). Ketene acetals can be prepared by methods known in the art including for example, those described in Crivello et al., *J. of Polymer Science*, 34:3091-3102 (1996); Ng et al., *Macromolecular Syntheses*, 11:23-26 (1992); and U.S. Pat. No. 4,513,143 (Ng et al.) and U.S. Pat. No. 4,532,335 (Helwing). The at least one hydroxy-containing compound of the formula (Formula I) and the at least one ketene acetal of Formula IV and/or Formula V can be combined in a ratio selected to provide, for example, oligomers, low molecular weight polymers, and/or high molecular weight polymers. For embodiments in which polymers are desired (e.g., high molecular weight polymers), the at least one hydroxy-containing compound of the formula (Formula I) and the at least one ketene acetal of Formula IV and/or Formula V typically are combined approximately in a molar ratio of 1:1, respectively. In certain embodiments, the at least one hydroxy-containing compound of the formula (Formula I) and the at least one ketene acetal of Formula IV and/or Formula V are combined in a molar ratio such that the at least one ketene acetal of Formula IV and/or Formula V is present in a slight molar excess. For example, in certain embodiments, the at least one hydroxy-containing compound of the formula (Formula I) and the at least one ketene acetal of Formula IV and/or Formula V are combined in a molar ratio of 1 to at least 1.001, preferably in a molar ratio of 1 to at least 1.01, and more preferably in a molar ratio of 1 to at least 1.02. in certain embodiments, the at least one hydroxy-containing compound of the formula (Formula I) and the at least one ketene acetal of Formula IV and/or Formula V are combined in a molar ratio of 1 to at most 1.1, preferably in a molar ratio of 1 to at most 1.05, and more preferably in a molar ratio of 1 to at most 1.03.

The components combined can also include a polymerization agent as described herein below.

In certain embodiments, the compound of the formula (Formula IV) is represented by Formula IV(a):

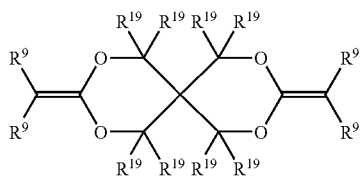

wherein each $R^9$ and $R^{19}$, independently represents hydrogen or an organic group. In certain embodiments, each $R^9$ and $R^{19}$ represents hydrogen.

Optionally, the components can further include, for example, at least one diol different than the at least one hydroxy-containing compound of the formula (Formula I). A wide variety of diols can be used including, for example, ethyleneglycol, diethyleneglycol, triethyleneglycol, tetra (ethyleneglycol), 1,3-propanediol, 1,4-butanediol, neopentyl glycol, 2,5-hexanediol, 1,6-hexanediol, 1,12-dodecanediol, 1,4-cyclohexanedimethanol, 4-hydroxybenzyl alcohol, 4,4'-biphenol, bis(4-hydroxyphenyl)methane, bisphenol-A, hydroquinone, 1,4-benzenedimethanol, 2-methoxyhydroquinone, 2,3-dimethylhydroquinone, and combinations thereof.

In another embodiment, a method of preparing a poly(orthoester) polymer includes: combining components including at least one non-cyclic polyol having no primary hydroxy groups as described herein above and at least one ketene acetal under conditions effective to polymerize at least a portion of the at least one ketene acetal. The at least one ketene acetal is selected from the group consisting of: a compound of the formula (Formula IV)

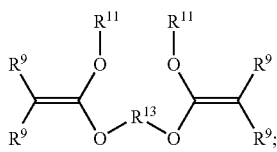

a compound of the formula (Formula V)

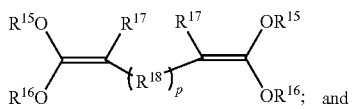

combinations thereof. Each $R^9$ and $R^{17}$ independently represents hydrogen or an organic group. Each $R^{11}$, $R^{13}$, $R^{15}$, and $R^{16}$ independently represents an organic group. $R^{18}$ represents oxygen or an organic group and p=0 or 1. Each $R^{11}$ can optionally be joined with $R^{13}$ to form one or more rings, and geminal $R^{15}$ and $R^{16}$ groups can optionally be joined to each other to form rings. Preferably the at least one ketene acetal of Formula IV and/or Formula V have a purity of at least 98 wt-%, more preferably at least 99 wt-%, and most preferably at least 99.5 wt-% as measured using the procedure of Pogany et al., *J. of Chromatography*, 508:179-186 (1990). Ketene acetals can be prepared by methods known in the art including for example, those described in Crivello et al., *J. of Polymer Science*, 34:3091-3102 (1996); Ng et al., *Macromolecular Syntheses*, 11:23-26 (1992); and U.S. Pat. No. 4,513,143 (Ng et al.) and U.S. Pat. No. 4,532,335 (Helwing). The at least one non-cyclic polyol having no primary hydroxy groups and the at least one ketene acetal of Formula IV and/or Formula V can be combined in a ratio selected to provide, for example, oligomers, low molecular weight polymers, and/or high molecular weight polymers. For embodiments in which polymers are desired (e.g., high molecular weight polymers), the at least one non-cyclic polyol having no primary hydroxy groups and the at least one ketene acetal of Formula IV and/or Formula V typically are combined approximately in a molar ratio of 1:1, respectively. In certain embodiments, the at least one non-cyclic polyol having no primary hydroxy groups and the at least one ketene acetal of Formula IV and/or Formula V are combined in a molar ratio such that the at least one ketene acetal of Formula IV and/or Formula V is present in a slight molar excess. For example, in certain embodiments, the at least one non-cyclic polyol having no primary hydroxy groups and the at least one ketene acetal of Formula IV and/or Formula V are combined in a molar ratio of 1 to at least 1.001, preferably in a molar ratio of 1 to at least 1.01, and more preferably in a molar ratio of 1 to at least 1.02. in certain embodiments, the at least one non-cyclic polyol having no primary hydroxy groups and the at least one ketene acetal of Formula IV and/or Formula V are combined in a molar ratio of 1 to at most 1.1, preferably in a molar ratio of 1 to at most 1.05, and more preferably in a molar ratio of 1 to at most 1.03.

The components combined can also include a polymerization agent as described herein below.

In certain embodiments, the compound of the formula (Formula IV) is represented by Formula IV(a):

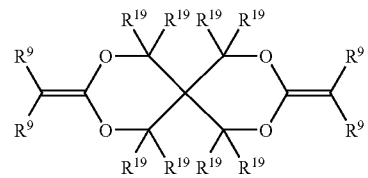

wherein each $R^9$ and $R^{19}$, independently represents hydrogen or an organic group. In certain embodiments, each $R^9$ and $R^{19}$ represents hydrogen.

Optionally, the components can further include, for example, at least one diol different than the at least one non-cyclic polyol having no primary hydroxy groups. A wide variety of diols can be used including, for example, ethyleneglycol, diethyleneglycol, triethyleneglycol, tetra(ethyleneglycol), 1,3-propanediol, 1,4-butanediol, neopentyl glycol, 1,6-hexanediol, 1,12-dodecanediol, 1,4-cyclohexanedimethanol, 4-hydroxybenzyl alcohol, 4,4'-biphenol, bis(4-hydroxyphenyl)methane, bisphenol-A, hydroquinone, 1,4-benzenedimethanol, 2-methoxyhydroquinone, 2,3-dimethylhydroquinone, and combinations thereof.

For at least some of the above-described embodiments, optionally, the components can further include, for example, at least one mono-hydroxy-containing compound. A wide variety of mono-hydroxy-containing compounds can be used including, for example, methanol, ethanol, propanol, butanol, pentanol, hexanol, decanol, dodecanol, 2-methoxyethanol, 2-ethyoxyethanol, di(ethyleneglycol) monomethyl ether, di(ethyleneglycol) monoethyl ether, tri(ethyleneglycol) monomethyl ether, tri(ethyleneglycol) monoethyl ether, tetra(ethyleneglycol) monomethyl ether, tetra(ethyleneglycol) monoethyl ether, and combinations thereof.

In some embodiments, conditions effective to polymerize include combining at least a portion of the components without adding a solvent. In other embodiments, conditions effective to polymerize further include combining a solvent, preferably a dry organic solvent. Suitable solvents include, for example, tetrahydrofuran, dioxane, toluene, methylene chloride, chloroform, N-methylpyrrolidone, N,N-dimethylacetamide, N,N-dimethylformamide, and combinations thereof. When a solvent is used, components are typically combined to give at least 1% by weight solids, preferably at least 5% by weight solids, and more preferably at least 10% by weight solids. When a solvent is used, components are typically combined to give at most 70% by weight solids, preferably at most 60% by weight solids, and more preferably at most 50% by weight solids. In certain embodiments, at least a portion of the components are combined under an inert atmosphere.

Optionally, combining components can further include combining an additional polymerizable compound. A wide variety of additional polymerizable compounds can be used including, for example, orthoesters, monofunctional ketene acetals, polyfunctional ketene acetals, imagable compounds, compounds having latent reactive sites, and combinations thereof. The additional polymerizable compound can also be a ketene acetal different than the at least one ketene acetal described herein above.

A polymerization agent can be used to initiate and/or propagate the polymerization reactions described herein above. A wide variety of polymerization agents can be used that are known in the art to catalyze addition polymerizations. Typically, the polymerization agent provides for polymerization through a cationic, an anionic, a free radical, and/or an organometallic pathway. The polymerization agent may be present in catalytic amounts, or alternatively, may be used in stoichiometric amounts with partial or total consumption of the polymerization agent during the polymerization reaction.

In some embodiments, the polymerization agent includes a Lewis acid or a Brønsted-Lowry acid. Suitable Lewis acids typically include one or more elements such as Al, Fe, B, Zn, Sb, Ti, Cu, Sn, Si, and the like. Examples of suitable Lewis acids include, for example, boron trifluoride and/or boron trifluoride etherate, zinc chloride, zinc iodide, zinc triflate, antimony pentachloride, and the like, and combinations thereof.

Suitable Brønsted-Lowry acids include, for example, hydrochloric acid, p-toluenesulfonic acid, methanesulfonic acid, trifluoromethanesulfonic acid, camphorsulfonic acid, and the like.

In some embodiments, the polymerization agent includes an organometallic compound or a metal salt. Suitable organometallic compounds include zinc-containing compounds as disclosed, for example, in U.S. Pat. No. 6,133,402 (Coates et al.); Moore et al., *J. American Chem. Soc.*, 125:11911-11924 (2003); and the like. Suitable metal salts include, for example, metal halides (e.g., metal chlorides, metal bromides, metal iodides, and combinations thereof), metal pseudohalides (e.g., metal cyanates, metal thiocyanates, metal isothiocyanates, metal isocyanides, metal azides, metal thiosulfates, and combinations thereof), metal sulfonates (e.g., metal triflates, metal mesylates, metal p-toluenesulfonates, metal camphorsulfonates, and combinations thereof), metal carboxylates (e.g., metal perfluorocarboxylates), metal carbonates (e.g., cesium carbonate), and combinations thereof. The metal salts typically include a metal such as Zn, Cs, or combinations thereof.

The ratio of the polymerization agent to the other components can be varied as desired, and is typically selected to provide the desired reaction time at the selected reaction temperature for the specific polymerization agent. The ratio of the polymerization agent to the other components can also be varied to influence the molecular weight of the resulting polymers, with lower ratios typically resulting in higher molecular weights. In some embodiments, at least 0.0000001 mole %, sometimes at least 0.000001 mole %, and other times at least 0.00001 mole % of polymerization agent is used, based on the total moles of hydroxy-containing compound and polymerization agents. In some embodiments, at most 30 mole %, sometimes at most 20 mole %, and other times at most 10 mole % of polymerization agent is used, based on the total moles of hydroxy-containing compound and polymerization agents. In certain embodiments, a solution of a Brønsted-Lowry acid (e.g., 1% by weight p-toluenesulfonic acid) in a solvent (tetrahydrofuran) can be used as a polymerization agent.

Suitable polymerization agents may be monofunctional (i.e., having one initiation site), difunctional (i.e., having two initiation sites), or polyfunctional (i.e., having more than two initiation sites). For cases in which the polymerization agent is incorporated into the polymer chain, polyfunctional polymerization agents can lead to highly branched polymer structures (e.g., star structures).

In certain embodiments, components including the at least one hydroxy-containing compound and the polymerization agent can be combined neat (e.g., without adding a solvent). In other certain embodiments, components including the at least one hydroxy-containing compound and the polymerization agent can be combined in a dry organic solvent at a concentration selected to provide a convenient reaction rate. Typically, rapid addition of the polymerization agent to the other components (e.g., addition over at most 60 seconds, and sometimes at most 1 second) can be preferred for producing higher molecular weight poly(orthoester) polymers. See, for example, Ng et al., *J. of Controlled Release*, 65:367-374 (2000). Typically and preferably, at least a portion of the components are combined under an inert atmosphere. The reaction temperature can be selected and/or varied as desired to provide a convenient reaction rate.

The polymerization methods disclosed herein can provide poly(orthoester) polymers. In certain embodiments, the poly (orthoester) polymer includes two or more repeat units selected from the group consisting of: a repeat unit of the formula (Formula VI):

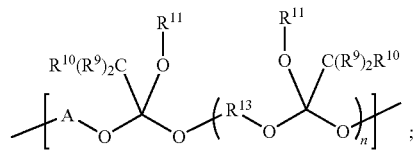

a repeat unit of the formula (Formula VII):

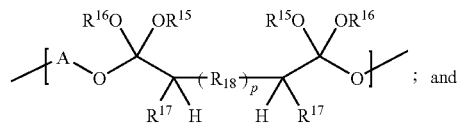

; and combinations thereof. Each $R^9$, $R^{10}$, and $R^{17}$ independently represents hydrogen or an organic group. Each $R^{11}$, $R^{13}$, $R^{15}$, and $R^{16}$ independently represents an organic group; $R^{18}$ represents oxygen or an organic group and $p=0$ or 1, and $n=0$ or 1. Each $R^{11}$ can optionally be joined with $R^{13}$ to form one or more rings, and geminal $R^{15}$ and $R^{16}$ groups can optionally be joined to each other to form rings.

In some embodiments, each A is as defined herein above for hydroxy-containing compounds of the formula (Formula I) HO-A-OH.

In some other embodiments, each A represents the non-cyclic group —CH($R^1$)—(C($R^3$)$_2$)$_r$—CH($R^2$)—; each $R^1$ and $R^2$ independently represents an organic group (e.g., an organic moiety); each $R^3$ independently represents hydrogen or an organic group (e.g., an organic moiety); and r is 0 to 20. In certain preferred embodiments, each $R^1$ and $R^2$ represents methyl; each $R^3$ represents hydrogen; and r is 0 to 2.

In certain embodiments, the repeat unit of the formula (Formula VI) is represented by Formula VIa:

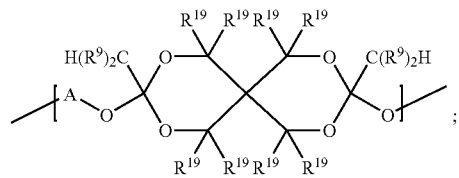

wherein each $R^9$ and $R^{19}$ independently represents hydrogen or an organic group. In certain embodiments, each $R^{19}$ represents hydrogen and each $R^9$ independently represents hydrogen or methyl.

In some embodiments, each A is as defined herein above for hydroxy-containing compounds of the formula (Formula I) HO-A-OH.

In some other embodiments, each A represents the non-cyclic group —CH($R^1$)—(C($R^3$)$_2$)$_r$—CH($R^2$)—; each $R^1$ and $R^2$ independently represents an organic group (e.g., an organic moiety); each $R^3$ independently represents hydrogen or an organic group (e.g., an organic moiety); and r is 0 to 20. In certain preferred embodiments, each $R^1$ and $R^2$ represents methyl; each $R^3$ represents hydrogen; and r is 0 to 2.

In the above-disclosed polymers, any of the R substituents that are "organic groups" can include as at least a portion thereof, for example, an orthoester functionality (e.g., at least a portion of Formula II, Formula VI, or Formula VII); a ketene acetal functionality (e.g., at least a portion of Formula IV or Formula V); an imagable functionality (e.g., one or more of a radiopaque functionality such as an iodinated group, a ferromagnetic functionality, and a magnetic susceptible functionality such as Fe, Cr, Ni, and Gd); a latent reactive functionality (e.g., ethylenic unsaturation and/or oxygen-containing rings suitable for latent crosslinking after polymerization); or combinations thereof.

The polymers disclosed herein can include a single orthoester-containing repeat unit (i.e., a homopolymer), or two or more different repeat units (i.e., a copolymer). In such copolymers, the two or more different repeat units can all be different orthoester-containing repeat units of Formula VI and/or Formula VII, or alternatively, one or more orthoester-containing repeat units of Formula VI and/or Formula VII in combination with one or more repeat units that are not of Formula VI or Formula VII (e.g., repeat units that include, for example, ether groups, acetal groups, and/or ketal groups). The polymers disclosed herein can be linear polymers, crosslinkable polymers, and/or crosslinked polymers.

Copolymers as disclosed herein can be random copolymers, alternating copolymers, block copolymers, graft copolymers, or combinations thereof. For example, mixtures of components can be combined with a polymerization agent to prepare random and/or alternating copolymers. For another example, one or more components can be combined with a polymerization agent and allowed to react until all the components are consumed, followed by the addition of one or more different components, and optionally additional polymerization agent (which can be the same or different than the first optional polymerization agent, if present), which are then allowed to react to prepare block and/or graft copolymers.

Block copolymers in which at least one block of the block copolymer is a poly(orthoester) block including two or more repeat units selected from the group consisting of repeat units of Formula VI, repeat units of Formula VII, and combinations thereof, can be of particular interest for certain applications. The at least one other block of such block copolymers can be selected from blocks having a wide variety of repeat units including, for example, alpha-hydroxy alkanoates, beta-hydroxy alkanoates, gamma-hydroxy alkanoates, delta-hydroxy alkanoates, epsilon-hydroxy alkanoates, gylcols, carbonates, acetals, urethane-containing groups, carbamate-containing groups, or combinations thereof. In certain embodiments, the at least one other block of such block copolymers can be a polyketal block. In other certain embodiments, the at least one other block of such block copolymers can be a poly(alkyleneglycol) block including alkylene glycol repeat units.

Optionally, the poly(orthoester) polymer can be further reacted as a soft segment of a segmented polymer. Exemplary segmented polymers include, for example, polyurethanes, polyethylenes, polycarbonates, polyureas, and combinations thereof. In some embodiments, copolymers can be formed by starting with an oligomeric or polymeric macromolecule (e.g., polyethylene glycol) and forming poly(orthoester) blocks thereon by the polymerization of the components described herein. In other embodiments, copolymers can be formed by starting with a poly(orthoester) polymer and reacting the poly(orthoester) polymer with additional components (e.g., monomers, oligomers, polymers, and/or other reactive compounds).

Typically and preferably, the poly(orthoester) polymers disclosed herein are biodegradable. Typically, the average molecular weight (and preferably the weight average molecular weight) of the polymers disclosed herein is at least 1,000 Daltons, and sometimes at least 5,000 Daltons, 50,000 Daltons, or even 100,000 Daltons or more. Typically the polydispersity index (PDI) of the polymers disclosed herein is at most 5, and sometimes at most 3, and other times at most 2.

In another aspect, a poly(orthoester) polymer that is substantially free of acidic groups, glycolide groups, and lactide groups is disclosed. Preferably, the hydrolysis rate and/or drug release rate of the poly(orthoester) polymer is sufficiently high to allow the poly(orthoester) polymer to be used in applications requiring biodegradability and/or bioerodibility.

In another aspect, a poly(orthoester) polymer having a glass transition temperature ($T_g$) of at least 57° C. is disclosed. Preferably, the hydrolysis rate and/or drug release rate of the poly(orthoester) polymer is sufficiently high to allow the poly(orthoester) polymer to be used in applications requiring biodegradability and/or bioerodibility.

In another aspect, a method of hydrolyzing a poly(orthoester) polymer is provided. The method includes: providing a poly(orthoester) polymer that is substantially free of acidic groups, glycolide groups, and lactide groups; exposing the poly(orthoester) polymer to an aqueous environment; and allowing the poly(orthoester) polymer to hydrolyze. Preferably, the hydrolysis rate and/or drug release rate of the poly(orthoester) polymer is sufficiently high to allow the poly(orthoester) polymer to be used in applications requiring biodegradability and/or bioerodibility. Preferably, when the poly(orthoester) polymer is used in an application requiring biodegradability and/or bioerodibility, hydrolyzing the poly(orthoester) polymer includes forming substantially no acidic byproducts at the hydrolysis site.

For certain applications, a poly(orthoester) polymer as disclosed herein can be blended with another polymer (e.g., the same or different than the poly(orthoester) polymers disclosed herein) to provide the desired physical and/or chemical properties. For example, two poly(orthoester) polymers having different molecular weights can be blended to optimize the release rate of a biologically active agent. For another example, two poly(orthoester) polymers having different repeat units can be blended to provide desired physical and/or chemical properties. For even another example, a poly(orthoester) polymer can be blended with another polymer that is not a poly(orthoester) polymer to provide desired physical and/or chemical properties.

Poly(orthoester) polymers as disclosed herein can be used in various combinations for various applications. They can be used as tissue-bulking agents in urological applications for bulking the urinary sphincter to prevent stress incontinence or in gastrological applications for bulking of the lower esophageal sphincter to prevent gastroesophageal reflux disease. They can be used for replacements for nucleus pulposis or repair of annulus in intervertebral disc repair procedures. They can be used as tissue adhesives or sealants. They can be used as surgical void fillers, for example, in reconstructive or cosmetic surgery (e.g., for filling a void after tumor removal). They can be used to repair aneurysms, hemorrhagic stroke or other conditions precipitated by failure of a blood vessel. They can be used to prevent surgical adhesions. Poly(orthoester) polymers as disclosed herein can further be used for applications such as scaffolds or supports for the development and/or growth of cells for applications including, for example, tissue engineering and the fabrication of artificial organs.

Poly(orthoester) polymers as disclosed herein can be used in injectable compositions. Such injectable compositions could be used as tissue bulking agents (e.g., for the treatment of urinary stress incontinence, for the treatment of gastroesophageal reflux disease, or serving to augment a degenerated intervertebral disc), void fillers (e.g., in cosmetic or reconstructive surgery, such as serving as a replacement for the nucleus pulposis), or as an injectable drug delivery matrix.

In some embodiments, no additives would be needed to form an injectable composition. In some embodiments, one or more polymers can be combined with a solvent such as N-methyl-2-pyrrolidone or dimethylsulfoxide (DMSO), which are fairly biocompatible solvents. The solvent can diffuse away after injection and the polymer can remain in place. Such injectable materials can be applied to a desired site (e.g., a surgical site) using a syringe, catheter, or by hand.

Also, injectable compositions could include crosslinkers (such as diacrylates), plasticizers (such as triethyl citrate), lipids (soybean oil), poly(ethylene glycol) (including those with the ends blocked with methyls or similar groups), silicone oil, partially or fully fluorinated hydrocarbons, N-methyl-2-pyrrolidone, or mixtures thereof.

Polymers disclosed herein can be used in combination with a variety of particulate materials. For example, they can be used with moisture curing ceramic materials (e.g., tricalcium phosphate) for vertebroplasty cements, bone void filling (due to disease such as cancer or due to fracture). They can be used in combination with inorganic materials such as hydroxylapatite to form pastes for use in bone healing, sealing, filling, repair, and replacement. They can be used as or in combination with polymer microspheres that can be reservoirs for a biologically active agent such as a protein, DNA plasmid, RNA plasmid, antisense agent, etc.

Alternatively, poly(orthoesters) as disclosed herein can be used in combination with other materials to form a composite (e.g., a polymer having an additive therein). In addition to one or more poly(orthoester) polymers, composites can include a wide variety of additives, and particularly particulate additives, such as, for example, fillers (e.g., including particulate, fiber, and/or platelet material), other polymers (e.g., polymer particulate materials such as polytetrafluoroethylene can result in higher modulus composites), imaging particulate materials (e.g., barium sulfate for visualizing material placement using, for example, fluoroscopy), biologically derived materials (e.g., bone particles, cartilage, demineralized bone matrix, platelet gel, and combinations thereof), and combinations thereof. Additives can be dissolved, suspended, and/or dispersed within the composite. For particulate additives, the additive is typically dispersed within the composite.

Poly(orthoester) polymers as described herein can be combined with fibers, woven or nonwoven fabric for reconstructive surgery, such as the in situ formation of a bone plate or a bone prosthesis.

In certain embodiments, one or more poly(orthoester) polymers as disclosed herein can be shaped to form a medical device, preferably a biodegradable medical device. The one or more polymers can be shaped by methods known in the art including compression molding, injection molding, casting, extruding, milling, blow molding, or combinations thereof. As used herein, a "medical device" includes devices that have surfaces that contact tissue, bone, blood, or other bodily fluids in the course of their operation, which fluids are subsequently used in patients. This can include, for example, extracorporeal devices for use in surgery such as blood oxygenators, blood pumps, blood sensors, tubing used to carry blood, and the like which contact blood which is then returned to the patient. This can also include endoprostheses implanted in blood contact in a human or animal body such as vascular grafts, stents, pacemaker leads, heart valves, and the like, that are implanted in blood vessels or in the heart. This can also include devices for temporary intravascular use such as catheters, guide wires, and the like which are placed into the blood vessels or the heart for purposes of monitoring or repair. A medical device can also be fabricated by polymerizing components including at least one hydroxy-containing compound and compounds of Formula II, Formula IV, and/or Formula V in a suitable mold.

Poly(orthoester) polymers as disclosed herein can also be coated onto a substrate if desired. A coating mixture of the polymer can be prepared using solvents such as toluene, chloroform, tetrahydrofuran, perfluorinated solvents, and combinations thereof. Preferred solvents include those that can be rendered moisture-free and/or those that have no active hydrogens. The coating mixture can be applied to an appropriate substrate such as uncoated or polymer coated medical wires, catheters, stents, prostheses, penile inserts, and the like, by conventional coating application methods. Such methods include, but are not limited to, dipping, spraying, wiping, painting, solvent swelling, and the like. After applying the coating solution to a substrate, the solvent is preferably allowed to evaporate from the coated substrate.

The materials of a suitable substrate include, but are not limited to, polymers, metal, glass, ceramics, composites, and multilayer laminates of these materials. The coating may be applied to metal substrates such as the stainless steel used for guide wires, stents, catheters and other devices. Organic substrates that may be coated with polymers as disclosed herein include, but are not limited to, polyether-polyamide block copolymers, polyethylene terephthalate, polyetherurethane, polyesterurethane, other polyurethanes, silicone, natural rubber, rubber latex, synthetic rubbers, polyester-polyether copolymers, polycarbonates, and other organic materials.

Additives that can be combined with a poly(orthoester) polymer as disclosed herein to form a composition include, but are not limited to, wetting agents for improving wettability to hydrophobic surfaces, viscosity and flow control agents to adjust the viscosity and thixotropy of the mixture to a desired level, antioxidants to improve oxidative stability of the coatings, dyes or pigments to impart color or radiopacity, and air release agents or defoamers, cure catalysts, cure accelerants, plasticizers, solvents, stabilizers (cure inhibitors, pot-life extenders), and adhesion promoters.

Of particular interest for medical and pharmaceutical applications are compositions that include one or more poly(orthoester) polymers as disclosed herein and a biologically active agent. As used herein, a "biologically active agent" is intended to be broadly interpreted as any agent capable of eliciting a response in a biological system such as, for example, living cell(s), tissue(s), organ(s), and being(s). Biologically active agents can include natural and/or synthetic agents. Thus, a biologically active agent is intended to be inclusive of any substance intended for use in the diagnosis, cure, mitigation, treatment, or prevention of disease or in the enhancement of desirable physical or mental development and conditions in a subject. The term "subject" as used herein is taken to include humans, sheep, horses, cattle, pigs, dogs, cats, rats, mice, birds, reptiles, fish, insects, arachnids, protists (e.g., protozoa), and prokaryotic bacteria. Preferably, the subject is a human or other mammal.

A preferred class of biologically active agents includes drugs. As used herein, the term "drug" means any therapeutic agent. Suitable drugs include inorganic and organic drugs, without limitation, and include drugs that act on the peripheral nerves, adrenergic receptors, cholinergic receptors, nervous system, skeletal muscles, cardiovascular system, smooth muscles, blood circulatory system, synaptic sites, neuro-effector junctional sites, endocrine system, hormone systems, immunological system, reproductive system, skeletal system, autocoid systems, alimentary and excretory systems (including urological systems), histamine systems, and the like. Such conditions, as well as others, can be advantageously treated using compositions as disclosed herein.

Suitable drugs include, for example, polypeptides (which is used herein to encompass a polymer of L- or D-amino acids of any length including peptides, oligopeptides, proteins, enzymes, hormones, etc.), polynucleotides (which is used herein to encompass a polymer of nucleic acids of any length including oligonucleotides, single- and double-stranded DNA, single- and double-stranded RNA, DNA/RNA chimeras, etc.), saccharides (e.g., mono-, di-, poly-saccharides, and mucopolysaccharides), vitamins, viral agents, and other living material, radionuclides, and the like. Examples include antithrombogenic and anticoagulant agents such as heparin, coumadin, protamine, and hirudin; antimicrobial agents such as antibiotics; antineoplastic agents and anti-proliferative agents such as etoposide, podophylotoxin; antiplatelet agents including aspirin and dipyridamole; antimitotics (cytotoxic agents) and antimetabolites such as methotrexate, colchicine, azathioprine, vincristine, vinblastine, fluorouracil, adriamycin, and mutamycinnucleic acids; antidiabetic such as rosiglitazone maleate; and anti-inflammatory agents. Anti-inflammatory agents include glucocorticoids, their salts, and derivatives thereof, such as cortisol, cortisone, fludrocortisone, Prednisone, Prednisolone, 6α-methylprednisolone, triamcinolone, betamethasone, dexamethasone, beclomethasone, aclomethasone, amcinonide, clebethasol and clocortolone.

Preferred classes of drugs include, for example, Plasmid DNA, genes, antisense oligonucleotides and other antisense agents, peptides, proteins, protein analogs, siRNA, siRNA, miRNA, ribozymes, DNAzymes and other DNA based agents, viral and non-viral vectors, lyposomes, cells, stem cells, antineoplastic agents, antiproliferative agents, antithrombogenic agents, anticoagulant agents, antiplatelet agents, antibiotics, anti-inflammatory agents, antimitotic agents, immunosuppressants, growth factors, cytokines, hormones, and combinations thereof.

Suitable drugs can have a variety of uses including, but are not limited to, anticonvulsants, analgesics, antiparkinsons, antiinflammatories (e.g., ibuprofen, fenbufen, cortisone, and the like), calcium antagonists, anesthetics (e.g., benoxinate, benzocaine, procaine, and the like), antibiotics (e.g., ciprofloxacin, norfloxacin, clofoctol, and the like), antimalarials, antiparasitics, antihypertensives, antihistamines, antipyretics, alpha-adrenergic agonists, alpha-blockers, biocides, bactericides, bronchial dilators, beta-adrenergic blocking drugs, contraceptives, cardiovascular drugs, calcium channel inhibitors, depressants, diagnostics, diuretics, electrolytes, enzymes, hypnotics, hormones, hypoglycemics, hyperglycemics, muscle contractants, muscle relaxants, neoplastics, glycoproteins, nucleoproteins, lipoproteins, ophthalmics, psychic energizers, sedatives, steroids sympathomimetics, parasympathomimetics, tranquilizers, urinary tract drugs, vaccines, vaginal drugs, vitamins, collagen, hyaluronic acid, nonsteroidal anti-inflammatory drugs, angiotensin converting enzymes, polynucleotides, polypeptides, polysaccharides, and the like.

Certain preferred embodiments include a drug selected from the group consisting of indomethacin, sulindac, diclofenal, etodolac, meclofenate, mefenamic acid, nambunetone, piroxicam, phenylgutazone, meloxicam, dexamethoasone, betamethasone, dipropionate, diflorsasone diacetate, clobetasol propionate, galobetasol propionate, amcinomide, beclomethasone dipropionate, fluocinomide, betamethasone valerate, triamcinolone acetonide, penicillamine, hydroxychloroquine, sulfasalazine, azathioprine, minocycline, cyclophosphamide, methotrexate, cyclosporine, leflunomide, etanercept, infliximab, ascomycin, beta-estradiol, rosiglitazone, troglitazone, pioglitazone, S-nitrosoglutathione, gliotoxin G, panepoxydone, cycloepoxydon tepoxalin, curcumin, a proteasome inhibitor (e.g., bortezomib, dipeptide boronic acid, lactacystin, bisphosphonate, zolendronate, epoxomicin), antisense c-myc, celocoxib, valdecoxib, and combinations thereof.

Certain preferred embodiments include a drug selected from the group consisting of podophyllotoxin, mycophenolic acid, teniposide, etoposide, trans-retinoic acids, 9-cis retinoic acid, 13-cis retinoic acid, rapamycin, a rapalog (e.g., Everolimus, ABT-578), camptothecin, irinotecan, topotecan, tacromilus, mithramycin, mitobronitol, thiotepa, treosulfan, estramusting, chlormethine, carmustine, lomustine, busultan, mephalan, chlorambucil, ifosfamide, cyclophosphamide, doxorubicin, epirubicin, aclarubicin, daunorubicin, mitosanthrone, bleomycin, cepecitabine, cytarabine, fludarabine, cladribine, gemtabine, 5-fluorouracil, mercaptopurine, tioguanine, vinblastine, vincristine, vindesine, vinorelbine, amsacrine, bexarotene, crisantaspase, decarbasine, hydrosycarbamide, pentostatin, carboplatin, cisplatin, oxiplatin, procarbazine, paclitaxel, docetaxel, epothilone A, epothilone B, epothilone D, baxiliximab, daclizumab, interferon alpha, interferon beta, maytansine, and combinations thereof.

Certain preferred embodiments include a drug selected from the group consisting of salicylic acid, fenbufen, cortisone, ibuprofen, diflunisal, sulindac, difluprednate, prednisone, medrysone, acematacin, indomethacin, meloxicam, camptothecin, benoxinate, benzocaine, procaine, ciprofloxacin, norfloxacin, clofoctol, dexamethasone, fluocinolone, ketorolac, pentoxifylline, rapamycin, ABT-578, gabapentin, baclofen, sulfasalazine, bupivacaine, sulindac, clonidine, etanercept, pegsunercept, and combinations thereof.

Compositions including a biologically active agent and a poly(orthoester) polymer as disclosed herein and can be prepared by suitable methods known in the art. For example, such compositions can be prepared by solution processing, milling, extruding, polymerizing components including at least one hydroxy-containing compound and compounds of Formula II, Formula IV, and/or Formula IV in the presence of a biologically active agent, and combinations thereof.

Typically, the amount of biologically active agent within a poly(orthoester) polymer is determined by the amount to be delivered and the time period over which it is to be delivered. Other factors can also contribute to the level of biologically active agent present, including, for example, the ability of the composition to form a uniform film on a substrate.

Compositions including poly(orthoester) polymers as disclosed herein (e.g., with or without a biologically active agent) can further include additional components. Examples of such additional components include fillers, dyes, pigments, inhibitors, accelerators, viscosity modifiers, wetting agents, buffering agents, stabilizers, biologically active agents, polymeric materials, excipients, and combinations thereof. Alternatively, the poly(orthoester) polymer itself can be an excipient in a composition (e.g., a pharmaceutical composition including a biologically active agent).

Medical devices that include one or more poly(orthoester) polymers as disclosed herein and a biologically active agent can have a wide variety of uses. In such devices, the biologically active agent is preferably disposed in the one or more polymers. As used herein, the term "disposed" is intended to be broadly interpreted as inclusive of dispersed, dissolved, suspended, or otherwise contained at least partially therein or thereon.

For example, such devices can be used to deliver a biologically active agent to a tissue by positioning at least a portion of the device including the one or more polymers proximate the tissue and allowing the one or more polymers to biodegrade and deliver the biologically active agent disposed therein. For another example, such devices can be used to control the release rate of a biologically active agent from a medical device by disposing the biologically active agent in at least one of the one or more polymers.

The present disclosure is further illustrated by the following examples. It is to be understood that the particular examples, materials, amounts, and procedures are to be interpreted broadly in accordance with the scope and spirit of the disclosure as set forth herein.

EXAMPLES

Example 1

Preparation and Purification of a Ketene Acetal of Formula IV(a), Wherein Each $R^{19}$=H and Geminal $R^9$s=H and $CH_3$ (DETOSU)

The preparation of the ketene acetal 3,9-diethylidene-2,4,8,10-tetraoxaspiro[5,5]-undecane) (DETOSU) has been previously described. See, for example, Heller et al. in *Macromolecular Syntheses*, C. G. Overberger, Ed., Vol. 11, pp. 23-35, Wiley, NY (1992); and U.S. Pat. No. 4,513,143 (Ng et al.), U.S. Pat. No. 4,532,335 (Helwing), and U.S. Pat. No. 6,863,782 (Newsome et al.). DETOSU was recrystallized from hexanes containing triethylamine until it was at least 99% pure as determined by the method of Pogany et al., *J. of Chromatography*, 508:179-186 (1990). Distillation was used to remove traces of hexane and triethylamine still present in the DETOSU before storage.

Example 2

Preparation of Poly(Orthoester) Polymers

Poly(orthoester) polymers were prepared by reacting the indicated hydroxy-containing compound(s) with DETOSU using methods similar to the general procedure described herein below.

All glassware used during the preparation was pyro-cleaned, washed with soap, rinsed with DI water, 0.1M NaOH, DI water, isopropanol, acetone, and then placed in a 110° C. oven to dry. The same bottle of DETOSU (98% by gas chromatography using a flame ionization detector (GC/FID)) was used for each polymer composition. The diols were freshly dried by rotary-evaporation at 80° C. and 20 torr for at least 7 hours.

The polymers were prepared in anhydrous tetrahydrofuran (THF) stabilized with butylated hydroxytoluene (BHT) in a nitrogen atmosphere glovebox, at a concentration 16.8% solids by weight. The batch size was based on 5 grams of DETOSU. The weights of the reactants were measured to 4 decimal places using a 5-place analytical balance in the glovebox. The overall molar ratio of DETOSU to diol was 1.020. A 1% by weight para-toluenesulfonic acid (PTSA) in THF polymerization agent solution was added at a ratio of 8.2 microliters polymerization agent solution per gram THF used to dissolve the reactants. The polymerization agent was added after the reactants had completely dissolved with magnetic stirring. The solution was stirred for at least 18 hours, at which point a fourier transform infrared (FTIR) scan was performed to confirm the absence of hydroxyl peaks above 3000 $cm^{-1}$ and ketene acetal peaks at 1703 $cm^{-1}$ indicating completion of the reaction. The polymer was precipitated from THF into anhydrous methanol (with a few drops triethylamine) inside a nitrogen glovebox, with vigorous stirring in a Waring blender. The polymers were redissolved in a minimal amount of anhydrous THF, and precipitated a second time. The polymers were then placed in a glass-reinforced poly(tetrafluoroethylene) container in a vacuum oven (full vacuum, 50° C.) to dry for at least eighteen hours. The raw materials were characterized by GPC and DSC.

The following hydroxy-containing compounds were used to make the polymers listed in Table 1: trans-cyclohexanedimethanol (tCHDM; 98%, Fisher Scientific #AC40606); 1,6-hexanediol (HD); 1,4-butanediol (BD); tetraethylene glycol (TEG; 99%, Aldrich #110175); 4,4'-(1-phenylethylidene) bisphenol (PEB); 4,4'-isopropylidenebis(2,6-dimethylphenol) (IPDMP); 4,4'-(1,4-phenylenediisopropylidene) bisphenol PDIPBP); 2-hydroxybenzyl alcohol (2HBA); and 3-hydroxybenzyl alcohol (3HBA).

TABLE 1

Poly(orthoester) Polymers prepared using aromatic-containing hydroxy-containing compounds.

| Polymer ID | Hydroxy-Containing Compound(s) | Molar Ratios | Tg | PDI | $M_W$ | $M_N$ |
|---|---|---|---|---|---|---|
| A | tCHDM:PEB | 99.9:0.1 | 112 | 2.2 | 46,840 | 21,770 |
| B | tCHDM:PEB | 99:1.0 | 98 | 1.8 | 32,430 | 18,040 |
| C | tCHDM:PEB | 95/5 | 110 | 1.6 | 34,510 | 21,960 |
| D | tCHDM:PEB | 90:10 | 108 | 1.5 | 33,540 | 22,730 |
| E | tCHDM:PEB | 70:30 | 91 | 2.1 | 8,307 | 3,876 |
| F | tCHDM:PEB | 85:15 | 123 | 2.1 | 35,680 | 16,910 |
| G | tCHDM:PEB | 80:20 | 102 | 2.8 | 34,870 | 12,280 |
| H | tCHDM:PEB | 75:25 | 131 | 1.9 | 28,050 | 14,590 |
| I | HD:tCHDM:PEB | 35:55:0 | 97 | 1.3 | 62,860 | 47,016 |
| J | HD:tCHDM:PDIPBP | 35:55:10 | 83 | 1.3 | 32,400 | 25,858 |
| K | HD:tCHDM:PEB | 65:25:10 | 65 | 1.3 | 11,790 | 9,021 |

TABLE 1-continued

Poly(orthoester) Polymers prepared using aromatic-containing hydroxy-containing compounds.

| Polymer ID | Hydroxy-Containing Compound(s) | Molar Ratios | Tg | PDI | $M_W$ | $M_N$ |
|---|---|---|---|---|---|---|
| L | HD:tCHDM:IPDMP | 65:25:10 | 52 | 1.5 | 30,042 | 20,747 |
| M | HD:tCHDM:IPDMP | 35:55:10 | 72 | 1.5 | 36,430 | 23,690 |
| N | HD:tCHDM:PDIPBP | 65:25:10 | 58 | 1.3 | 54,560 | 41,510 |
| O | HD:tCHDM:IPDMP | 50:40:10 | 59 | 1.5 | 30,950 | 20,170 |
| P | HD:tCHDM:PEB | 50:40:10 | 71 | 1.9 | 52,990 | 27,910 |
| Q | HD:tCHDM:PDIPBP | 50:40:10 | 67 | 1.3 | 30,830 | 23,190 |
| R | HD:tCHDM:IPDMP | 35:55:10 | 68 | 1.6 | 50,540 | 30,920 |
| S | HD:tCHDM:PEB | 35:55:10 | 86 | 2.1 | 54,810 | 26,580 |
| T | BD:tCHDM:IPDMP | 50:40:10 | 65 | 2.0 | 28,320 | 14,520 |
| U | BD:tCHDM:PEB | 50:40:10 | 83 | 1.5 | 38,450 | 25,170 |
| V | BD:tCHDM:PDIPBP | 50:40:10 | 82 | 1.3 | 42,070 | 31,410 |
| W | IPDMP | 100 | 178 | 1.7 | 10,540 | 6,159 |
| X | PEB | 100 | 168 | 4.8 | 183,800 | 38,490 |
| Y | HD:2HBA | 70:30 | 48 | 2.3 | 23,770 | 10,310 |
| Z | HD:3HBA | 70:30 | 34 | 2.1 | 23,590 | 11,300 |
| AA | tCHDM:2HBA | 70:30 | 114 | 2.1 | 37,570 | 17,990 |
| AB | HD:2HBA (1.01 DETOSU/diol molar ratio) | 70:30 | 56 | 1.6 | 49,510 | 30,560 |
| AC | TEG:tCHDM:PEB | 35:55:10 | 53 | 1.8 | 22,280 | 12,320 |
| AD | TEG:tCHDM:PEB | 45:25:30 | 57 | 1.4 | 45,850 | 33,240 |

Example 3

Orthoester Monomeric Compounds as Models for Hydrolysis Kinetics

The reactivity of an orthoester linkage in a monomeric compound has been reported to be comparable to the reactivity of orthoester linkages in a polymer chain. See, for example, Nguyen, et al., *J. of Pharmaceutical Sciences*, 73:1563-1568 (1984). Monomeric compounds of the formula (Formula VIII)

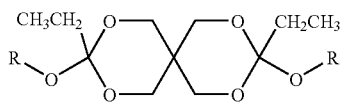

having orthoester linkages were prepared to determine the hydrolysis kinetics by reacting an alcohol of the formula ROH with DETOSU. The following procedure was used to prepare a compound of the formula (Formula VIII), where each R is butyl.

A 100 mL round-bottomed flask, stir bar, and glass stopper were dried at 110° C. in an oven. In a nitrogen-atmosphere glovebox, 0.55 g DETOSU (0.00259 mol) and 0.35 g 1-butanol (0.00521 mol) were added. A 10% solids solution by weight was created with hexanes. The reaction flask was sealed, taken out of the glovebox, and set up with a condenser, oil bath, and nitrogen purge inside a hood. The solution was stirred magnetically while refluxing for eighteen hours. The hexanes were subsequently removed by rotary-evaporation and the structure was confirmed by $^1$H NMR (CDCl3): δ 0.92 (m), 1.42 (m), 1.48 (m), 1.59 (m), 1.73 (m), 3.27 (d), 3.38 (m), 3.71 (d), 3.86 (d), 4.16 (d).

Using similar procedures, monomeric compounds of the formula (Formula VIII) were prepared in which each R is methyl; $(CH_3)_3CCH_2$— (neopentyl); $CH_3CH_2OC(O)CH_2$— (ethyl glycolate); $CH_3CH_2OC(O)CH(CH_3)$— (ethyl (S)—(−) lactate); phenyl, benzyl, 3-methoxyphenyl; and 3-methylphenyl.

The hydrolysis kinetics for each compound was then measured by nuclear magnetic resonance (NMR) spectroscopy. Inside a nitrogen-atmosphere glovebox, 50 mg monomeric compound was dissolved in 0.75 ml THF-d8. The solution was then transferred to an NMR tube and a baseline proton spectrum was acquired to characterize the monomeric compound. To begin the hydrolysis reaction, 46 microliters of a 3.4 M formic acid in $H_2O$ solution was added. The tube was then inverted several times to obtain a uniform solution. Proton spectra were acquired at set time intervals until most of the hydrolysis was complete. The time interval between spectra was adjusted as needed for the relative speed of each reaction. At least 9 individual spectra were acquired to characterize the hydrolysis rate. The formic acid singlet at 8.0 ppm was used as the internal standard and was integrated to 1. The formation of the hydrolysis product, pentaerythritol dipropionate (PDP), was monitored overtime by observing the quartet at 2.25 ppm. Additionally, the disappearance of the methyl protons of the starting compound at 0.88 ppm was monitored when possible. The integration of the peaks scaled to 2 protons was plotted versus time (in minutes) and the slopes of the resulting lines indicated the relative rate of hydrolysis. The absolute values of the slopes were averaged, and this was recorded as the relative rate of the hydrolysis reaction.

An example of the kinetics data is illustrated in FIG. 1 for the hydrolysis of the monomeric compound of the formula (Formula VIII), where each R is 3-methoxyphenyl showing the disappearance of the 3-methoxyphenol/DETOSU adduct (■) and the appearance of the hydrolysis product PDP (♦). The least squares line plotted for the disappearance of the 3-methoxyphenol/DETOSU adduct is represented by y=−0.54x+1.60 with $R^2$=0.97. The least squares line plotted for the appearance of the hydrolysis product PDP is represented by y=0.51x+1.35 with $R^2$=0.99.

Figure 2:
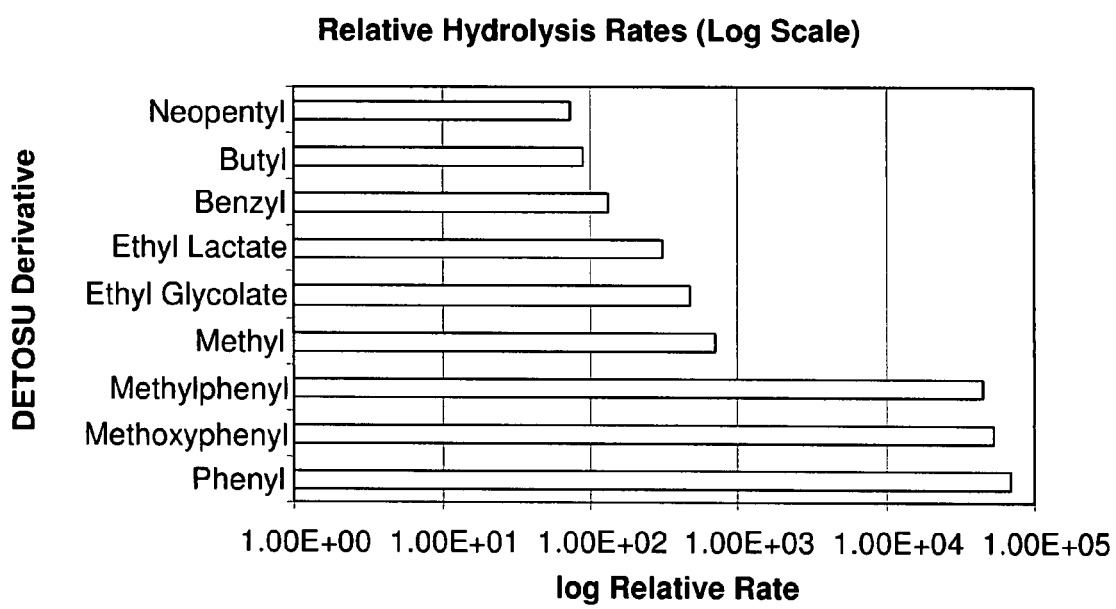
FIG. 2 is a graph illustrating the relative hydrolysis rates measured for hydrolysis of monomeric compounds of the formula (Formula VIII) as described in Example 3.

The relative hydrolysis rates of the monomeric compounds were plotted on a logarithmic scale and are shown in FIG. 2. The hydrolysis rates of the various monomeric compounds varied over 3 orders of magnitude. The phenolic orthoesters (e.g., phenyl, methylphenyl, and methoxyphenyl derivatives) hydrolyzed faster than the aliphatic derivatives (e.g., neopentyl, butyl, ethyl lactate, ethyl glycolate, and methyl derivatives). Shorter alkyl chains (e.g., methyl derivative) hydrolyzed faster than longer alkyl chains (e.g., butyl and neopentyl derivatives). The ester derivatives (e.g., ethyl lactate and ethyl glycolate derivatives) hydrolyzed faster than some of the aliphatic derivatives (e.g., neopentyl and butyl derivatives), but slower than the phenolic orthoesters (e.g., phenyl, methylphenyl, and methoxyphenyl derivatives).

The variation in the relative hydrolysis rates of the monomeric compounds tested suggests that the hydrolysis rates of poly(orthoester) polymers can be tuned by proper selection of structures (e.g., proper selection of diol used to prepare the poly(orthoester) polymer based on stearic and/or electronic properties of the diol).

Example 4

Hydrolysis of Poly(Orthoester) Polymers

Poly(orthoester) polymers were prepared by reacting the indicated hydroxy-containing compound(s) with DETOSU using methods similar to the general procedure described in Example 2. The following hydroxy-containing compounds were used to make the polymers listed in Table 2: trans-cyclohexanedimethanol (tCHDM; 98%, Fisher Scientific #AC40606); diethyl tartrate (DET; >99%, Aldrich #156841); and tetraethylene glycol (TEG; 99%, Aldrich #110175).

1%) to dry for 15 minutes. The shims were then heat annealed in a 220° C. oven for 10 minutes.

Pentoxyfylline (Sigma #022K1348) and Dexamethasone Acetate (Sigma #D1881) loaded films were prepared by first dissolving the drug in chloroform (Sigma 99.9% Biotech Grade) to yield a 1.0 wt % solution. The poly(orthoesters) polymers (POEs) were also dissolved in chloroform at 1.0 wt % solids. The solutions were mixed to obtain a 5:95 drug:POE ratio. The blended solution was pipetted (58 microliters) on top of the primer coat and allowed to dry using the same conditions as the primer coat.

In-Vitro Drug Release from Thin Films:

Dexamethasone acetate loaded POE films were incubated in 2.0 mL of PBS pH 7.4 with 10 wt % ethanol. Pentoxyfylline POE films were incubated in 2.0 mL of PBS pH 7.4. All samples were kept under constant agitation (20 revolutions per minute, rpm). Samples of the release medium were taken at various time points and the medium was refreshed after sampling. Concentrations were quantified by using a Hewlett-Packard Diode Array Spectrophotometer at 242 nm and 280 nm for dexamethasone acetate and pentoxyfylline, respectively.

Figure 3:
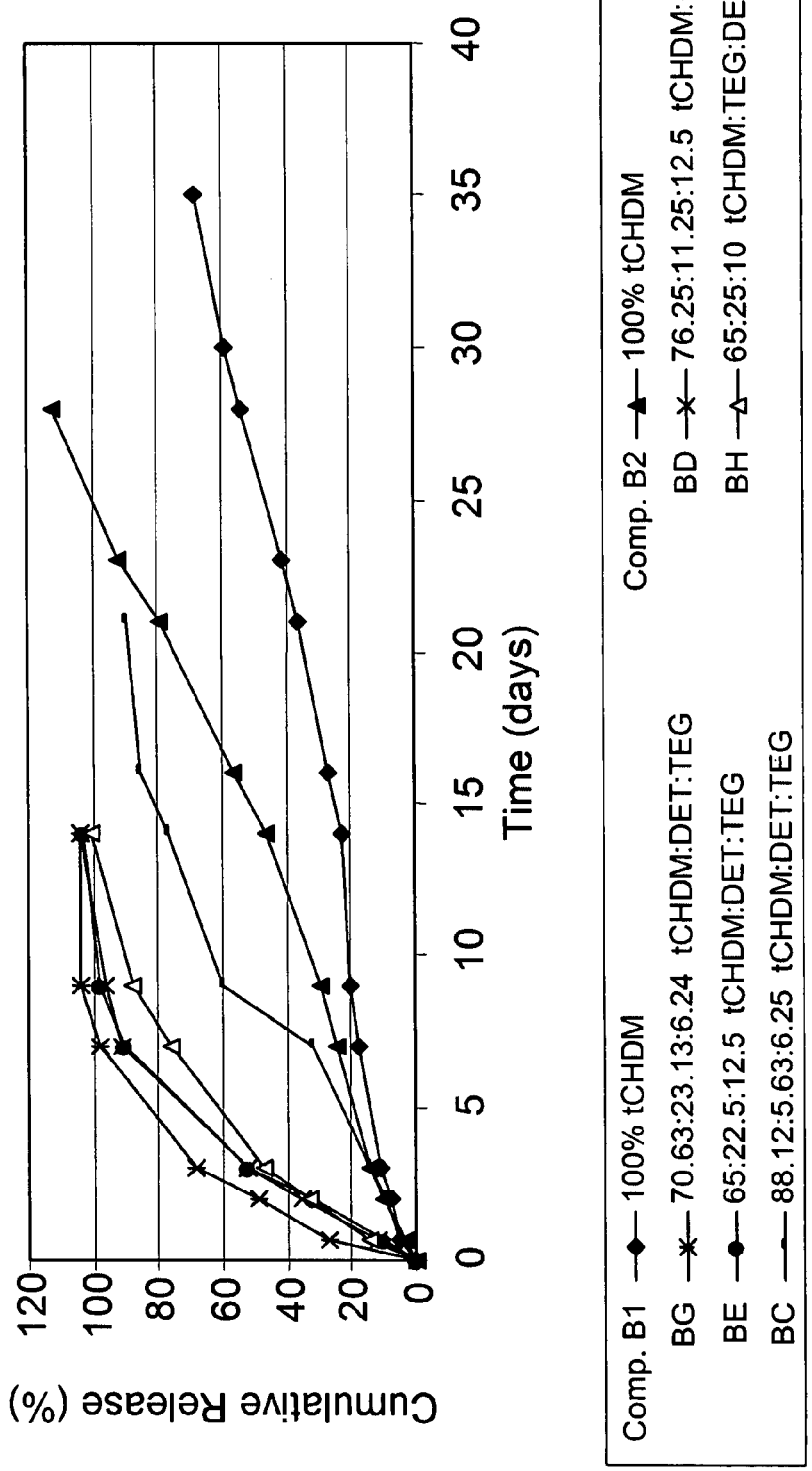
FIG. 3 is a graph illustrating the measured cumulative release of Pentoxyfylline from poly(orthoester) copolymers prepared from various amounts of diethyl tartrate (DET), tetraethyleneglycol (TEG), and/or trans-cyclohexanedimethanol (tCHDM) as described in Example 4.
Figure 4:
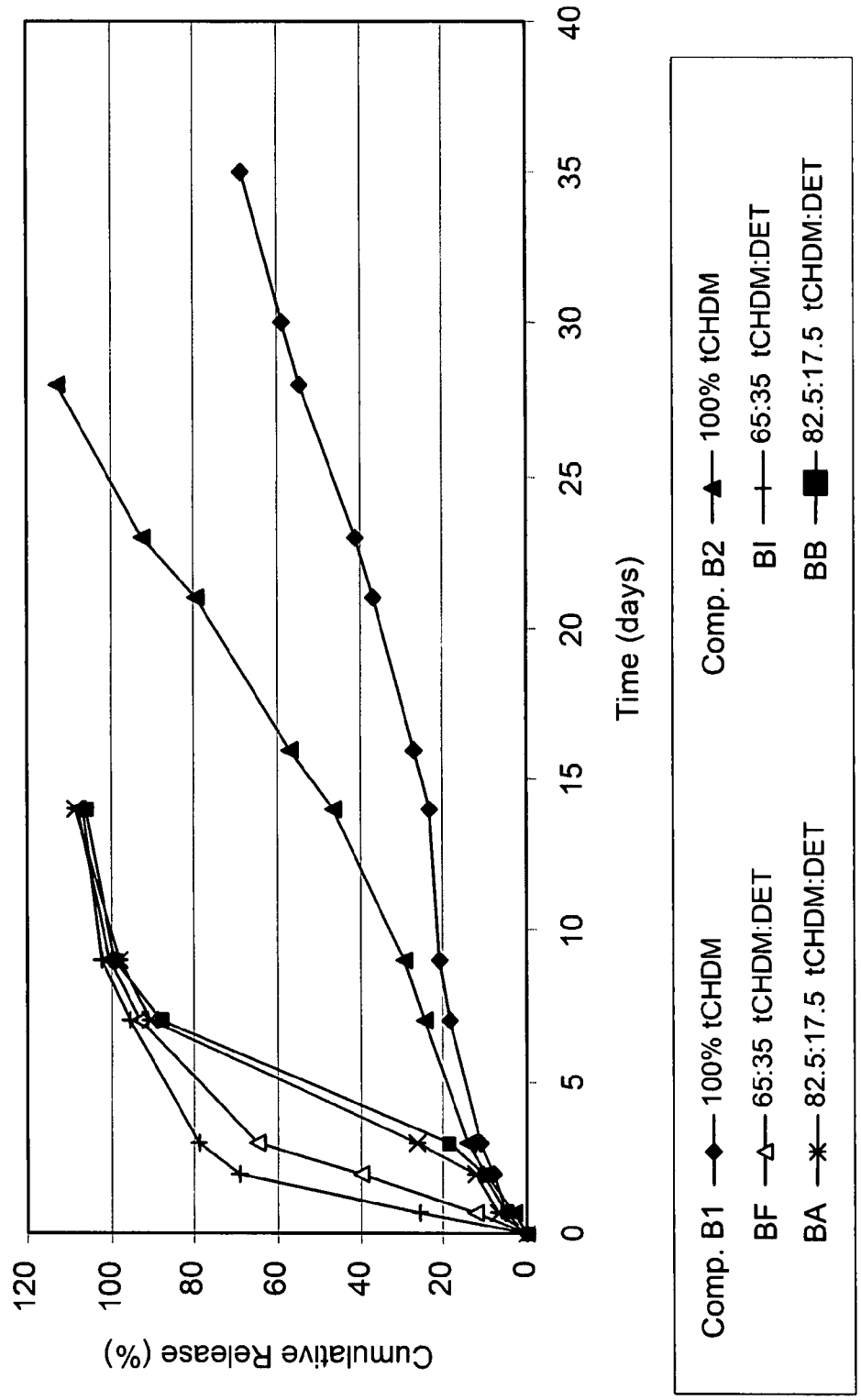
FIG. 4 is a graph illustrating the measured cumulative release of Pentoxyfylline from poly(orthoester) copolymers prepared from various amounts of diethyl tartrate (DET) and/or trans-cyclohexanedimethanol (tCHDM) as described in Example 4.

The Pentoxyfylline elution data is summarized in Table 3 and graphically illustrated in FIGS. 3 and 4. The data suggests that the diethyl tartrate (DET) can control the elution rate. Faster elution rates were observed for higher DET content in the polymer. The tetraethylene glycol (TEG) content was not observed to have a large effect on elution rate when present

TABLE 2

Poly(orthoester) Polymers prepared using various hydroxy-containing compounds.

| Polymer ID | Diol(s) | Molar Ratios | $T_g$ | PDI | $M_W$ | $M_N$ |
|---|---|---|---|---|---|---|
| BA | tCHDM:DET | 82.5:17.5 | 82 | 1.3 | 69,520 | 54,020 |
| BB | tCHDM:DET | 82.5:17.5 | 88 | 1.4 | 76,260 | 53,240 |
| BC | tCHDM:DET:TEG | 88.13:5.63:6.25 | 93 | 1.2 | 154,400 | 125,900 |
| BD | tCHDM:DET:TEG | 76.25:11.25:12.5 | 73 | 1.2 | 145,400 | 123,300 |
| BE | tCHDM:DET:TEG | 65:22.5:12.5 | 67 | 1.3 | 119,900 | 92,030 |
| BF | tCHDM:DET | 65:35 | 68 | 2.3 | 52,260 | 23,170 |
| BG | tCHDM:DET:TEG | 70.63:23.13:6.24 | 72 | 2.5 | 72,720 | 29,020 |
| BH | tCHDM:DET:TEG | 65:10:25 | 50 | 1.8 | 278,300 | 154,800 |
| BI | tCHDM:DET | 65:35 | 77 | 1.7 | 110,600 | 66,680 |
| Comp. B1 | tCHDM | 100 | 115 | 1.4 | 105,900 | 74,550 |
| Comp. B2 | tCHDM | 100 | 103 | 1.1 | 68,094 | 60,940 |
| Comp. B3 | tCHDM:TEG | 75:25 | 61 | 1.3 | 92,300 | 71,180 |
| Comp. B4 | tCHDM:TEG | 75:25 | 76 | 1.4 | 118,600 | 84,890 |
| Comp. B5 | tCHDM:TEG | 87.5:12.5 | 83 | 1.1 | 88,410 | 78,320 |

All of the diols had a statistically significant effect on the resulting $T_g$. The formula describing the relationship between mole percent diol and Tg is:

$$Tg = +1.07 * tCHDM + 0.04 * DET - 0.59 * TEG$$

with the ratios of tCHDM, DET, and TEG in mole percent.

Preparation of Drug Loaded Thin Films:

Drug loaded thin films were prepared by solvent casting a polymer/drug solution onto a primed 1 square cm stainless steel shim. The primer coat was obtained by dissolving a medical grade polyurethane available under the trade designation Tecothane 75D from Thermedics Polymer Products (Wilmington, Mass.; Lot No. 11544-16-7) in tetrahydrofuran (THF, Sigma Aldrich 99.9% anhydrous) to yield a 0.5 wt % solution. Using a micropipettor, 40 microliters of the dissolved solution was pipetted on one side of the shim and placed in a nitrogen glove box (relative humidity less than with DET. However, for polymers without DET, a slight increase in elution rate was observed by including TEG.

TABLE 3

Summary of Pentoxyfylline Elution Data.

| Polymer ID | % TEG (molar) | % DET (molar) | 0-3 Day Pentoxyfylline Release (cumulative %) | 3-9 Day Pentoxyfylline Release (cumulative %) |
|---|---|---|---|---|
| BA | 0 | 17.5 | 27 | 71 |
| BB | 0 | 17.5 | 18 | 81 |
| BC | 6.25 | 5.63 | 15 | 45 |
| BD | 12.5 | 11.25 | 52 | 44 |
| BE | 12.5 | 22.5 | 53 | 45 |
| BF | 0 | 35 | 65 | 35 |
| BG | 6.24 | 23.13 | 68 | 36 |
| BH | 25 | 10 | 47 | 41 |
| BI | 0 | 35 | 79 | 23 |

TABLE 3-continued

Summary of Pentoxyfylline Elution Data.

| Polymer ID | % TEG (molar) | % DET (molar) | 0-3 Day Pentoxyfylline Release (cumulative %) | 3-9 Day Pentoxyfylline Release (cumulative %) |
|---|---|---|---|---|
| Comp. B1 | 0 | 0 | 11 | 9 |
| Comp. B2 | 0 | 0 | 14 | 15 |
| Comp. B3 | 25 | 0 | 14 | 75 |
| Comp. B4 | 25 | 0 | 22 | 41 |
| Comp. B5 | 12.5 | 0 | 13 | 25 |

Figure 5:
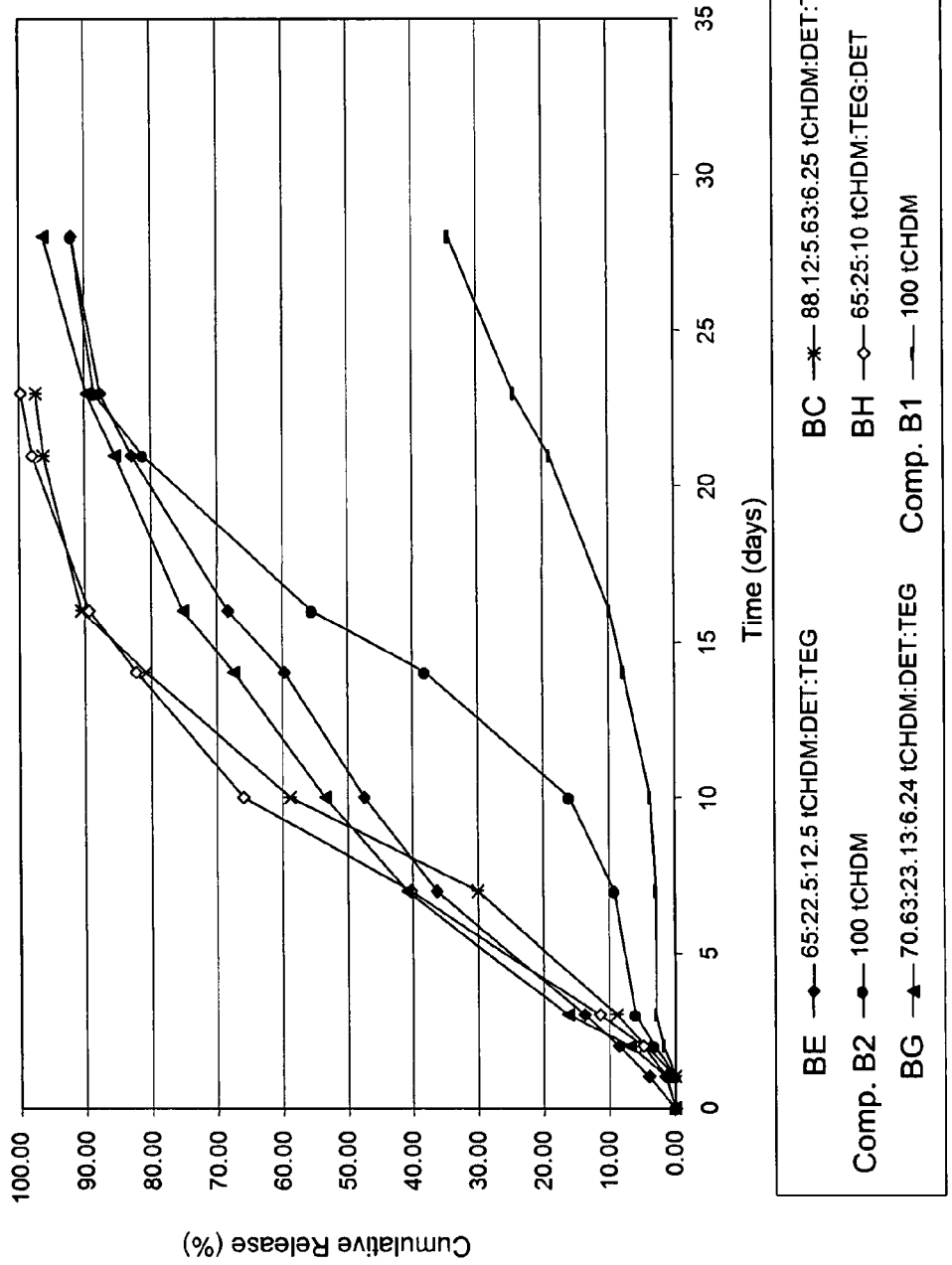
FIG. 5 is a graph illustrating the measured cumulative release of Dexamethasone from poly(orthoester) copolymers prepared from various amounts of diethyl tartrate (DET), tetraethyleneglycol (TEG), and/or trans-cyclohexanedimethanol (tCHDM) as described in Example 4.
Figure 6:
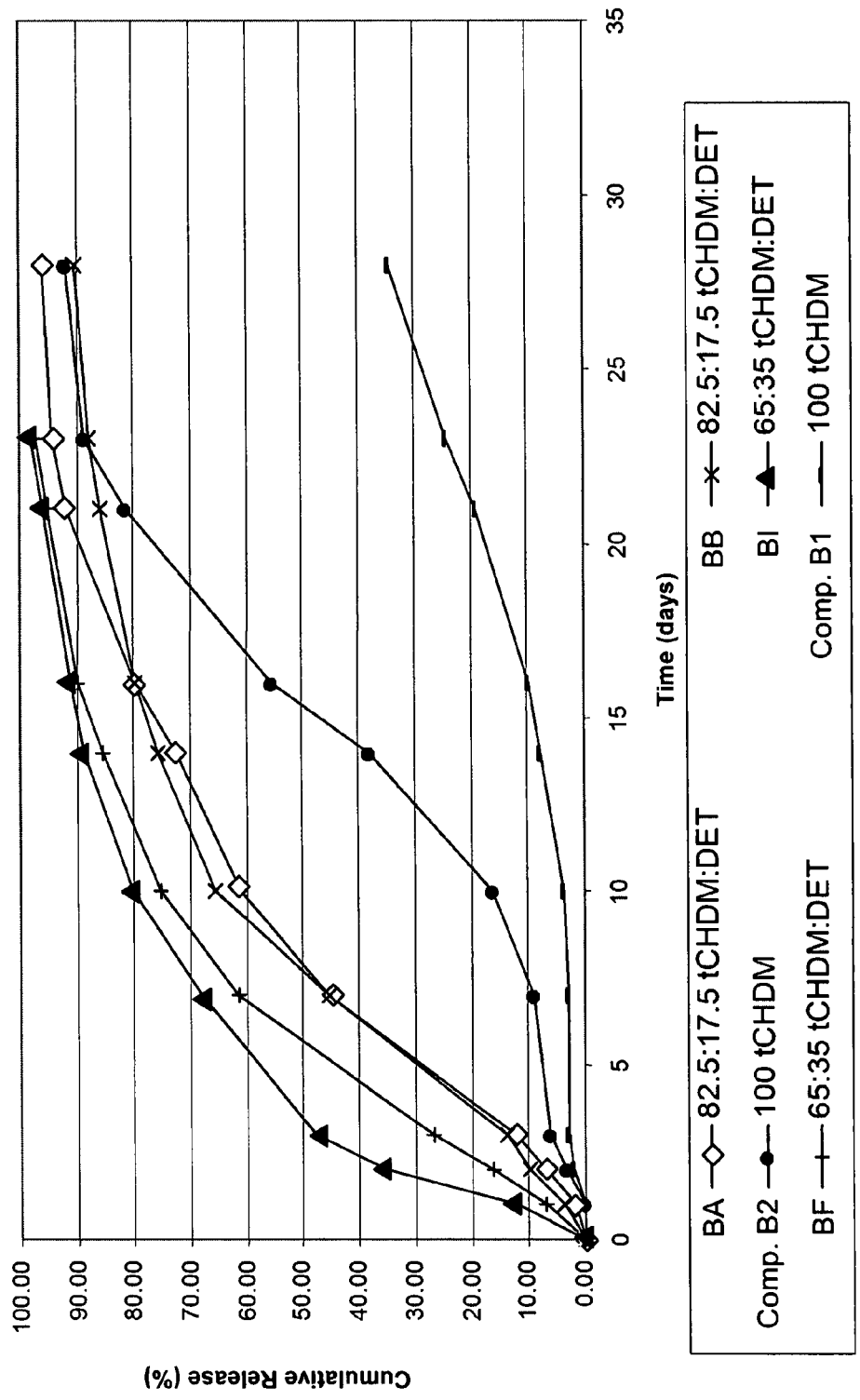
FIG. 6 is a graph illustrating the measured cumulative release of Dexamethasone from poly(orthoester) copolymers prepared from various amounts of diethyl tartrate (DET) and/or trans-cyclohexanedimethanol (tCHDM) as described in Example 4.

The Dexamethasone acetate elution data is summarized in Table 4 and graphically illustrated in FIGS. 5 and 6. The 0-3 day release data suggests that the diethyltartrate (DET) can control the elution rate. Faster elution rates were observed for higher DET content in the polymer. The tetraethylene glycol (TEG) content was not observed to have a large effect on the 0-3 day release data when present with DET. The 3-9 day release data suggests that the 3 component system can have higher elution rates, and the rates were fairly linear throughout the entire testing period.

TABLE 4

Summary of Dexamethasone Acetate Elution Data.

| Polymer ID | % TEG (molar) | % DET (molar) | 0-3 Day Dexamethasone Acetate Release (cumulative %/day) | 3-10 Day Dexamethasone Acetate Release (cumulative %/day) |
|---|---|---|---|---|
| BA | 0 | 17.5 | 12 | 49 |
| BB | 0 | 17.5 | 14 | 51 |
| BC | 6.25 | 5.63 | 9 | 50 |
| BD | 12.5 | 11.25 | 8 | 38 |
| BE | 12.5 | 22.5 | 14 | 33 |
| BF | 0 | 35 | 27 | 49 |
| BG | 6.24 | 23.13 | 16 | 37 |
| BH | 25 | 10 | 11 | 66 |
| BI | 0 | 35 | 48 | 32 |
| Comp. B1 | 0 | 0 | 3 | 1 |
| Comp. B2 | 0 | 0 | 6 | 10 |
| Comp. B3 | 25 | 0 | 3 | 23 |
| Comp. B4 | 25 | 0 | 5 | 16 |
| Comp. B5 | 12.5 | 0 | 5 | 5 |

Degradation Study:

Test Sample Preparation. The raw polymer samples were pressure-molded into test samples, which were oval in shape with the following dimensions: 25 mm×7 mm×1 mm. The approximate weight of the test samples was 260 mg.

A sample of the pressed material was tested by gel permeation chromatography (GPC) to characterize any changes that occurred with molecular weight due to heat processing. These molecular weights were recorded as the "time zero" molecular weight for the hydrolysis study. Each pressed sample was weighed to determine its starting weight (to 4 decimal places). This weight was used to calculate the percent mass loss at the sample's endpoint.

Hydrolysis Procedure: A buffered solution of 50 mM Trizma HCl Buffer was prepared and the pH was adjusted to 7.4 with KOH. Four mL of the buffer solution were pipetted into Falcon 5 mL (12×75 mm) polypropylene round-bottomed centrifuge tubes. The pressed polymer samples were added to the tubes, which were then capped and placed in a 37° C. incubator and gently agitated. Using a fine-tip tweezers, the polymer samples were taken out of the test buffer and transferred to fresh 37° C. buffer on the following days: 1, 3, 5, 7, 9, 10, 12, 14, 16, 18, 21, 23, 25, 28, 30, 35, 39, 45, 51, 59, 66, 73, and 80. The study was terminated on day 87, when one of the test samples was no longer able to be removed without breaking into pieces. The buffer solutions at each time-point were reserved for a GC/MS experiment to detect the hydrolysis product, tCHDM. However, difficulties in detecting this compound prevented that analysis. The solid polymer samples remaining at the end of the experiment were dried down under full vacuum at 45° C. for 4 nights. The dry weights were obtained for each sample and GPC analysis was performed to determine final molecular weights.

Degradation Test Results: Table 5 shows the composition of each polymer, the starting mass, ending mass, and % mass change after 87 days hydrolysis.

TABLE 5

Degradation of poly(orthoester) polymers.

| Polymer ID | % tCHDM (molar) | % DET (molar) | % TEG (molar) | Start (dry) (mg) | End (Dry) (mg) | % Mass Change |
|---|---|---|---|---|---|---|
| BA | 82.5 | 17.5 | 0 | 172.6 | 6 | −96.5 |
| BB | 82.5 | 17.5 | 0 | 202.1 | 17 | −91.6 |
| BC | 88.13 | 5.63 | 6.25 | 215.3 | 32 | −85.1 |
| BD | 76.25 | 11.25 | 12.5 | 175.7 | 41 | −76.7 |
| BE | 65 | 22.5 | 12.5 | 174.1 | 12 | −93.1 |
| Comp. B2 | 100 | 0 | 0 | 177.9 | 47 | −73.6 |
| Comp. B3 | 75 | 0 | 25 | 198.3 | 92 | −53.6 |
| Comp. B5 | 87.5 | 0 | 12.5 | 190.9 | 121 | −36.6 |

Figure 7:
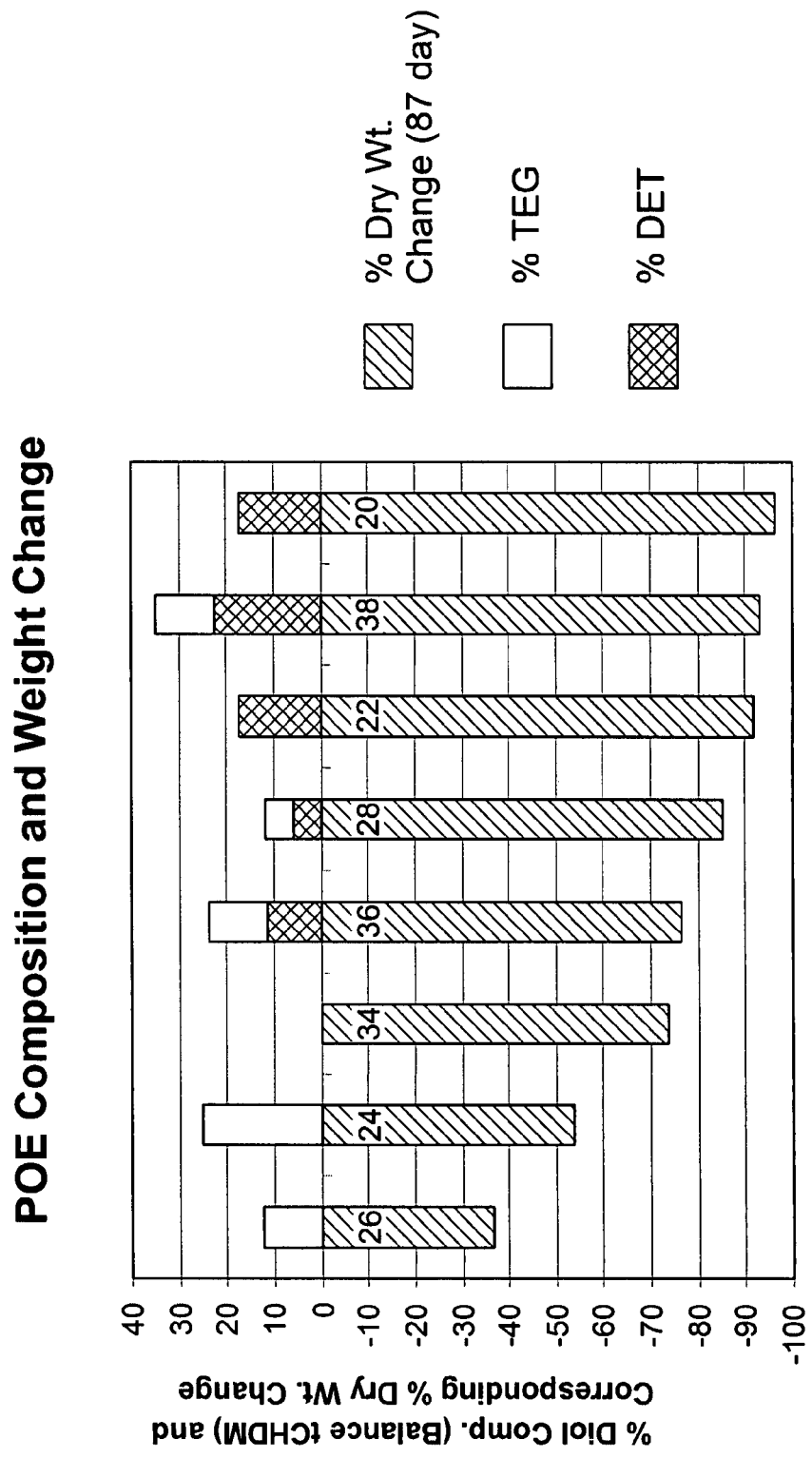
FIG. 7 is a graph illustrating the percent total mass loss after 87 days of hydrolysis for poly(orthoester) copolymers prepared from various amounts of diethyl tartrate (DET), tetraethyleneglycol (TEG), and/or trans-cyclohexanedimethanol (tCHDM) as described in Example 4.

FIG. 7 shows the mole percent diethyl tartrate (DET) and tetraethyleneglycol (TEG) in each polymer, and the corresponding percent total mass loss after 87 days of hydrolysis. Comparative Polymer B2 was the tCHDM homopolymer control sample. All of the polymers with diethyl tartarte lost more mass than the tCHDM control polymer.

Table 6 shows the GPC results for the raw polymer material, pressed material, and the remaining bulk polymer after 87 days of hydrolysis.

TABLE 6

Poly(orthoester) polymer hydrolysis.

| Polymer ID | Diol Composition | | | Raw Material | | Pressed samples | | After hydrolysis study | |
|---|---|---|---|---|---|---|---|---|---|
| | % tCHDM (molar) | % DET (molar) | % TEG (molar) | Start MW | Start $M_N$ | $M_W$ (molded) | $M_N$ (molded) | End $M_W$ | End $M_N$ |
| BA | 82.5 | 17.5 | 0 | 69520 | 54020 | 49350 | 30250 | 13390 | 5054 |
| BB | 82.5 | 17.5 | 0 | 76260 | 53240 | 39230 | 23310 | 13830 | 5860 |
| BC | 88.13 | 5.63 | 6.25 | 154400 | 125900 | 95400 | 77600 | 30850 | 11520 |

TABLE 6-continued

Poly(orthoester) polymer hydrolysis.

| Polymer ID | Diol Composition | | | Raw Material | | Pressed samples | | After hydrolysis study | |
|---|---|---|---|---|---|---|---|---|---|
| | % tCHDM (molar) | % DET (molar) | % TEG (molar) | Start MW | Start $M_N$ | $M_W$ (molded) | $M_N$ (molded) | End $M_W$ | End $M_N$ |
| BD | 76.25 | 11.25 | 12.5 | 145400 | 123300 | 85800 | 55720 | 21510 | 7565 |
| BE | 65 | 22.5 | 12.5 | 119900 | 92030 | 54850 | 34740 | 13270 | 5094 |
| Comp. B2 | 100 | 0 | 0 | 68670 | 60940 | 62520 | 49070 | 32950 | 16650 |
| Comp. B3 | 75 | 0 | 25 | 92300 | 71180 | 82450 | 64640 | 41350 | 14610 |
| Comp. B5 | 87.5 | 0 | 12.5 | 88410 | 78320 | 85040 | 63490 | 53060 | 34130 |

The polymers containing diethyl tartrate had a greater decrease in $M_w$ than the control tCHDM homopolymer, both after heat pressing and 87 days of hydrolysis.

Figure 8:
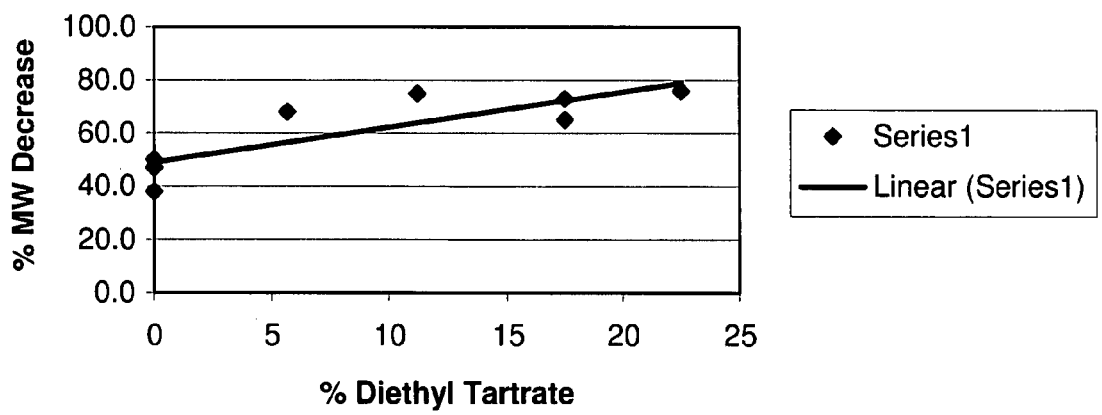
FIGS. 8 and 9 graphically illustrate the relationship between % $M_w$ decrease and mole % diethyl tartate and mole % TEG content, respectively, for the hydrolysis of poly (orthoester) copolymers as described in Example 4.
Figure 9:
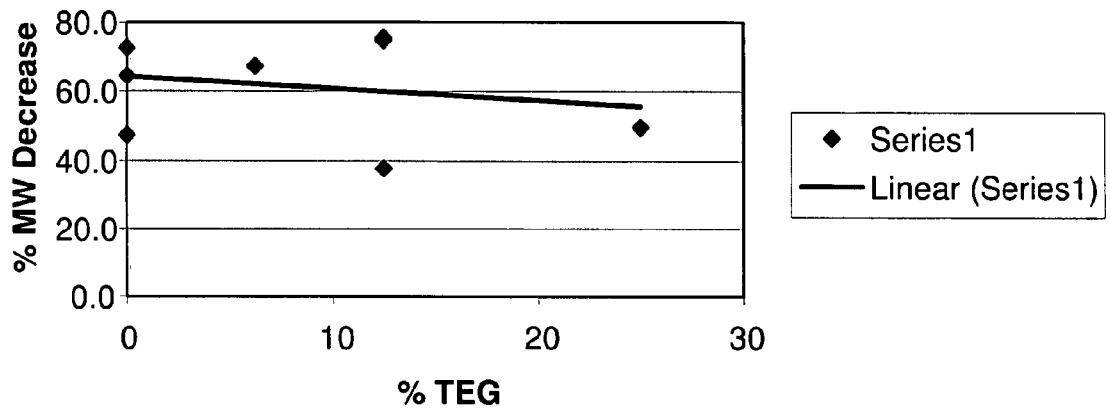

FIGS. 8 and 9 show the relationship between % $M_w$ decrease and mole % diethyl tartate (y=1.32x+49 with $R^2$=0.70) and mole % TEG (y=−0.36x+64 with $R^2$=0.05) in the poly(orthoester) polymers, respectively. The R-squared values indicate that 70% of the variability in the data can be explained by the effect of diethyl tartrate, while substantially none of the variability in the data can be explained by the effect of TEG.

Figure 10:
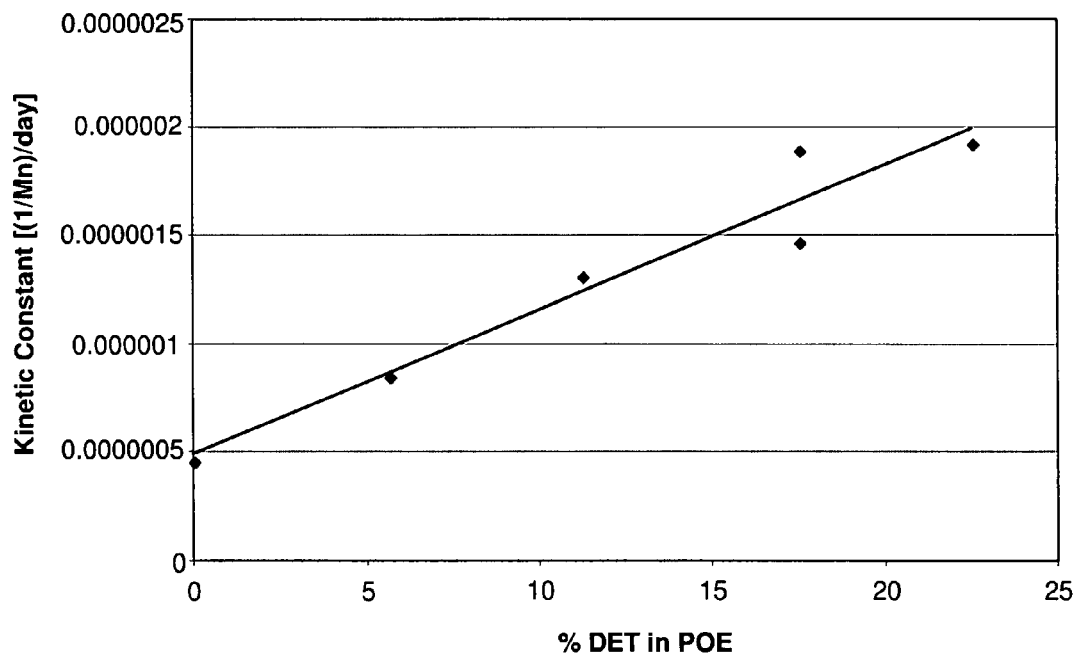
FIG. 10 is a graph showing the kinetic constant for hydrolysis plotted versus the mole percent of diethyl tartrate for poly(orthoester) polymers as described in Example 4.

Kinetic Constant of Hydrolysis: The kinetic constant of hydrolysis was calculated for each polymer composition using the starting number average molecular weight (Mn) and the Mn of the bulk polymer sample after 87 days hydrolysis. See, for example, Lyu et al., *J. of Polymer Science, Part B: Polymer Physics*, 43:383-397 (2005). The kinetic constant is equal to the slope of the line from a graph of 1/$M_N$ versus time. In this case, Kinetic constant=[1/$Mn$(end)−1/$Mn$(start)]/87 days The kinetic constant was then plotted versus the mole percent of diethyl tartrate in the polymer as shown in FIG. 10. The observed kinetic constant correlates well with the amount of diethyl tartrate in the polymer (R-squared=0.94). The kinetic constant increased by one order of magnitude over the range of diethyl tartrate studied.

Example 5

Drug Release from Poly(Orthoester) Homopolymers

Poly(orthoester) homopolymers were prepared by reacting the indicated hydroxy-containing compound(s) with DETOSU using methods similar to the general procedure described in Example 2. The following hydroxy-containing compounds were used to make the homopolymers shown in Table 7: 1,6-hexanediol, 2,5-hexanediol, 1,4-butanediol, and 1,3-propanediol.

TABLE 7

Poly(orthoester) Homopolymers.

| Polymer ID | Diol(s) | Molar Ratio | $T_g$ | PDI | $M_W$ | $M_N$ |
|---|---|---|---|---|---|---|
| CA | 1,6-hexanediol | 100 | 25 | 1.3 | 76,120 | 60,750 |
| CB | 1,4-butanediol | 100 | 38 | 1.6 | 42,590 | 27,470 |
| CC | 1,3-propanediol | 100 | 48 | 1.6 | 66,210 | 40,750 |
| CD | 2,5-hexanediol | 100 | 37 | 1.9 | 58,690 | 31,230 |

Preparation of Drug Loaded Thin Films: Dexamethasone (Sigma #81K11001) loaded films were prepared by dissolving the drug in tetrahydrofuran (THF Sigma #186562) to yield a 1.5 wt % solution. The poly(orthoester) polymers (POEs) were dissolved in THF at the same wt % as the drug and blended together for a 5:95 dexamethsone:POE ratio. Then, 65 microliters of the drug/polymer solution was pipetted on top of a 1 square centimeter stainless steel shim and allowed to dry.

In-Vitro Drug Release from Thin Films: Dexamethasone loaded POE films were incubated in 2.0 mL of PBS pH 7.4 at 37° C. All samples were kept under constant agitation (20 revolutions per minute, rpm). Samples of the release medium were taken at various time points and the medium was refreshed after sampling. Concentrations were quantified by using a Hewlett-Packard Diode Array Spectrophotometer at 242 nm.

Figure 11:
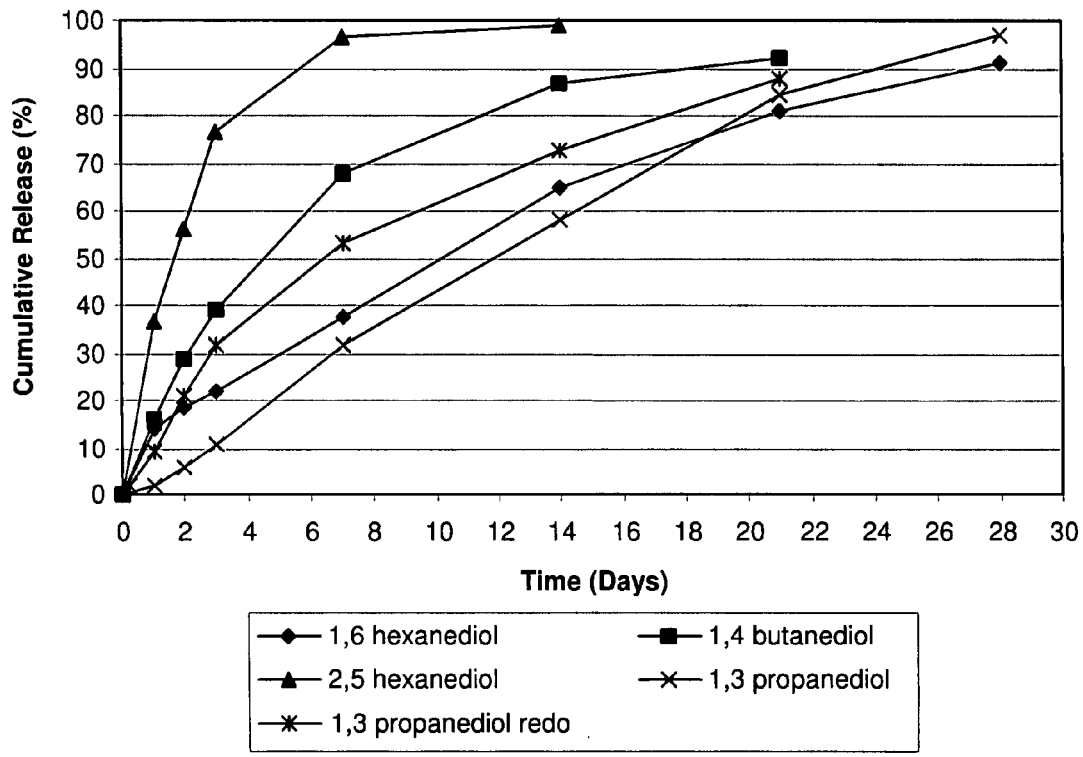
FIG. 11 is a graphical representation of the release of Dexamethasone from poly(orthoester) homopolymers as described in Example 5.

Results for release of Dexamethasone from poly(orthoester) homopolymers are shown in FIG. 11. The variation in the rate of Dexamethasone release for poly(orthoesters) prepared from the different diols suggests that the hydrolysis rates of poly(orthoester) polymers can be tuned by proper selection of diols. For example, shorter chain diols (e.g., 1,4-butanediol) can show higher release rates for Dexamethasone (which can be indicative of higher hydrolysis rates) than longer chain diols (e.g., 1,6-hexanediol), although the Dexamethasone release rates observed for two experiments using 1,3-propanediol were scattered (i.e., one faster and one slower than 1,6-hexanediol). For another example, secondary diols (e.g., 2,5-hexanediol) can show higher release rates for Dexamethasone (which can be indicative of higher hydrolysis rates) than primary diols (e.g., 1,4-butanediol and/or 1,6-hexanediol).

Example 6

Degradation Study of Poly(Orthoester) Polymers

Poly(orthoester) polymers were prepared by reacting the indicated hydroxy-containing compound(s) with DETOSU using methods similar to the general procedure described in Example 2. The following hydroxy-containing compounds were used to make the polymers listed in Table 8: trans-cyclohexanedimethanol (tCHDM; 98%, Fisher Scientific #AC40606) and diethyl tartrate (DET; >99%, Aldrich #156841). The percentages listed in Table 8 are mole percentages of the total diol. The polymer composition was determined by NMR spectroscopy.

TABLE 8

Poly(orthoester) Polymers prepared using two hydroxy-containing compounds.

| Polymer ID | Feed | | Polymer | | Polymer Properties | | |
|---|---|---|---|---|---|---|---|
| | % TCHDM (molar) | % DET (molar) | % TCHDM (molar) | % DET (molar) | Tg (° C.) | $M_w$ | $M_n$ |
| 12811-74 | 70 | 30 | 70.7 | 29.3 | 96 | 62,660 | 38,750 |
| 12811-76 | 80 | 20 | 81.0 | 19.0 | 103 | 80,440 | 49,340 |
| 12811-78 | 80 | 20 | 80.3 | 19.7 | 101 | 80,640 | 55,020 |
| 12811-80 | 90 | 10 | 91.3 | 8.7 | 109 | 112,000 | 86,660 |
| 12811-82 | 99 | 1 | 99.1 | 0.9 | 118 | 65,810 | 51,440 |
| 12811-84 | 70 | 30 | 70.7 | 29.3 | 92 | 107,300 | 83,650 |
| 12811-86 | 95 | 5 | 94.8 | 5.2 | 118 | 208,700 | 163,200 |
| 12811-88 | 100 | 0 | 100.0 | 0.0 | 109 | 76,830 | 64,320 |
| 12811-90 | 90 | 10 | 90.0 | 10.0 | 108 | 147,400 | 121,400 |
| 12924-69 | 70 | 30 | 69.4 | 30.6 | 97 | 52,920 | 35,950 |
| 12924-71 | 75 | 25 | 74.3 | 25.7 | 103 | 42,710 | 27,500 |
| 12924-73 | 75 | 25 | 74.3 | 25.7 | 97 | 51,050 | 35,200 |
| 12924-75 | 80 | 20 | 80.6 | 19.4 | 91 | 43,540 | 31,860 |
| 12924-77 | 85 | 15 | 85.5 | 14.5 | 97 | 70,400 | 51,850 |
| 12924-79 | 85 | 15 | 85.8 | 14.2 | 96 | 64,370 | 49,010 |

Test Samples:

The shape of the test samples was oval with the following dimensions: 25 mm×7 mm×1 mm. The oval shape was chosen to fit vertically in a test tube. The dimensions gave a high ratio of length compared to thickness, so that the surface area of the side (approximately 64 mm$^2$) was much less than the surface area of the oval surfaces (approximately 350 mm$^2$). This way, the majority of degradation (approximately 85%) occurred on surfaces that maintained a constant surface area, minimizing the effects of sample geometry on hydrolysis rates. The approximate weight of the test samples was 260 mg.

Sixteen molded samples were made for each polymer composition. Three samples were pressed at a time. All of the samples were molded at a temperature that was 60° C. above the glass transition temperature (Tg). The press was preheated to the molding temp and allowed to equilibrate for 30 minutes. The amount of polymer used varied due to differences in polymer consistency. The mold was placed between 2 release sheets of woven glass fibers coated with polytetrafluoroethylene (PTFE), with the polymer piled over the mold cavity. The platens were then moved together until they just contacted both release sheets and were allowed to preheat for 1 minute. The platens were then slowly compressed until 5000 pounds per square inch (psi) was reached and then left at that pressure for 1 minute. The platens were then opened and the release sheets with the molded material still between them were removed from the press and placed on a flat surface and a heavy metal heat sink plate was applied until cool (about 3 minutes). The sample was then removed from the mold.

Some of the molded material (cut from around test samples) was tested by GPC to characterize any changes that occurred with molecular weight due to heat processing. This was recorded as the "time zero" molecular weight for the hydrolysis study. Each pressed sample was weighed to determine its starting weight (to 4 decimal places). This weight was used to calculate the percent mass loss at the sample's endpoint.

Test Setup:

Sixteen pressed test samples for each polymer composition were immersed individually in 4 ml PBS buffer, pH 7.4, in a 5 ml test tube. The samples were gently agitated at 50 RPM in a 37° C. incubator.

At each pre-determined time-point, one of the test samples for each polymer composition was taken out of the buffer solution and placed in a weighed glass vial. The samples were dried for at least 72 hours in a vacuum oven, at full vacuum and 40° C.

Sampling Schedule:

Samples were taken every other weekday for the first two weeks. The samples were pulled once a week for the remainder of the experiment (or as needed). The samples remaining on test were transferred into fresh buffer solutions every week. The total duration of the experiment was 91 days. After drying, the test samples were weighed with a 4 decimal place balance to determine % mass loss, and one half of the sample was tested by GPC in THF to determine the weight average molecular weight ($M_w$), number average molecular weight ($M_n$), and polydispersity index (PDI).

Gel Permeation Chromatography (GPC) Method:

The GPC was composed of an Agilent 1100 with a dual piston pump, vacuum degasser, pulse dampener, autosampler, and a column heating chamber. The GPC columns used for separation consisted of one 10$^3$ Å and one 50 Å (Phenogel, 5 micrometers, 300 mm×7.5 mm) connected in series and maintained at 40° C. HPLC grade tetrahydrofuran was the mobile phase at a flow rate of 0.7 ml/minute. Sample detectors consisted of an 18-angle light-scattering detector (Wyatt Dawn EOS) in series with a differential refractive index detector (Wyatt Optilab DSP). Sample preparation was performed by dissolving the polymer in tetrahydrofuran at a concentration between 10 and 15 mg/ml. After dissolution, the samples were filtered through a 0.45µ PTFE syringe filter and collected in a HPLC vial for analysis. Molecular weights were determined using ASTRA software version 5.3 with a first order Debye model. Refractive index increment values (dn/dc) were measured by injecting a known concentration of polymer and assuming 100% mass recovery from the GPC system. For a given polymer lot approximately 5 samples at various time points throughout the hydrolysis study were prepared at a known concentration and the dn/dc values were determined. The dn/dc values were then averaged between the samples and all of the samples were re-analyzed with the averaged dn/dc value, assuming that the dn/dc value does not change with molecular weight in the range of interest.

Characterization of Pressed Samples:

All of the polymers had a decrease in molecular weight due to heat pressing. The tCHDM control POE had a 24% decrease of $M_w$. All of the polymers containing diethyl tartrate had a larger decrease in $M_w$, but there was no correlation of percent $M_w$ decrease to increasing mole percent diethyl tartrate in the polymer.

The polymers with the highest starting molecular weight tended to have the largest decrease in $M_w$ due to pressing, making the pressed polymers more comparable. The average molecular weight of all the polymers before pressing was 86,000 (i.e., 86K) with a 44K standard deviation. After pressing, the average molecular weight of all the polymers was 40K, with a 13K standard deviation. Table 9 lists the weight average molecular weights ($M_w$) before and after pressing, percent $M_w$ change upon pressing for each polymer composition, and calculated averages and standard deviations. The minimum molecular weight after pressing was 26,800 g/mol and the maximum was 68,380 g/mol. No correlation was observed between the actual pressed weight average molecular weights ($M_w$) and the mole % DET. The replicates for polymers with 10 and 20 mole % DET had slightly different molecular weights, and so this was examined to see if this had an effect on degradation rate (described in "Effect of Molecular Weight" section).

TABLE 9

Molecular Weight Measurements.

| Polymer ID | % DET (molar) | Pre-pressing $M_w$ | Post-pressing $M_w$ | % $M_w$ Loss on Pressing |
|---|---|---|---|---|
| 12811-74 | 30 | 62660 | 36460 | 41.8 |
| 12811-76 | 20 | 80440 | 50920 | 36.7 |
| 12811-78 | 20 | 80640 | 39790 | 50.7 |
| 12811-80 | 10 | 112000 | 68380 | 38.9 |
| 12811-82 | 1 | 65810 | 38950 | 40.8 |
| 12811-84 | 30 | 107300 | 30140 | 71.9 |
| 12811-86 | 5 | 208700 | 55490 | 73.4 |
| 12811-88 | 0 | 76830 | 58630 | 23.7 |
| 12811-90 | 10 | 147400 | 45490 | 69.1 |
| 12924-69 | 30 | 52920 | 26800 | 49.4 |
| 12924-71 | 25 | 42710 | 30600 | 28.4 |
| 12924-73 | 25 | 51050 | 28300 | 44.6 |
| 12924-75 | 20 | 43540 | 28300 | 35.0 |
| 12924-77 | 15 | 70400 | 32500 | 53.8 |
| 12924-79 | 15 | 64370 | 28500 | 55.7 |
| Average |  | 85886 | 39950 | 47.6 |
| Std Dev. |  | 44496 | 13032 | 15.2 |

Degradation Study Results

Mass Loss:

The rate of percent mass loss had a trend to increase with more diethyl tartrate in the polymer composition, although there was variability between repeated polymer compositions. Table 10 shows the percent mass loss versus time for each polymer composition, with the % DET representing the mole percent of the total diol.

TABLE 10

Percent Mass Loss.

| | Polymer ID | | | | | | | |
|---|---|---|---|---|---|---|---|---|
| DET (%) | 12811-88 0 | 12811-82 1 | 12811-86 5 | 12811-90 10 | 12811-80 10 | 12924-77 15 | 12924-79 15 | 12811-76 20 |
| Day 1 | 0.1 | 0.1 | 0.0 | 0.1 | 0.1 | 0.1 | 0.0 | 1.8 |
| Day 4 | 0.1 | 0.1 | 0.3 | 0.2 | 1.6 | 0.6 | 0.1 | 20.5 |
| Day 6 | 0.1 | 0.3 | 1.3 | 0.4 | 4.9 | NT | NT | 29.3 |
| Day 7 | NT | NT | NT | NT | NT | 4.7 | 2.7 | NT |
| Day 8 | 0.1 | 0.3 | 3.9 | 0.8 | 8.3 | NT | NT | 60.9 |
| Day 10 | NT | NT | NT | NT | NT | 11.1 | 19.5 | NT |
| Day 11 | NT | NT | NT | NT | NT | 24.3 | 25.8 | NT |
| Day 13 | 0.1 | 0.4 | 36.4 | 8.5 | 6.0 | NT | NT | NT |
| Day 14 | NT | NT | NT | NT | NT | 33.0 | 65.8 | NT |
| Day 15 | 0.2 | 0.9 | 52.8 | 13.4 | 6.4 | 31.5 | 62.9 | D |
| Day 21 | 0.3 | 1.0 | 21.2 | 19.9 | 9.8 | NT | NT | |
| Day 28 | 0.3 | 1.3 | 35.7 | 60.7 | 26.1 | | | |
| Day 36 | 0.5 | 1.3 | 80.3 | 92.7 | 54.0 | | | |
| Day 43 | 1.0 | 5.5 | 92.5 | D | D | | | |
| Day 53 | 2.1 | 4.5 | D | | | | | |
| Day 57 | 2.1 | 6.5 | | | | | | |
| Day 78 | 5.1 | 61.9 | | | | | | |
| Day 81 | NT | 65.9 | | | | | | |
| Day 84 | 5.6 | 67.7 | | | | | | |
| Day 91 | 11.2 | D | | | | | | |

| | Polymer ID | | | | | | |
|---|---|---|---|---|---|---|---|
| DET (%) | 12811-78 20 | 12924-75 20 | 12924-71 25 | 12924-73 25 | 12811-74 30 | 12811-84 30 | 12924-69 30 |
| Day 1 | 0.4 | 0.4 | 0.1 | 0.0 | 1.3 | 1.0 | 0.1 |
| Day 4 | 11.0 | 0.2 | 9.2 | 0.7 | 12.4 | 0.4 | 0.6 |
| Day 6 | 48.4 | NT | NT | NT | 27.2 | NT | NT |
| Day 7 | NT | 1.4 | 34.0 | 16.7 | NT | NT | 5.3 |
| Day 8 | 63.5 | NT | 45.5 | NT | 22.2 | NT | NT |
| Day 10 | NT | 33.4 | 68.3 | 43.9 | NT | NT | 26.8 |
| Day 11 | NT | 17.9 | 66.2 | 52.0 | NT | NT | 52.9 |

TABLE 10-continued

Percent Mass Loss.

| Day 13 | 73.7 | NT | NT | NT | 50.8 | NT | NT |
|---|---|---|---|---|---|---|---|
| Day 14 | NT | 23.2 | D | 35.0 | NT | NT | 73.6 |
| Day 15 | D | 58.5 | | D | 43.2 | NT | NT |
| Day 21 | | NT | | | 79.0 | NT | |
| Day 28 | | | | | D | D | |
| Day 36 | | | | | | | |
| Day 43 | | | | | | | |
| Day 53 | | | | | | | |
| Day 57 | | | | | | | |
| Day 78 | | | | | | | |
| Day 81 | | | | | | | |
| Day 84 | | | | | | | |
| Day 91 | | | | | | | |

NT = not tested
D = degraded (test sample broke into pieces)

The % mass loss over time was plotted, and the mass loss rates were determined from the slope of the best fit line after the lag. The lag time was calculated from the x intercept of this line, and the polymer disappearance time was calculated by extrapolating the line to 100% mass loss.

Figure 12:
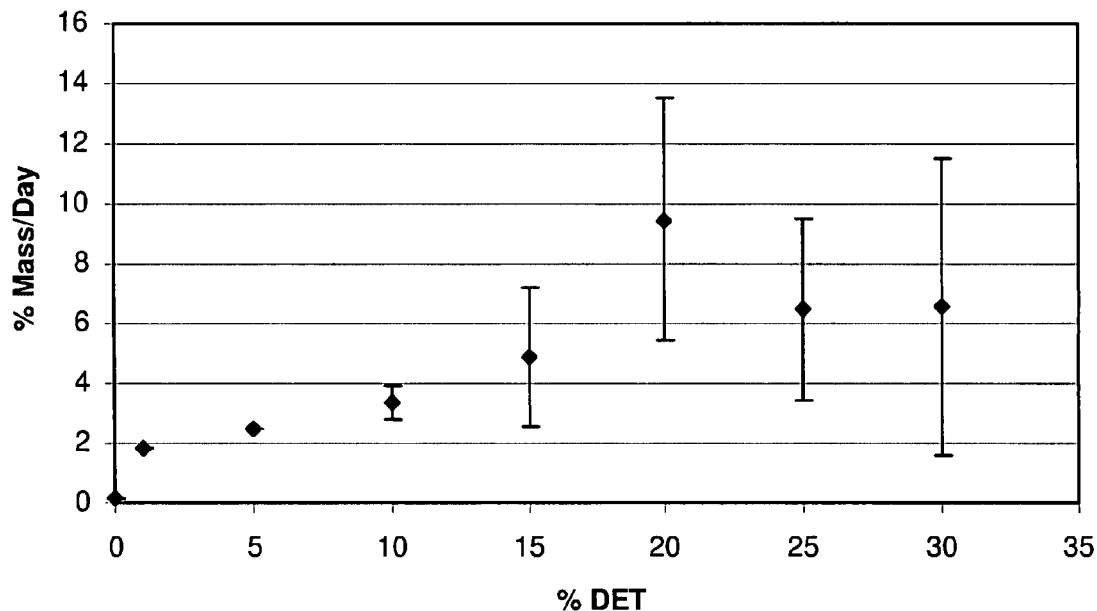
FIGS. 12-16 are graphical representations of the percent mass loss per day (FIG. 12), lag time in days to mass loss (FIG. 13), and days until 100% mass loss (FIGS. 14, 15, and 16) for polyorthoester polymers prepared with varying amounts (mole %) of diethyl tartrate as described in Example 6.

The mass loss rates were averaged for replicate polymer compositions, and the average percent mass loss rates with standard deviations are shown in FIG. 12. The mass loss rate increased with mole percent diethyl tartrate up to 20 mole % diethyl tartrate. The diethyl tartrate did not have a strong effect on percent mass loss rate above this threshold.

Figure 13:
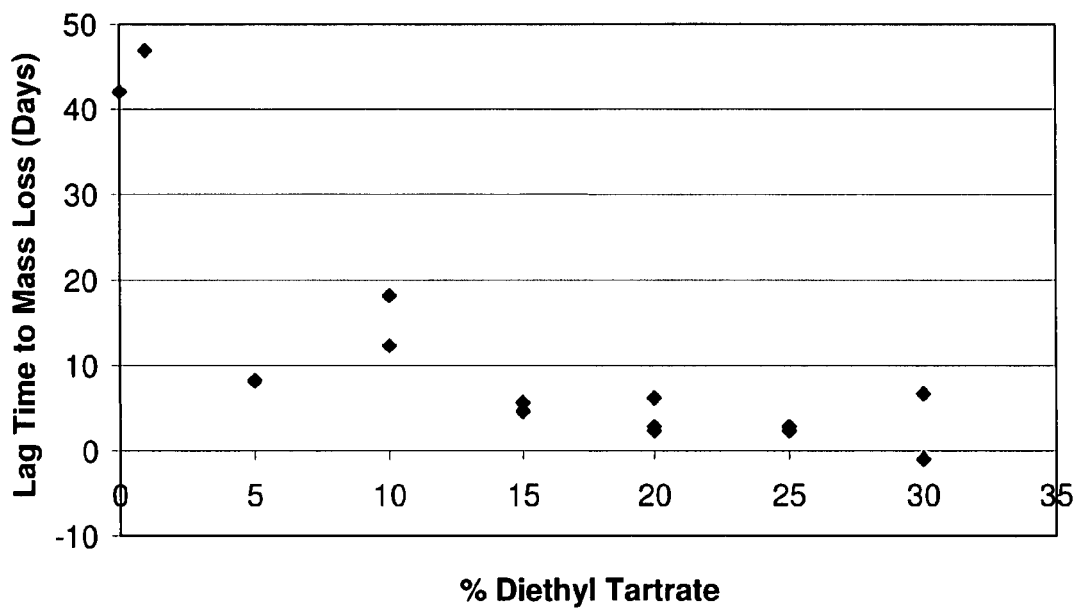

Lag Time:

There was a fairly linear relationship between lag time to mass loss and mole percent DET between 1 and 15 mole % DET, with the 5 mole % polymer composition being an outlier. The lag time to mass loss versus mole percent diethyl tartrate is shown graphically in FIG. 13. The 0 and 1 mole % DET polymer compositions had lag times over 40 days, the 10 mole % DET polymer compositions had lag times between 10 and 20 days, and the 15 mole % DET polymer compositions had lag times around 4 days.

Figure 14:
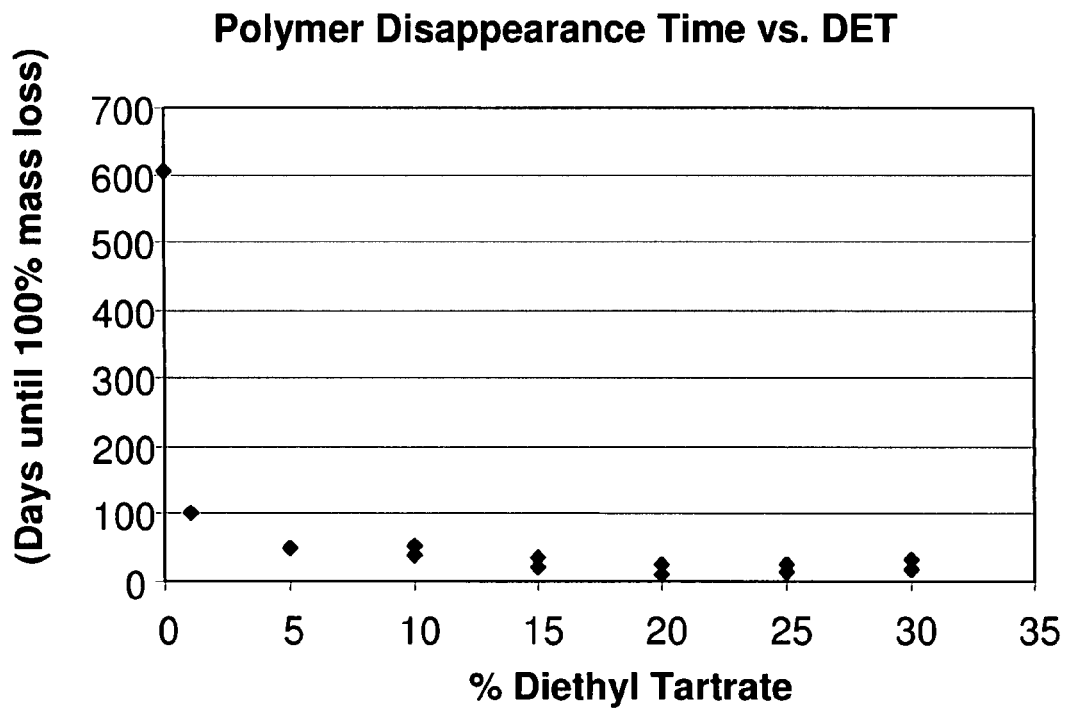
Figure 15:
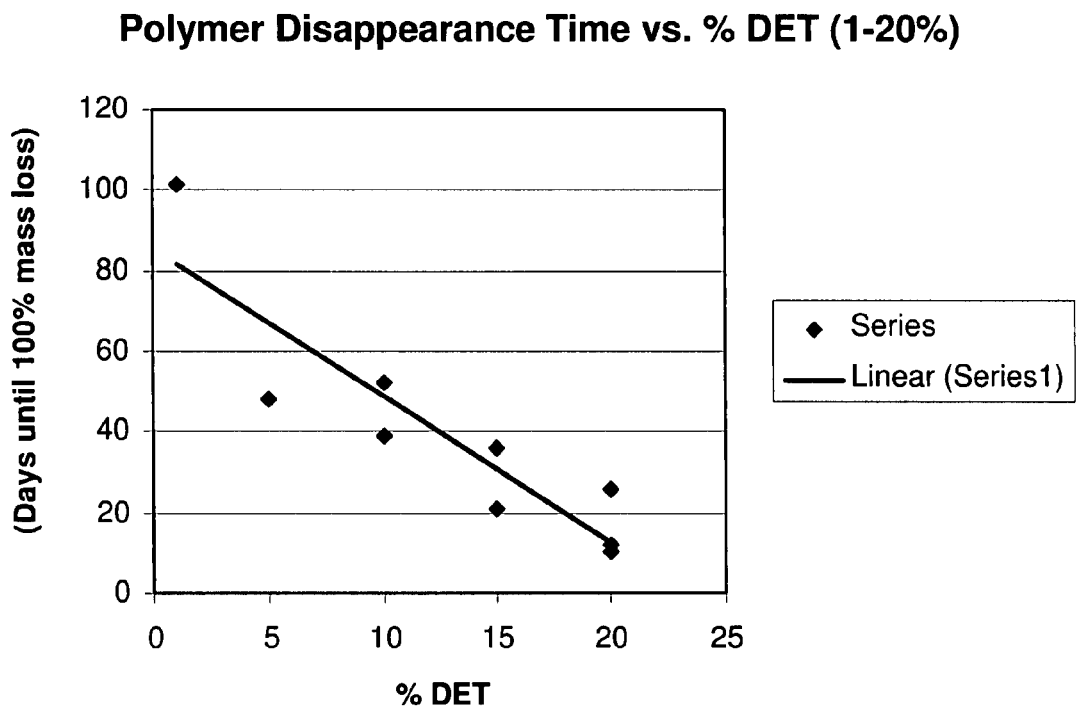
Figure 16:
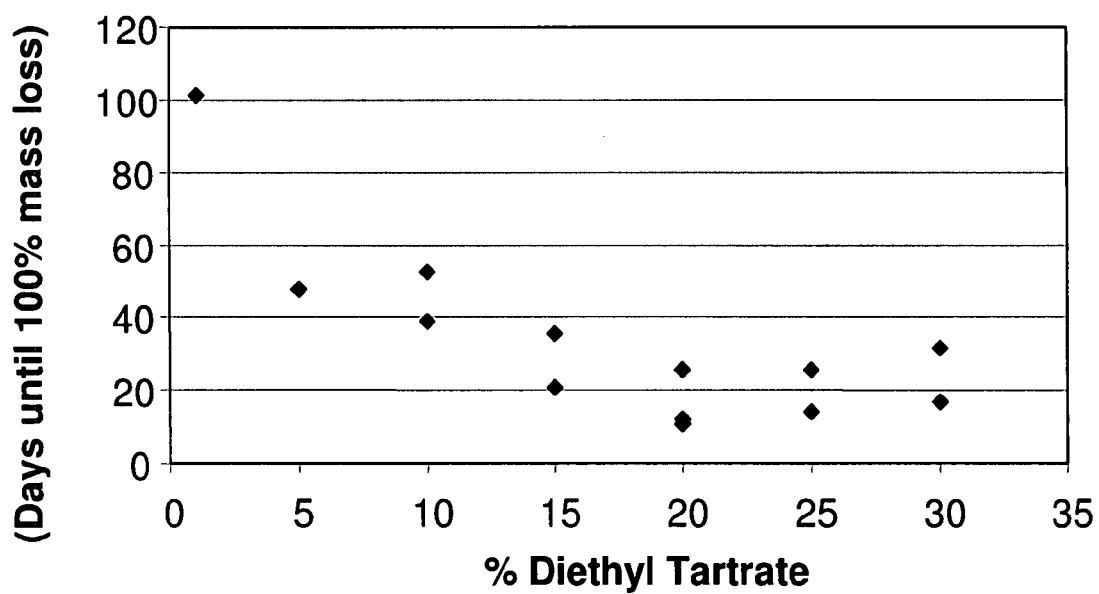

Polymer Disappearance Time:

The polymer disappearance time was greatly reduced with only 1 mole % DET in the polymer composition. The 0% control polymer (100% tCHDM) is projected to last about 600 days before 100% mass loss. The 1 mole % DET polymer had a disappearance time of only 100 days. The disappearance time versus mole percent diethyl tartrate for all of the polymer formulations is shown in FIG. 14. Between 1 and 20 mole % DET, there was a fairly linear relationship between disappearance time and mole % DET, with the disappearance time decreasing to about 15 days. In this range, the disappearance time decreased by about 4 days for every mole percent diethyl tartrate. FIG. 15 shows the disappearance times the polymers with 1 to 20 mole % diethyl tartrate, and the least squares line plotted for the disappearance time in this range of polymers is represented by $y=-3.62x+84.99$ with $R^2=0.81$. Having more than 20 mole % diethyl tartrate did not reduce disappearance time any further. The disappearance times for all diethyl tartrate polymers are graphed in FIG. 16.

Kinetic Constant (Hydrolysis Rate):

Table 11 lists the number average molecular weights measured for each polymer at the indicated times, with the % DET representing the mole percent of the total diol.

TABLE 11

Number Average Molecular Weights Measured at Various Times.

| | POE ID | | | | | | | |
|---|---|---|---|---|---|---|---|---|
| DET (%) | 12811-88<br>0 | 12811-82<br>1 | 12811-86<br>5 | 12811-90<br>10 | 12811-80 | 12924-77<br>15 | 12924-79 | 12811-76<br>20 |
| Day 0 | 51,000 | 30,300 | 35,500 | 27,300 | 56,300 | 20,600 | 17,500 | 34,100 |
| Day 1 | 41,600 | 24,800 | 42,600 | 28,000 | 33,800 | 19,400 | 16,600 | 13,900 |
| Day 4 | 43,000 | 29,300 | 40,300 | 27,700 | 34,700 | 17,500 | 14,800 | 9,600 |
| Day 6 | 49,200 | 23,400 | 28,000 | 24,400 | 29,200 | NT | NT | 12,000 |
| Day 7 | NT | NT | NT | NT | NT | 15,100 | 13,800 | NT |
| Day 8 | 44,500 | 29,300 | 30,300 | 23,400 | 35,200 | NT | NT | 10,100 |
| Day 10 | NT | NT | NT | NT | NT | 15,500 | 11,800 | NT |
| Day 11 | NT | NT | NT | NT | NT | 14,300 | 11,600 | NT |
| Day 13 | 42,200 | 25,100 | 22,400 | 20,400 | 34,500 | NT | NT | NT |
| Day 14 | NT | NT | NT | NT | NT | 13,000 | 8,500 | NT |
| Day 15 | 45,200 | 26,400 | 18,000 | 20,700 | 23,500 | 13,100 | 8,565 | D |
| Day 21 | 53,800 | 23,700 | 24,700 | 19,300 | 31,900 | NT | NT | |
| Day 28 | 51,800 | 25,250 | 20,620 | 7,855 | 15,480 | | | |
| Day 36 | 52,300 | 23,200 | 14,900 | 7,900 | 15,200 | | | |
| Day 43 | 42,900 | 21,100 | NT | D | D | | | |
| Day 53 | 37,900 | 21,700 | D | | | | | |
| Day 57 | 43,200 | 22,110 | | | | | | |
| Day 78 | 47,000 | 16,700 | | | | | | |

TABLE 11-continued

Number Average Molecular Weights Measured at Various Times.

| | | |
|---|---|---|
| Day 81 | NT | 16,890 |
| Day 84 | NT | 17,400 |
| Day 91 | 34,740 | D |

| | POE ID | | | | | | |
|---|---|---|---|---|---|---|---|
| | 12811-78 | 12924-75 | 12924-71 | 12924-73 | 12811-74 | 12811-84 | 12924-69 |
| DET (%) | 20 | | 25 | | | 30 | |
| Day 0 | 23,900 | 17,900 | 19,400 | 16,600 | 23,900 | 18,200 | 17,200 |
| Day 1 | 19,800 | 16,200 | 15,700 | 15,800 | 13,700 | 17,200 | 16,600 |
| Day 4 | 14,300 | 13,700 | 5,100 | 14,200 | 16,600 | 15,900 | 14,100 |
| Day 6 | 10,200 | NT | NT | NT | 12,700 | NT | NT |
| Day 7 | NT | 12,000 | 10,900 | 9,300 | NT | NT | 9,700 |
| Day 8 | 9,500 | NT | 9,100 | NT | 14,200 | NT | NT |
| Day 10 | NT | 11,900 | 3,700 | 9,300 | NT | NT | 9,300 |
| Day 11 | NT | 12,300 | 3,300 | 7,200 | NT | NT | 3,500 |
| Day 13 | 5,800 | NT | NT | NT | 9,500 | NT | NT |
| Day 14 | NT | 13,000 | D | 9,000 | NT | NT | 2,900 |
| Day 15 | D | 10,500 | | D | 12,900 | NT | NT |
| Day 21 | | NT | | | 11,100 | NT | |
| Day 28 | | | | | D | D | |
| Day 36 | | | | | | | |
| Day 43 | | | | | | | |
| Day 53 | | | | | | | |
| Day 57 | | | | | | | |
| Day 78 | | | | | | | |
| Day 81 | | | | | | | |
| Day 84 | | | | | | | |
| Day 91 | | | | | | | |

NT = not tested
D = degraded (test sample broke into pieces)

Figure 17:
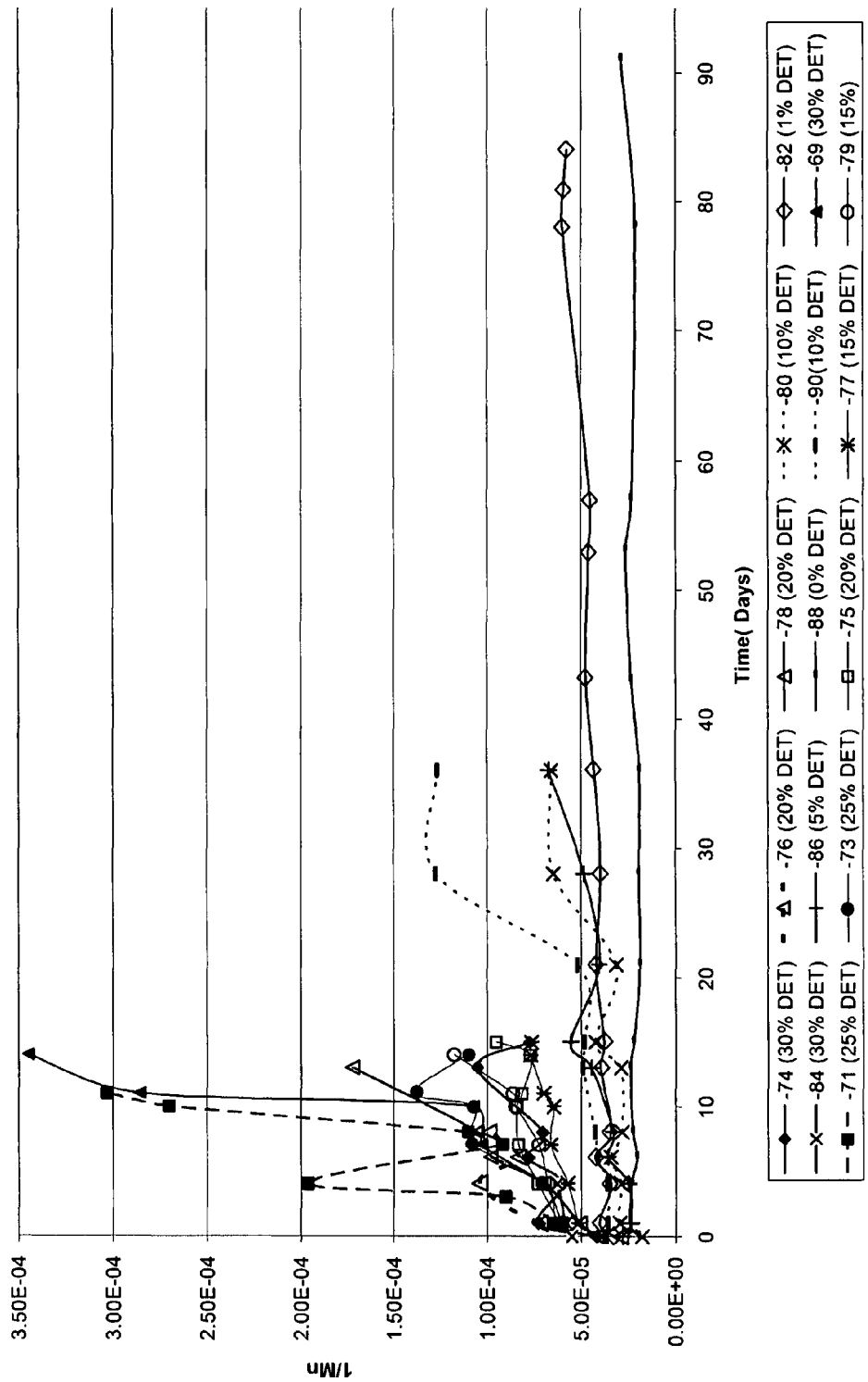
FIG. 17 is a graphical representation of the inverse number average molecular weight over time using the data in Table 11 for polyorthoester polymers prepared with varying amounts of diethyl tartrate as described in Example 6.
Figure 18:
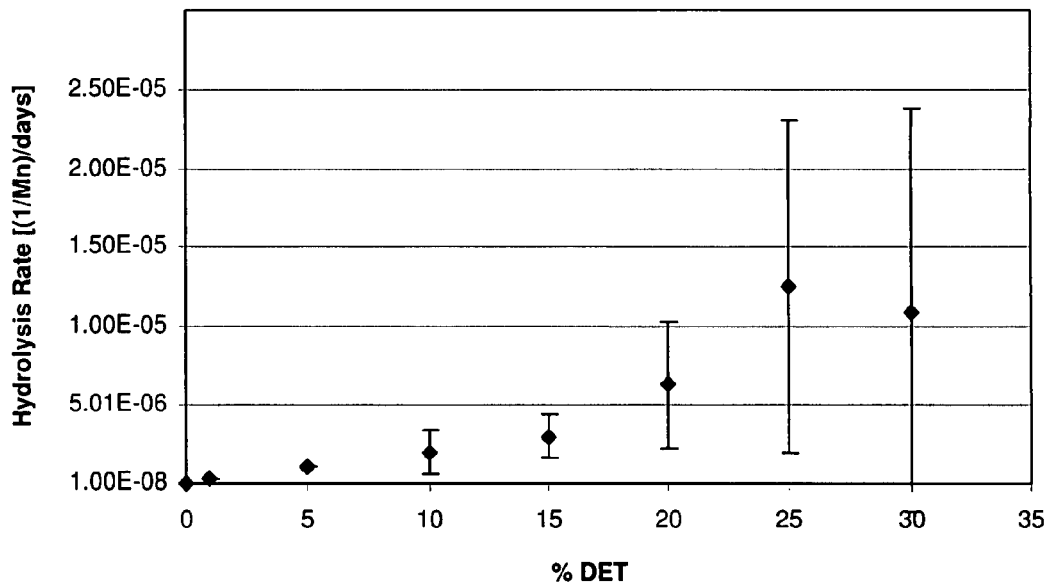
FIGS. 18 and 19 are graphical representations of the average hydrolysis rate versus mole percent diethyl tartrate (FIG. 18) and weight average molecular weight (FIG. 19) for polyorthoester polymers prepared with varying amounts (mole %) of diethyl tartrate as described in Example 6.

The kinetic constant of hydrolysis for each polymer was determined from the slope of the $1/M_n$ versus time graph, which is shown in FIG. 17. See, for example, Lyu et al., J. of Polymer Science, Part B: Polymer Physics, 43: 383-397 (2005). FIG. 18 shows the relationship between hydrolysis rates and mole percent diethyl tartrate in the polymer composition. The error bars show the large variability between replicate polymer batches, especially for polymers with 20 mole % or more diethyl tartrate. Despite the variability, the average kinetic constants show the general trend of faster rates with more diethyl tartrate in the polymer composition. The fastest polymers, with 25 and 30 mole % diethyl tartrate, hydrolyzed about 50 times faster than the control.

Figure 19:
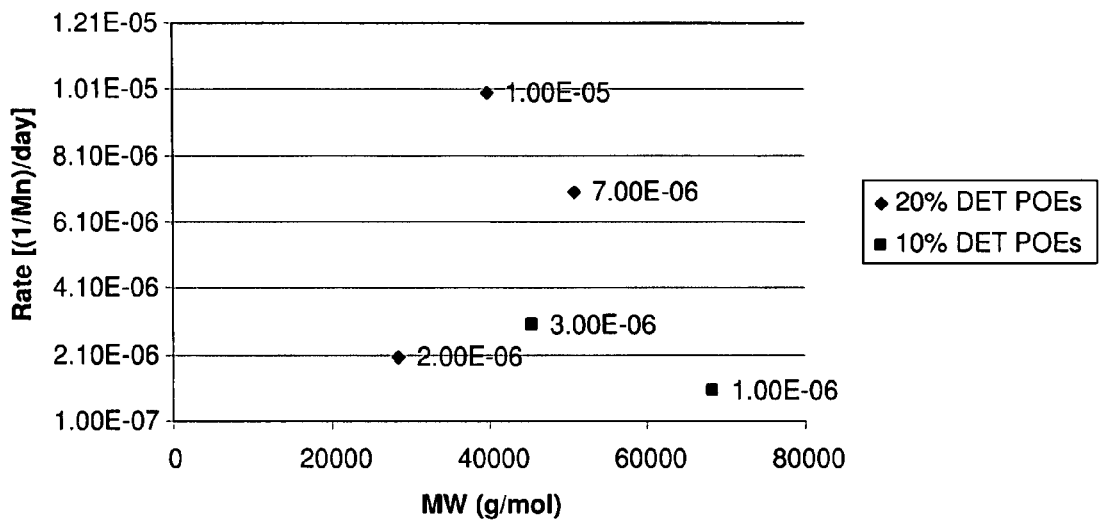
Figure 20:
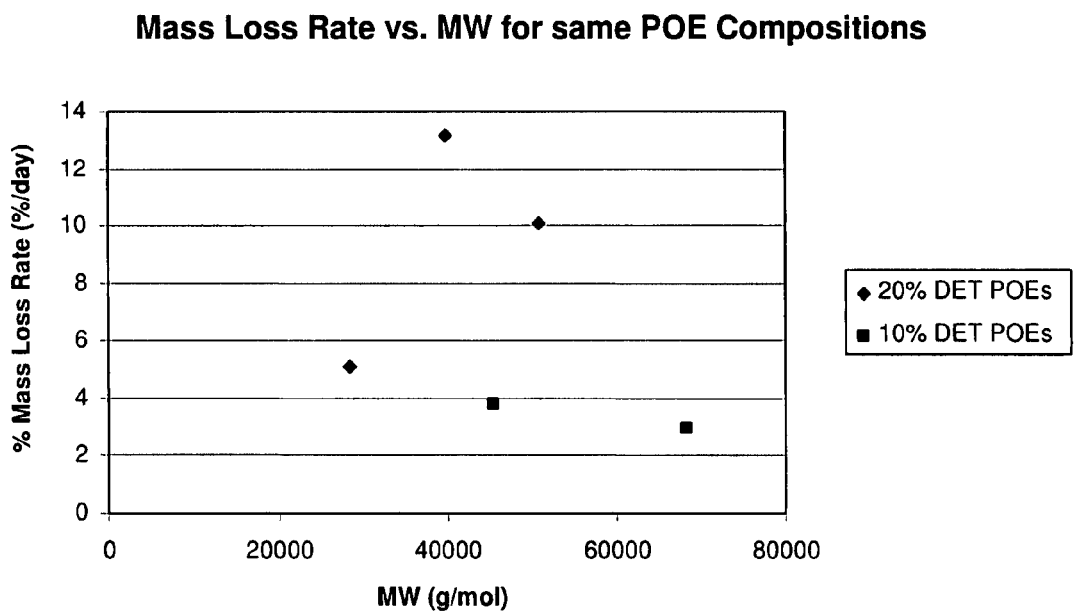
FIG. 20 is a graphical representation of the mass loss rate versus weight average molecular weight for polyorthoester polymers prepared with varying amounts of diethyl tartrate as described in Example 6.

Effect of Molecular Weight:

To confirm that the variation in starting molecular weights was not affecting the observed rates, the hydrolysis rates and mass loss rates for polymers of the same polymer composition, but different molecular weights were compared. FIG. 19 shows the hydrolysis rate versus $M_w$ for the 20 mole % and 10 mole % diethyl tartrate polymer compositions. FIG. 20 shows the mass loss rate versus $M_w$ for the 20 mole % and 10 mole % diethyl tartrate polymer compositions. No differences were observed between the rates of the two 10 mole % DET polymers. The variation in rate with the 20 mole % DET polymers did not trend with molecular weight; the slowest 20 mole % polymer had the lowest starting molecular weight, which is the opposite of what would be expected. Therefore, the molecular weights variations did not affect the analysis of hydrolysis rates.

Example 7

Comparison of Hydrolysis Kinetics in Solution

Figure 21:
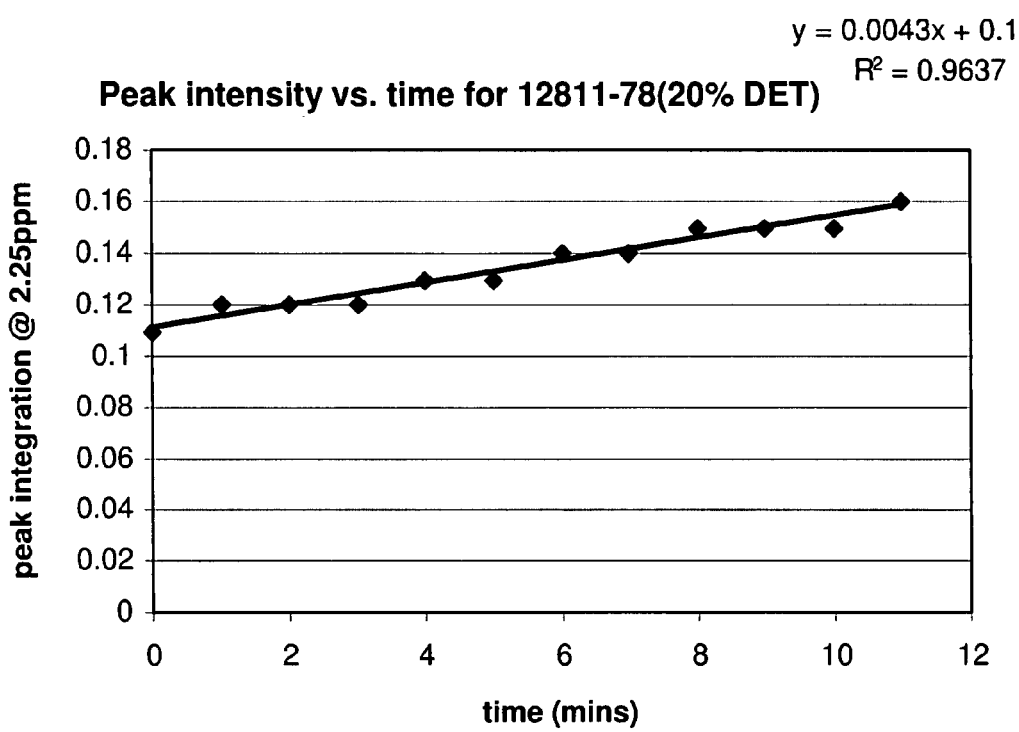
FIG. 21 is a graphical representation of an NMR peak intensity versus time for pentaerythritol dipropionate (PDP) hydrolysis product from a polyorthoester polymer prepared with 20 mole % diethyl tartrate as described in Example 7.

Procedure:

The polymers described in Table 8 in Example 6 were used in this experiment. The hydrolysis kinetics of the polymers in solution was measured by proton NMR spectroscopy. Inside a nitrogen-atmosphere glovebox, 50 mg polymer was dissolved in 0.75 ml THF-$d_8$. The sample was placed on a shaker table to ensure complete dissolution. The solution was then transferred to an NMR tube. A baseline proton spectrum was acquired to characterize the polymer before water was added. To the NMR tube, 46 microliters of a 3.4 M formic acid in $D_2O$ solution was added. The tube was then tipped several times to obtain a uniform solution. The kinetics experiment was started immediately after tuning, locking, and shimming, with one scan acquired per time point. The time interval between spectra was adjusted as needed for the relative speed of each reaction. At least 10 individual spectra were acquired to characterize the hydrolysis rate. The formic acid singlet at 8.0 ppm was used as the internal standard and the integral value was set to 1. The integration of the PDP quartet at 2.25 ppm was then plotted versus time (in minutes). An example plot of the integration of the PDP peak at 2.25 ppm versus time is shown in FIG. 21 for a polymer containing 20 mole % diethyl tartrate. The least squared line plotted for the appearance of the hydrolysis product PDP is represented by $y=0.0043x+0.1115$ with $R^2=0.96$. The slope of the least squared line was recorded as the rate constant for each polymer.

Figure 22:
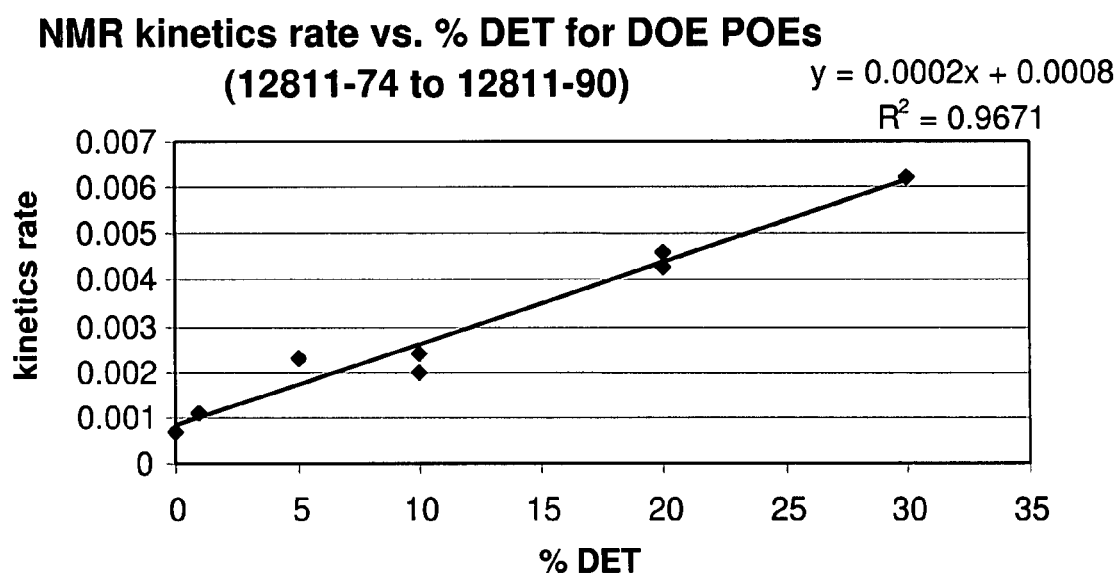
FIG. 22 is a graphical representation of the hydrolysis rate constant versus mole percent diethyl tartrate for polyorthoester polymers prepared with varying amounts of diethyl tartrate as described in Example 7.

Results:

The NMR kinetics experiment measured the rate of orthoester bond hydrolysis for the polymers in solution (THF/water) with an acid catalyst. This allowed us to compare the relative bond hydrolysis rates of the polymer compositions without the influence of polymer hydrophilicity and Tg. FIG. 22 shows the hydrolysis rate constant plotted versus mole percent diethyl tartrate in the polymer. The rate of hydrolysis increased linearly with an increase of diethyl tartrate in the polymer composition. The least squared line plotted for FIG. 22 was 0.002x+0.0008 with $R^2$=0.97. The rate of the 30 mole % diethyl tartate polymer was 6 times faster than the tCHDM homopolymer. These data agree with the data from the degradation study on solid samples described in Example 6. With the solid samples, the degradation rates increased by a factor of 50 over the range of diethyl tartrate studied. The larger effect of diethyl tartrate in the solid samples may be due to an increase in hydrophilicity caused by diethyl tartrate.

Example 8

Drug Elution from Thin Films

A sample of heat-pressed polymer, time zero from the degradation study in Example 6, was used for thin film drug elution testing.

Preparation of Drug Loaded Thin Films:

Drug loaded thin films were prepared by solvent casting a polymer/drug solution onto a primed 1 $cm^2$ stainless steel shim. The primer coat was obtained by dissolving Tecothane 75D (lot#11544-16-7) in THF (Sigma Aldrich 99.9% anhydrous) to yield a 0.5 wt % solution. Using a micropipettor, 40 microliters of the dissolved solution was pipetted on one side of the shim and placed in a nitrogen glove box (relative humidity <1%) to dry for 15 minutes. The shims were then heat annealed in a 220° C. oven for 10 minutes.

Two drugs were tested individually, Pentoxifylline (Sigma #022K1348) and Dexamethasone Acetate (Sigma #D1881). The drug-loaded films were prepared by first dissolving the drug in chloroform (Sigma 99.9% Biotech Grade) to yield a 1.0 wt % solution. The poly(ortho ester)s were also dissolved in chloroform at 1.0 wt % solids. The solutions were mixed to obtain a 5:95 drug:POE ratio. The blended solution was pipetted (58 microliters) on top of the primer coat and allowed to dry using the same conditions as the primer coat.

In-Vitro Drug Release from Thin Films:

Dexamethasone acetate loaded POE films were incubated in 2.0 mL of PBS pH 7.4 with 10 wt % ethanol and pentoxifylline POE films were incubated in 2.0 mL of PBS pH 7.4 (n=2). All samples were kept under constant agitation (20 rpm). Samples of the release medium were taken at various time points and the medium was refreshed after sampling. Concentrations were quantified by using a Hewlett-Packard Diode Array Spectrophotometer at 242 nm and 280 nm for dexamethasone acetate and pentoxifylline, respectively.

Figure 23:
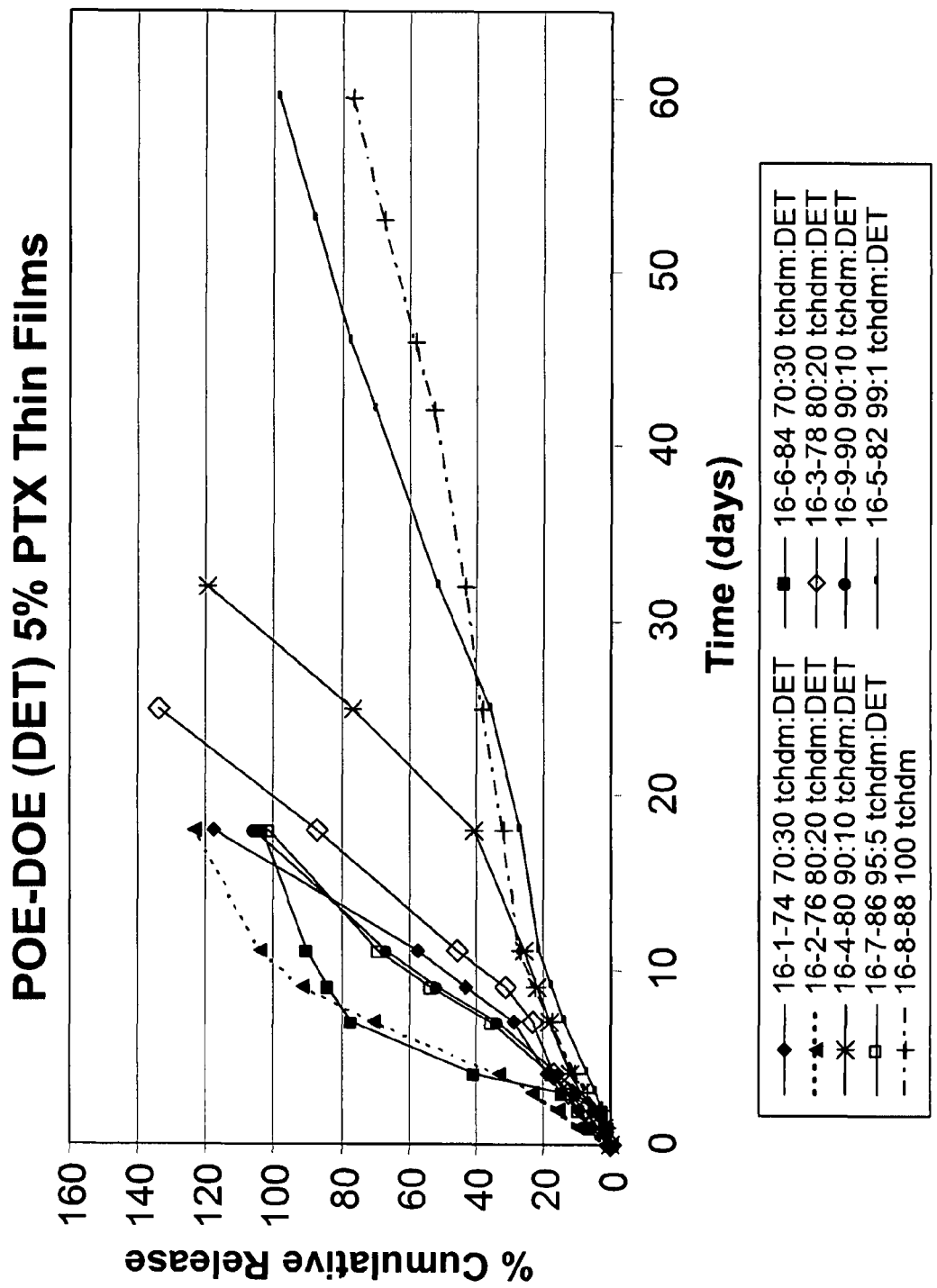
FIGS. 23 and 24 are graphical representations of the percent cumulative release of pentoxifylline (PTX.
Figure 24:
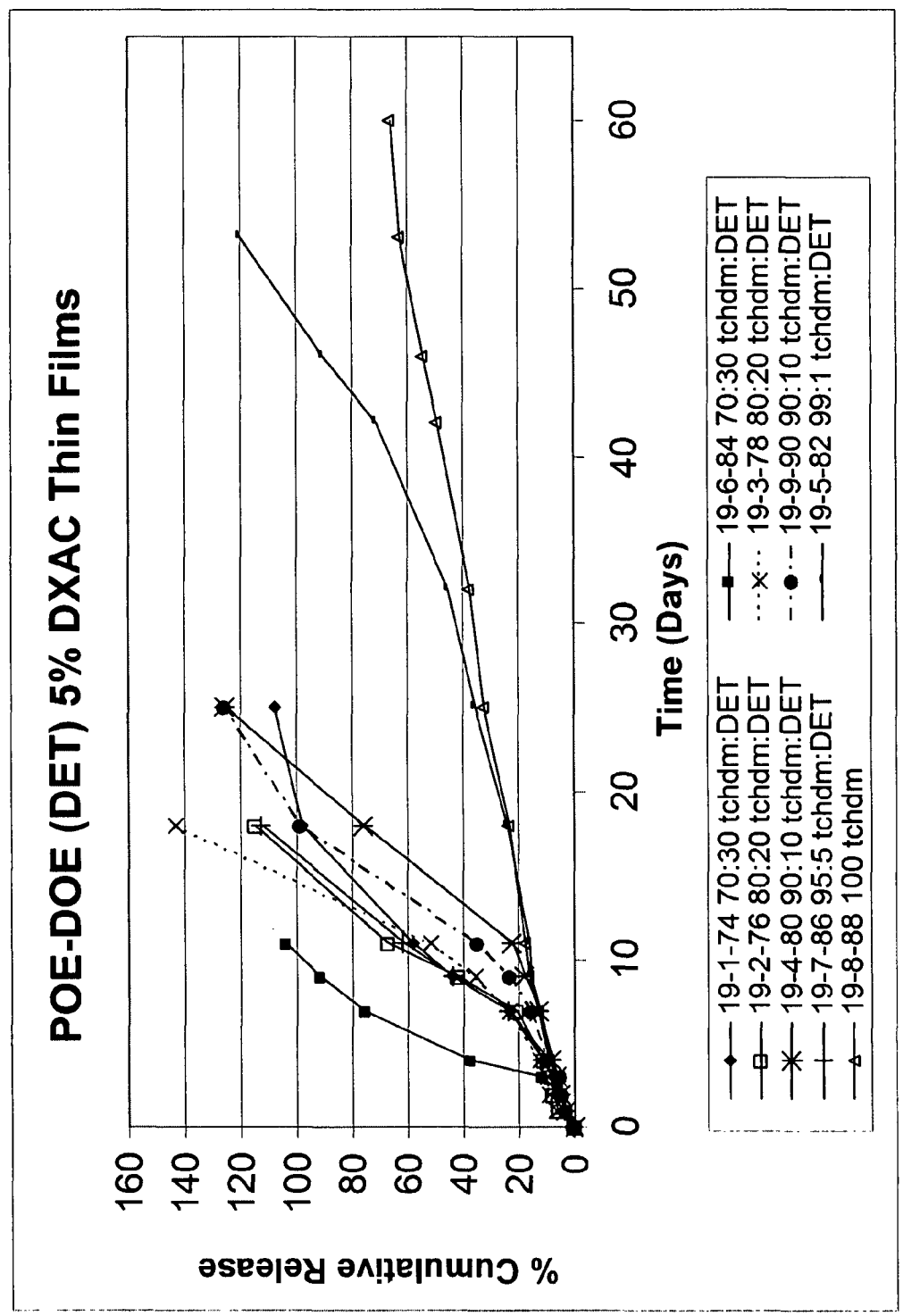
Figure 25:
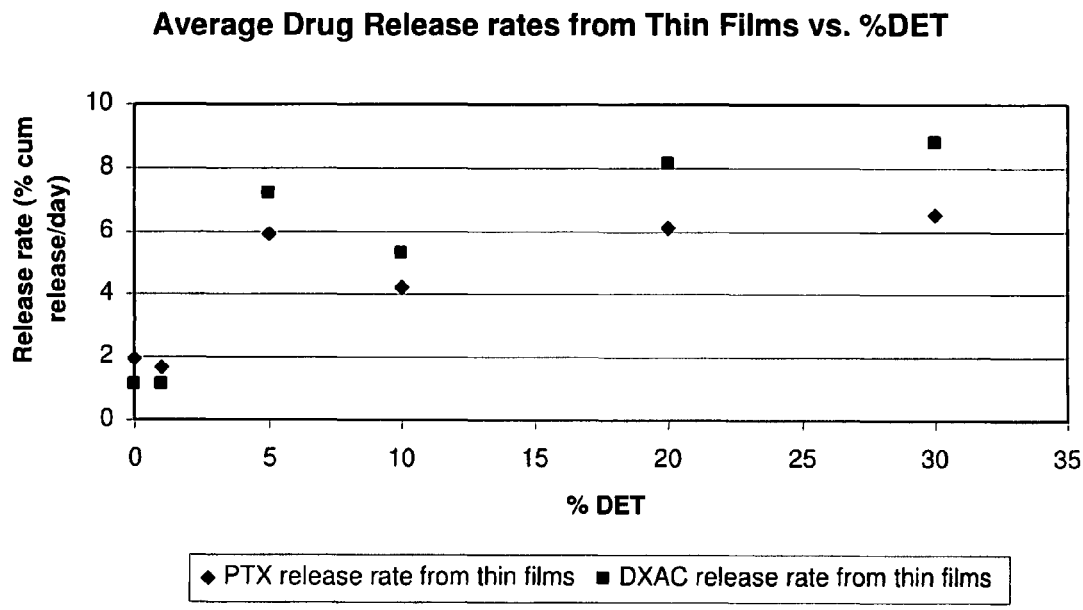
FIG. 25 is a graphical representation of the average rates of drug release for pentoxifylline (PTX) and dexamethasone actetate (DXAC) versus mole percent diethyl tartrate (DET) for thin films of various polyorthoester polymers as described in Example 8.

Results:

The percent cumulative release of pentoxifylline (PTX) versus time is shown in FIG. 23. The percent cumulative release of dexamethasone acetate (DXAC) versus time is shown in FIG. 24. The drug release rates were determined from the slope of the lines on the percent cumulative release versus time graphs. The average rates of drug release versus mole percent DET in the polymer are shown in FIG. 25. The rates of elution for both drugs were similar, despite one being hydrophilic and the other hydrophobic. Pentoxifylline has a solubility of approximately 75 mg/mL in PBS, while dexamethasone acetate has a solubility of only 15 micrograms/mL in PBS. The observed rates could be an indication of the elution being controlled by polymer erosion instead of drug diffusion. If diffusion were controlling the rates, then the hydrophilic drug would be expected to have a much higher rate of elution. Also, there was an increase in drug elution rate between 1 and 5 mole % DET, and from 5 to 30 mole % DET there were no significant differences in the rate. If the 5 mole % DET polymer composition were an outlier, then there would be a fairly linear correlation between elution rate and mole % DET in the range of 0 to 20 mole % DET.

Figure 26:
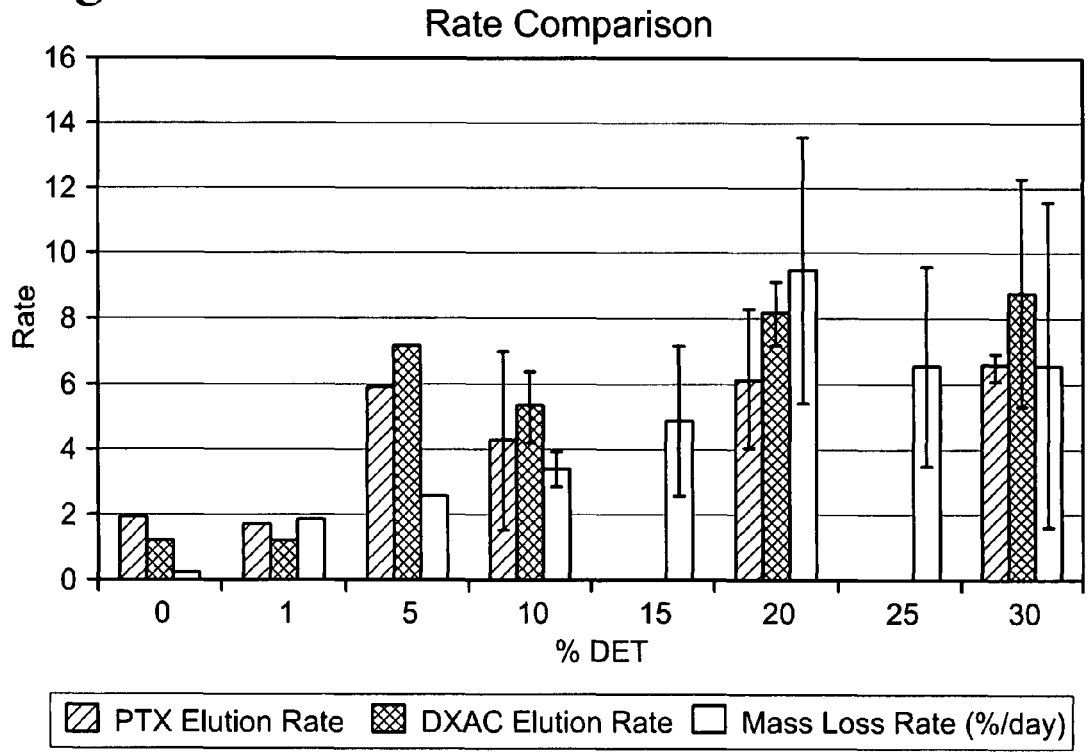
FIG. 26 is a graphical representation showing the average drug elution rates from thin films and the average mass loss rates from pressed samples versus mole percent diethyl tartrate (DET) for various polyorthoester polymers as described in Example 8.

The observed drug elution rates from thin films were compared to the mass loss rates observed from the pressed degradation sample from Example 6. FIG. 26 shows the average drug elution rates from thin films and the average mass loss rates from the pressed samples.

This comparison shows that the mass loss rates correlate well with the rates of drug elution, however the rates occur on different timescales. Only the 5 mole % DET sample showed some difference between mass loss and drug elution rates. In addition to the observation that the hydrophobic and hydrophilic drugs eluted at similar rates, the correlation to mass loss rate also indicates that the drug elution may be controlled by polymer erosion.

Example 9

Drug Elution from Rods

Preparation of Polymers:

The POEs synthesized in Example 6 (no thermal processing) were used in this study. A solution of ⅓ polymer and ⅔ tetrahydrofuran by weight (Sigma-Aldrich # 186562-2L) was prepared in a 40 ml amber vial. The vial was placed on a horizontal shaker to dissolve polymer (approximately 6 hours). Drug was then added to vial to give a 5% drug load (solids only, THF not applied to calculation). Two drugs were tested, Pentoxifylline (Spectrum #SI0097) and Dexamethasone Acetate (Sigma #D1881). The vials were placed on a horizontal shaker (approximately 24 hours) to give a uniform solution.

The solution was poured into a laminate-lined aluminum dish and placed in a nitrogen glove box (relative humidity <1%) for 24 hours to solidify into a slab. The slab was then flipped over in the dish and moved to a vacuum oven at 55° C. with a nitrogen purge (15 psi, 30 standard cubic feet per minute (SCFM)) for 48 hours. The slab was then cut into pellets (3×3 mm) and returned to vacuum oven for another 48 hours. The mass of the pellets was periodically measured, and when the mass stabilized (indicating removal of the THF), the pellets were ready for extrusion.

Extrusion of Polymers:

Pellets were fed into a Thermo HAAKE MiniLab extruder with a torque speed of 75 rpm and extruded through a 1.5 mm die. Temperature settings were polymer dependent and are listed in Table 12. Extruded product was gently guided away and cut from the extruder and then placed on laminate to cool. Extruded product was then cut into 10 mm lengths using a razor blade. The rods were 10 mm×1.5 mm in size.

TABLE 12

Extrusion temperature used for each polymer composition.

| Polymer ID | Polymer Composition (molar ratio of diols) | Extrusion Temperature (° C.) |
|---|---|---|
| 12811-74 | 70:30 tCHDM:DET | 120 |
| 12811-76 | 80:20 tCHDM:DET | 120 |
| 12811-78 | 80:20 tCHDM:DET | 120 |
| 12811-80 | 90:10 tCHDM:DET | 135 |
| 12811-82 | 99:1 tCHDM:DET | 160 |
| 12811-84 | 70:30 tCHDM:DET | 120 |
| 12811-86 | 95:5 tCHDM:DET | 150 |
| 12811-88 | 100 tCHDM | 160 |
| 12811-90 | 90:10 tCHDM:DET | 135 |

In-Vitro Drug Release from Rods:

Dexamethasone Acetate rods were placed in 15 ml of PBS pH 7.4 with 10 wt % ethanol and the Pentoxifylline rods in 3 ml of PBS pH 7.4 (n=2). All samples were incubated in a New Brunswick Scientific C24 Incubator Shaker at 37° C. under constant agitation (20 rpm). Release medium was removed and the medium refreshed at predetermined time points. The release medium was analyzed for drug concentration by using a Hewlett-Packard Diode Array Spectrophotometer. Dexamethasone Acetate was read a 242 nm and pentoxifylline was read at 280 nm.

Pentoxifylline (PTX)(Hydrophilic Drug):

At 5% Pentoxifylline (PTX) loading, the drug was completely soluble in the polymer. The rods were clear, with a yellow tint throughout the rod, indicating that the PTX was evenly distributed. The percent cumulative release of PTX from POE rods versus time is graphed in FIG. 27.

Figure 27:
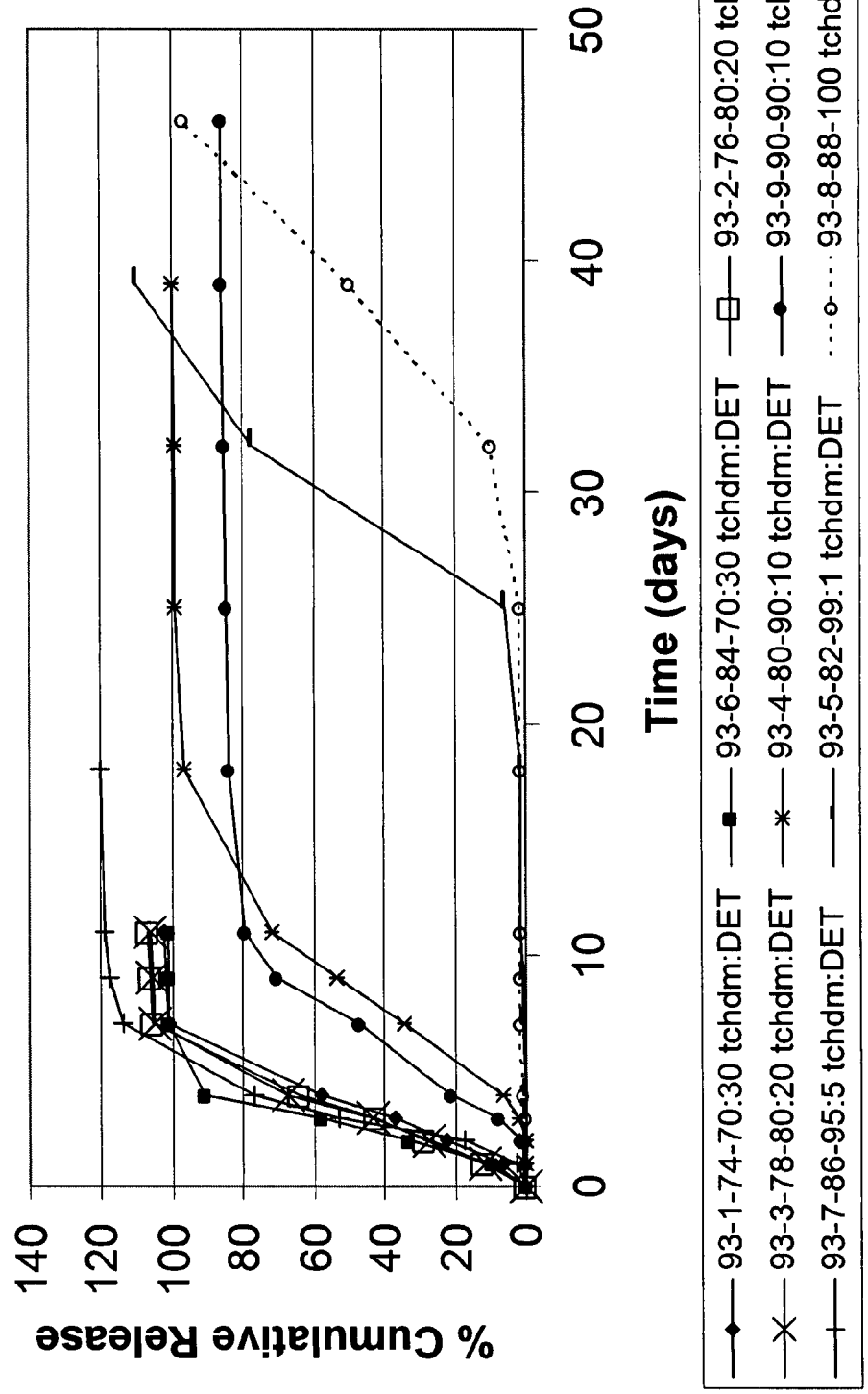
FIGS. 27 and 29 are graphical representations of the percent cumulative release of pentoxifylline (PTX.
Figure 28:
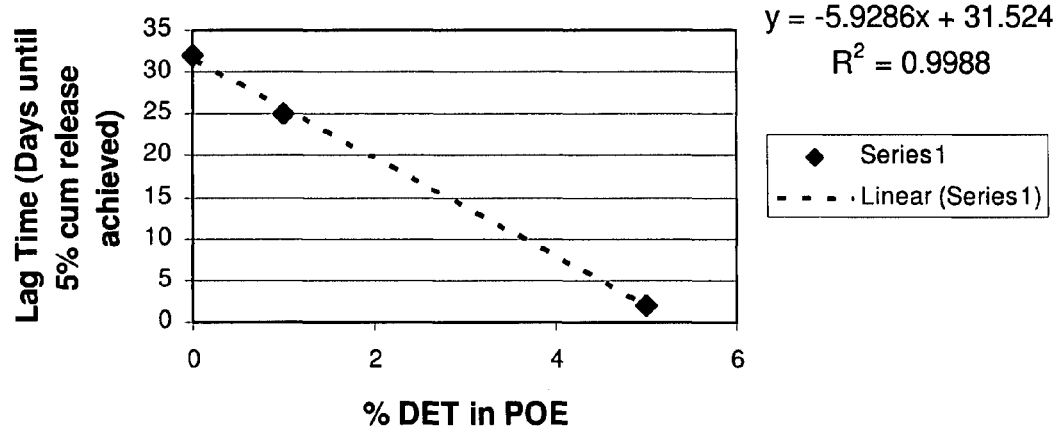
FIG. 28 is a graphical representation of the lag time in days until 5% cumulative release of pentoxifylline (PTX) from rods versus mole percent diethyl tartrate (DET) for various polyorthoesters as described in Example 9.

The shapes of the elution curves shown in FIG. 27 correlate well with the percent mass loss. Diethyl tartrate did not have a strong effect on elution rates, but the lag time was affected by very small amounts of diethyl tartrate, with only 5 mole % diethyl tartrate needed to reduce lag time to one day. Having 1 mole % diethyl tartrate reduced the lag time to 25 days, compared to the 100% tCHDM POE which had a lag time of 32 days. FIG. 28 shows a linear relationship between lag time (range 1-32 days) and diethyl tartrate (range 0 to 5 mole %). Small amounts of diethyl tartrate in the polymer may be effective at tuning the lag time of PTX elution from rods.

Figure 29:
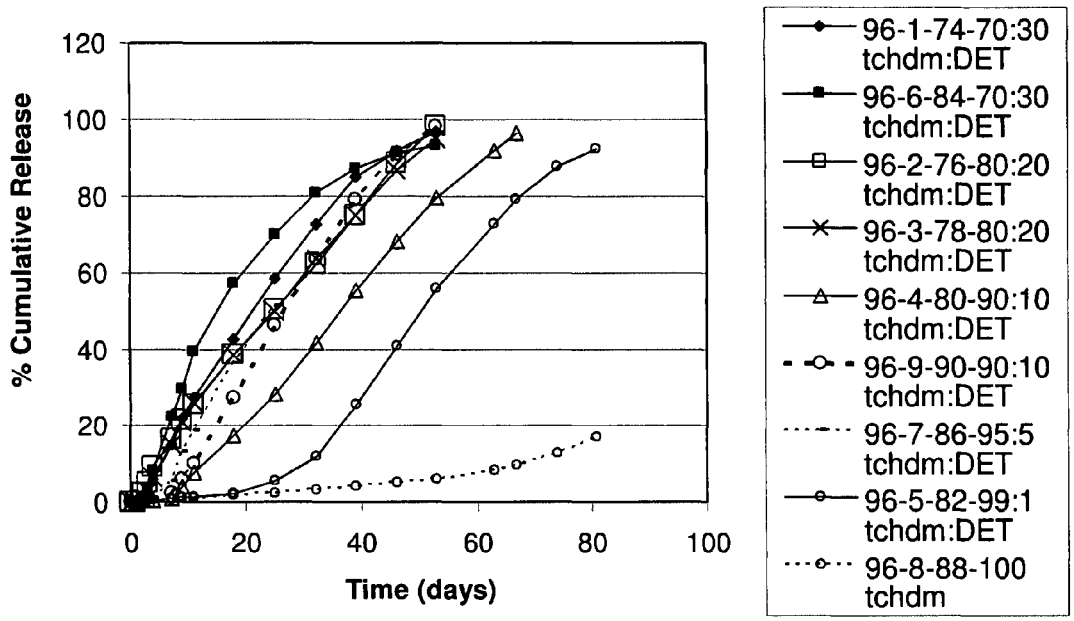

Dexamethasone Acetate(DXAC) (Hydrophobic Drug):

FIG. 29 shows the percent cumulative release from rods of dexamethasone acetate (DXAC) versus time. Having a minimal amount (1 mole %) of diethyl tartrate in the polymer composition increased the rate of DXAC elution compared to the tCHDM POE control. The 1 mole % DET polymer composition was near complete elution after 80 days, while the tCHDM control eluted less than 20% at day 80. The polymers with 5-30 mole % diethyl tartrate had similar elution profiles to one another, all with no lag time. The 1 mole % DET polymer composition had a lag time of approximately 24 days. The tCHDM POE had very gradual release from the beginning, with a slight increase in rate around day 64.

For the elution of both the hydrophilic and hydrophobic drugs from rods, the diethyl tartrate had an effect on lag time, with only small amounts (1-5 mole %) of diethyl tartrate effective at reducing the lag. The rate of drug elution from rods was not significantly affected by diethyl tartrate.

Figure 30:
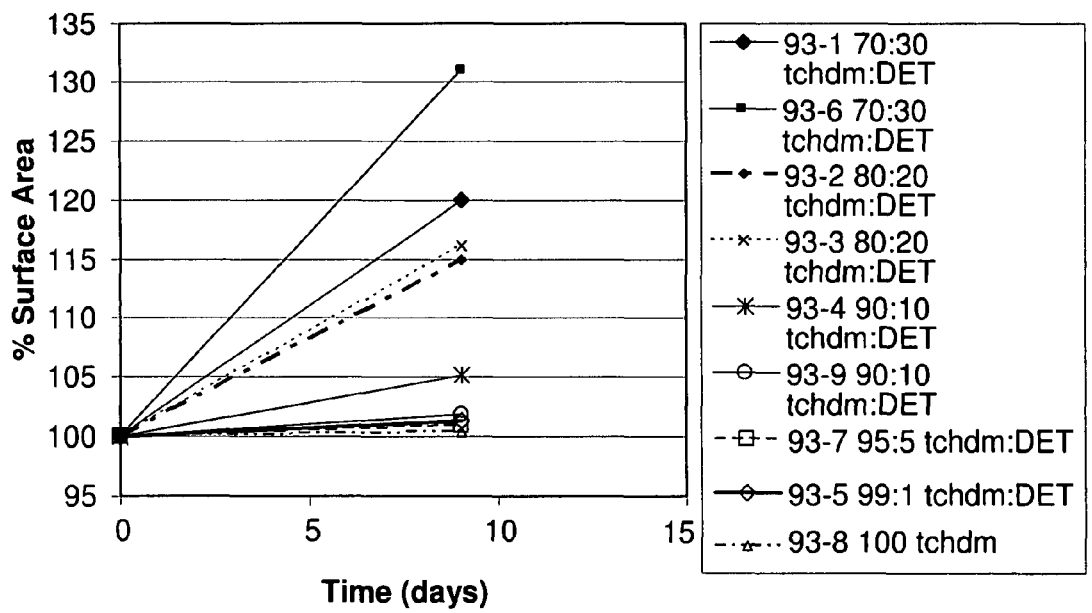
FIGS. 30 and 31 are graphical representations of the change in surface area over time for release of pentoxifylline (PTX.
Figure 31:
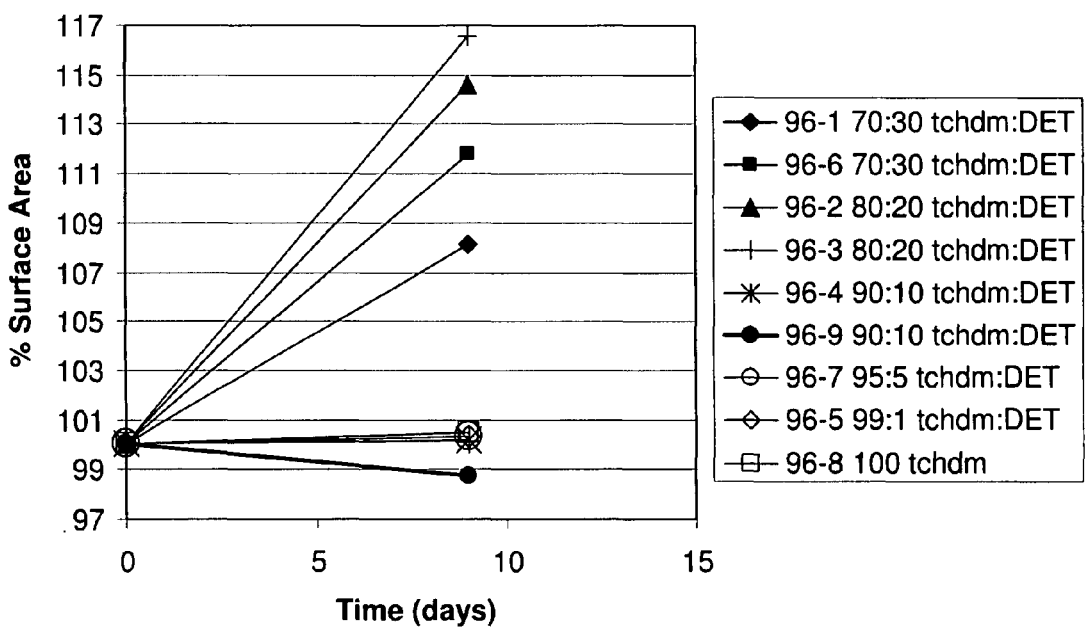

The surface area of the rods was calculated on day 9 by measuring the rod dimensions with calipers. The percent of original surface area versus time for the pentoxifylline study is shown graphically in FIG. 30. The percent of original surface area versus time for the dexamethasone acetate study is shown graphically in FIG. 31. The copolymers with 10 mole % or less diethyl tartrate had little to no increase in surface area, but the surface area increased for all samples with 20 and 30 mole % diethyl tartrate. This indicates that having 20 mole % or more diethyl tartrate in the copolymer induces polymer swelling.

Example 10

Comparison of Hydrolysis Kinetics of POEs with 1,4-cyclohexanediol

Poly(orthoester) polymers were prepared by reacting the indicated hydroxy-containing compound(s) with DETOSU using methods similar to the general procedure described in Example 2. The following hydroxy-containing compounds were used to make the polymers listed in Table 13: trans-cyclohexanedimethanol (tCHDM; 98%, Fisher Scientific #AC40606) cyclohexanediol (CHD; 99%, Aldrich #C101206).

TABLE 13

Poly(orthoester) Polymers prepared using two hydroxy-containing compounds.

| POE ID | Diol(s) | Feed Composition (molar ratio) | PDI | $M_w$ | $M_n$ |
|---|---|---|---|---|---|
| 13166-55 | tCHDM:1,4-cyclohexanediol | 99.5:0.5 | 1.79 | 161,200 | 90,070 |
| 13166-59 | tCHDM:1,4-cyclohexanediol | 95:5 | 1.7 | 196,900 | 115,700 |
| 13166-61 | tCHDM:1,4-cyclohexanediol | 90:10 | 1.68 | 171,000 | 101,700 |
| 13166-63 | tCHDM:1,4-cyclohexanediol | 80:20 | 1.85 | 192,600 | 104,100 |
| 13166-65 | tCHDM:1,4-cyclohexanediol | 70:30 | 1.59 | 94,170 | 59,140 |

The hydrolysis rates of the polymers were measured by NMR spectroscopy as described in Example 7, except that 25 mg polymer was dissolved in 0.75 mL THF-d8.

Figure 32:
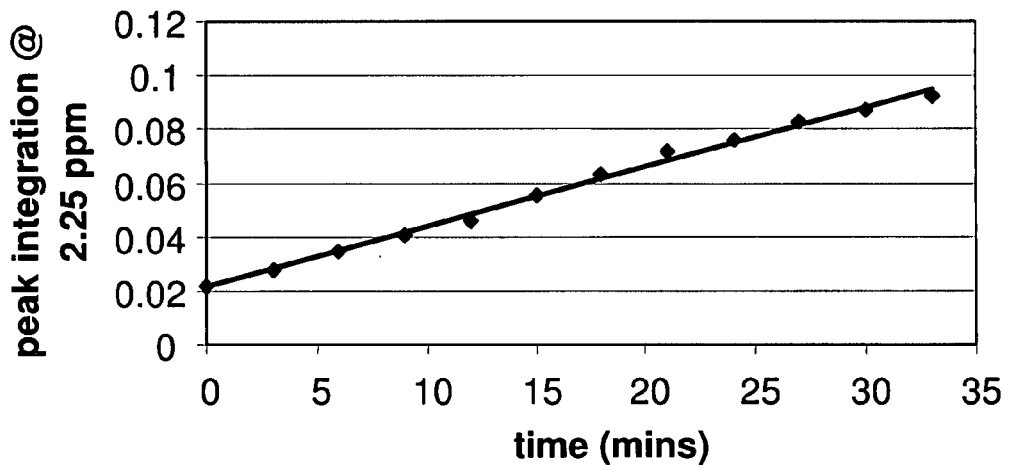
FIG. 32 is a graphical representation of an NMR peak intensity versus time for pentaerythritol dipropionate (PDP) hydrolysis product from a polyorthoester polymer prepared with 30 mole % 1,4-cyclohexanediol (CHD) as described in Example 10.
Figure 33:
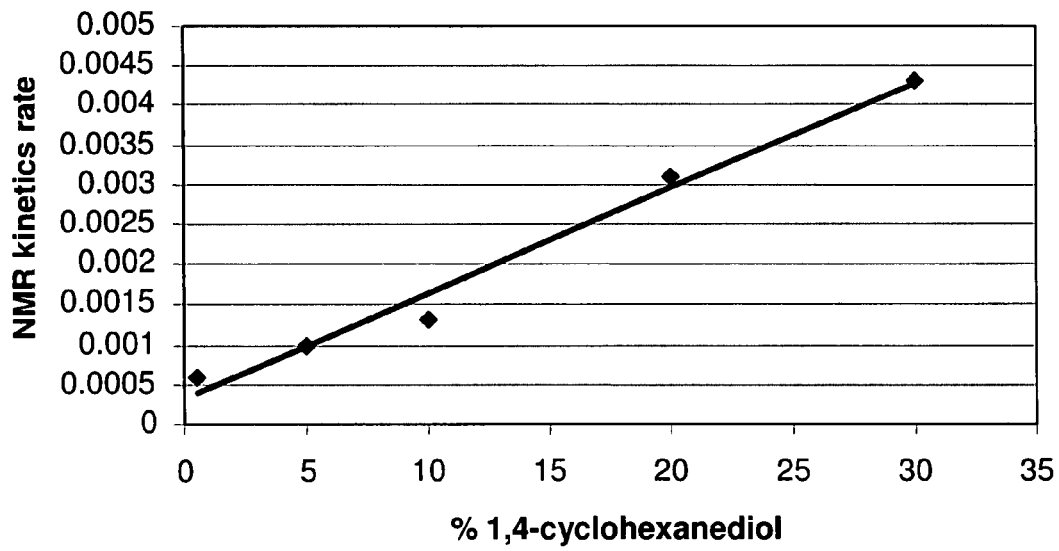
FIG. 33 is a graphical representation of the hydrolysis rate constant versus mole percent 1,4-cyclohexanediol (CHD) for polyorthoester polymers prepared with varying amounts of CHD as described in Example 10.

Results:

FIG. 32 is an example plot of PDP peak intensity versus time for a ester made using CHD as 30 molar % of the diol. The least squared line for the plot in FIG. 32 was y=0.0022x+0.0213 with an $R^2$ of 0.995. The slope of the least squared line was recorded as the rate constant for each polymer. FIG. 33 shows the hydrolysis rate constant plotted versus mole percent 1,4-cyclohexanediol in the polymer. The rate of hydrolysis increased linearly with an increase of 1,4-cyclohexanediol in the polymer composition. The least squared line plotted for FIG. 32 was y=0.0001x+0.0003 with an $R^2$ of 0.98. The polymer with 30 mole % CHD hydrolyzed approximately 7 times faster than the polymer with 0.5 mole % CHD. The effect of CHD increasing the rate of poly(orthoester) bond hydrolysis was similar to the effect observed with diethyl tartrate in Example 7. The hydrophobic nature of CHD may be advantageous in certain applications, compared to the relatively hydrophilic nature of DET. The secondary alcohols of the CHD are proposed to provide the increased hydrolysis rates observed.

Example 11

Comparison of Hydrolysis Kinetics of POEs with Various Hydrophobic Diols

Poly(orthoester) polymers were prepared by reacting the indicated hydroxy-containing compound(s) with DETOSU using methods similar to the general procedure described in Example 2. The following hydroxy-containing compounds were used to make the polymers listed in Table 14: trans-cyclohexanedimethanol (tCHDM; 98%, Fisher Scientific #AC40606), 2,3-butanediol (98%, Aldrich #B84904), 2,4-pentanediol (98%, Aldrich #156019), 2,5-hexanediol (99%, Aldrich #H11904), 1,4-pentanediol (99%, Aldrich #194182, 1,5-hexanediol (99%, Aldrich #198188), 1,4-butanediol (>99%, Aldrich #240559), and 1,6-hexanediol (99%, Aldrich 240117). A polymer with tCHDM and diethyl tartrate (DET; >99%, Aldrich #156841) was also synthesized for comparison. The diol molar ratio for all polymers was 70% tCHDM and 30% of the test diol.

TABLE 14

Poly(orthoester) Polymers prepared using various hydroxy-containing compounds.

| POE ID | Diol(s) | Feed Composition (molar ratio) | Tg | PDI | MW | MN |
|---|---|---|---|---|---|---|
| 13166-81 | tCHDM:1,4-butanediol | 70:30 | 79 | 2.61 | 37,340 | 14,290 |
| 13166-83 | tCHDM:1,6-hexanediol | 70:30 | 80 | 2.06 | 97,680 | 47,480 |
| 13166-93 | tCHDM:2,4-pentanediol | 70:30 | 87 | 2.19 | 84,480 | 38,500 |
| 13166-95 | tCHDM:2,5-hexanediol | 70:30 | 76 | 2.23 | 74,940 | 33,620 |
| 13166-97 | tCHDM:2,3-butanediol | 70:30 | 92 | 2.02 | 42,830 | 21,240 |
| 13166-99 | tCHDM:1,5-hexanediol | 70:30 | 77 | 1.89 | 61,650 | 32,600 |
| 13361-01 | tCHDM:1,4-pentanediol | 70:30 | 75 | 2.88 | 114,400 | 39,770 |
| 12924-69 | tCHDM:DET | 70:30 | 97 | 1.5 | 52,920 | 35,950 |

Figure 35:
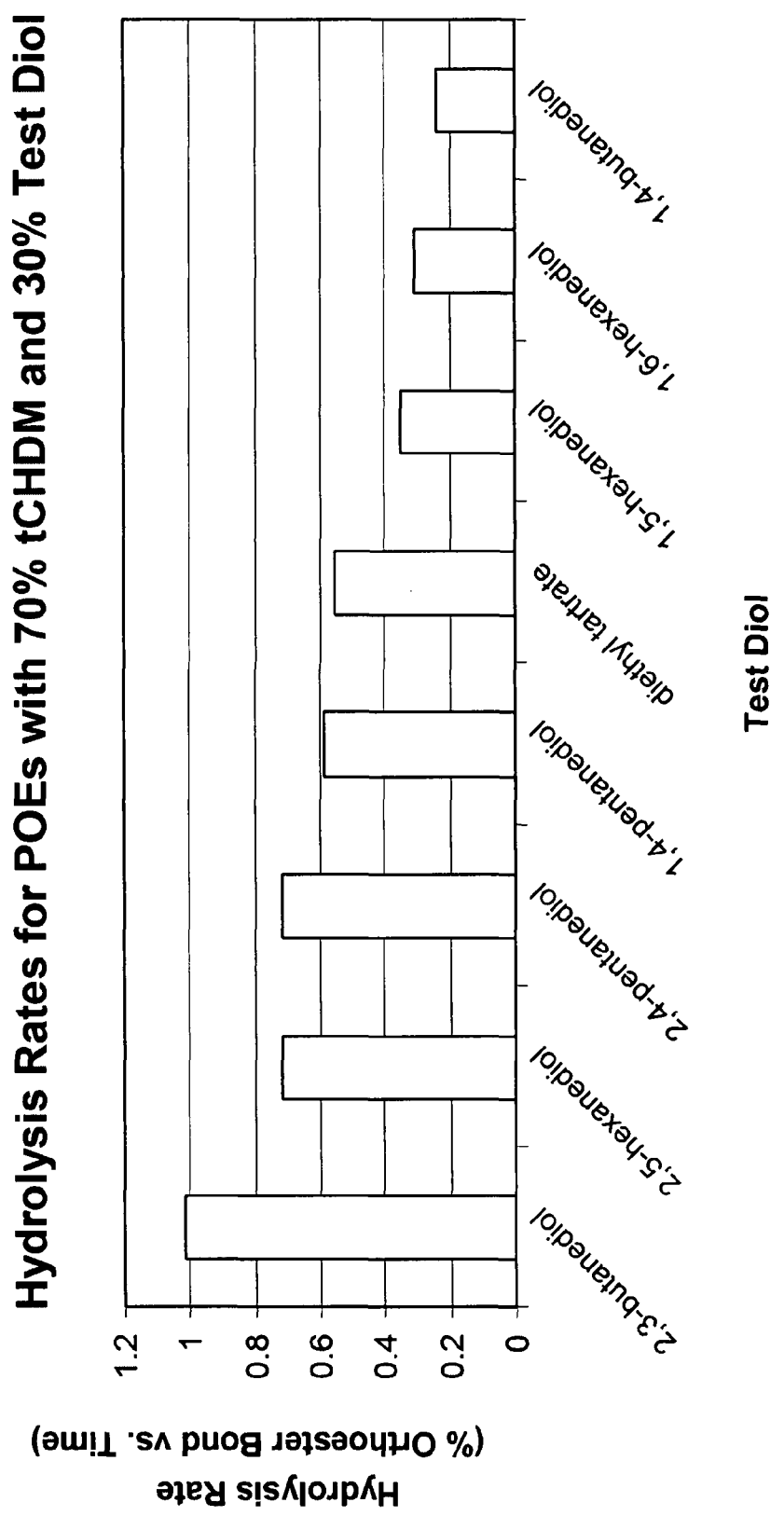
FIG. 35 is a graphical representation of the hydrolysis rates determined for various polyorthoester polymers as described in Example 11.

The hydrolysis rates of the polymers were measured by NMR spectroscopy as described in Example 7, with the change that 25 mg at 2.25 was dissolved in 0.75 mL THF-d8. The integration of the PDP peak at 2.25 ppm was determined after the hydrolysis was complete, and this was used to determine the % orthoester bonds remaining at each time point using the formula: % orthoester bonds remaining=[(PDP$_{end}$− PDP$_t$)/PDP$_{end}$]*100, where PDP$_{end}$ is the final integration value of the peak at 2.25 ppm and PDP$_t$ is the integration value of the peak at 2.25 ppm at time, t. The % orthoester bonds (OE) remaining was plotted versus time and is shown for each polymer in FIG. 34. The slope of the least squared line for the % OE bonds remaining versus time was the hydrolysis rate constant compared for each polymer. FIG. 35 shows a graphical representation of the hydrolysis rates for each polymer with a molar ratio of 30% test diol and 70% tCHDM.

Discussion:

The polymer with 30 mole % 2,3-butanediol hydrolyzed the fastest in this study. The 30 mole % 2,3-butanediol polymer hydrolyzed 3.3 to 4.2 times faster than the slowest polymers in this study, at a rate of 1% OE bonds/minute. The slowest polymers were the ones with 1,4-butanediol and 1,6 hexanediol as test diols, which hydrolyzed at a rate of 0.24% OE bonds/minute and 0.3% OE bonds/minute, respectively. The 2,3-butanediol-containing polyorthoester was about twice as fast as the diethyl tartrate-containing polyorthoester. Two other diols were also found to be slightly faster than diethyl tartrate. The 2,4-pentanediol and 2,5-hexanediol-containing POEs hydrolyzed 1.7 and 1.5 times faster than the diethyl tartrate-containing POE, respectively. Compared to the slowest polymers in the study, the 2,4-pentanediol and 2,5-hexanediol-containing POEs hydrolyzed 3.5 and 3.2 times faster, respectively. The polymer with 30 mole % 1,4-pentanediol hydrolyzed 2.6 times faster than the slowest polymers. The polymer with 1,5-hexandiol hydrolyzed 1.6 times faster than the slowest polymers.

The hydrolysis rates of poly(orthoester)s could further be tuned by changing the ratio of the rate-enhancing diol and tCHDM. In this study, the rate-enhancing diols comprised 30 mole % of the total diol in the polymer. The diols described in this example and the 1,4-cyclohexanediol described in Example 10 could be used in any combination to make poly (orthoester)s with desired hydrolysis rates and glass transition temperatures. Furthermore, the hydrophobic diols described in this example provide hydrolysis rate-enhancing properties without increasing the hydrophilicity of the POE, which is desirable in certain applications such as controlled drug delivery.

The complete disclosure of all patents, patent applications, and publications, and electronically available material cited herein are incorporated by reference. The foregoing detailed description and examples have been given for clarity of understanding only. No unnecessary limitations are to be understood therefrom. The present disclosure is not limited to the exact details shown and described, for variations obvious to one skilled in the art will be included within the subject matter defined by the claims.

What is claimed is:

1. A polymer comprising two or more repeat units selected from the group consisting of:

a repeat unit of the formula (Formula VI):

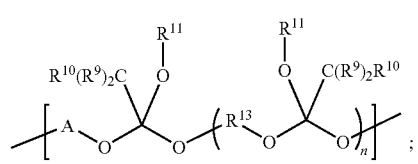

a repeat unit of the formula (Formula VII):

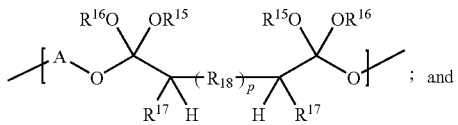

combinations thereof;
wherein:
each $R^9$, $R^{10}$, and $R^{17}$ independently represents hydrogen or an organic group;
each $R^{11}$, $R^{13}$, $R^{15}$, and $R^{16}$ independently represents an organic group;
$R^{18}$ represents oxygen or an organic group and p=0 or 1; n=0 or 1;
each $R^{11}$ can optionally be joined with $R^{13}$ to form one or more rings;
geminal $R^{15}$ and $R^{16}$ groups can optionally be joined to each other to form rings; and
each A independently represents a group of the formula (Formula III) —$Ar^2$—$C(R^8)_2$—$Ar^2$—$(B)_m$—, wherein each $Ar^2$ independently represents an arylene group, each $R^8$ independently represents a methyl group, B represents an aromatic-containing organic group having a linking oxygen attached to the aromatic ring, and m=0 or 1, wherein at least one A represents a structure of the formula:

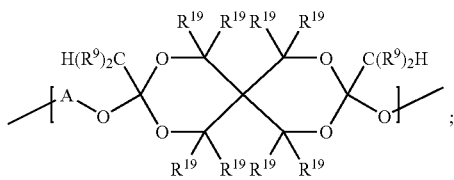

2. The polymer of claim 1 wherein the repeat unit of the formula (Formula VI) is represented by Formula VIa:

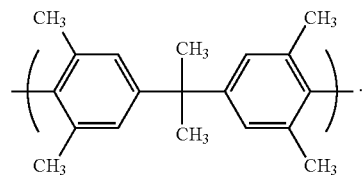

wherein:
each $R^9$ and $R^{19}$ independently represents hydrogen or an organic group; and
each A independently represents a group of the formula (Formula III) —$Ar^2$—$C(R^8)_2$—$Ar^2$—$(B)_m$—, wherein each $Ar^2$ independently represents an arylene group, each $R^8$ independently represents a methyl group, B represents an aromatic-containing organic group having a linking oxygen attached to the aromatic ring, and m=0 or 1, wherein at least one A represents a structure of the formula:

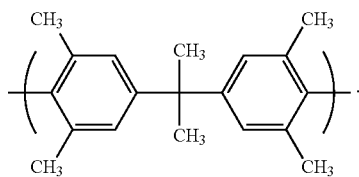

3. The polymer of claim 2 wherein each $R^{19}$ represents hydrogen and each $R^9$ independently represents hydrogen or methyl.

4. The polymer of claim 1 wherein the polymer further comprises repeat units selected from the group consisting of crosslinkable repeat units, crosslinked repeat units, repeat units having imagable groups, repeat units having latent reactive sites, and combinations thereof.

5. The polymer of claim 1 wherein the polymer further comprises repeat units selected from the group consisting of alpha-hydroxy alkanoates, beta-hydroxy alkanoates, gamma-hydroxy alkanoates, delta-hydroxy alkanoates, epsilon-hydroxy alkanoates, gylcols, carbonates, acetals, urethane-containing groups, carbamate-containing groups, and combinations thereof.

6. The polymer of claim 1 wherein the polymer is a copolymer.

7. The polymer of claim 2 wherein the copolymer is selected from the group consisting of random copolymers, alternating copolymers, block copolymers, graft copolymers, and combinations thereof.

8. The polymer of claim 7 wherein the copolymer is a block copolymer, and at least one block of the block copolymer is a poly(orthoester) block comprising the two or more repeat units selected from the group consisting of repeat units of Formula VI, repeat units of Formula VII, and combinations thereof.

9. The polymer of claim 8 wherein at least one other block of the block copolymer is a block comprising repeat units selected from the group consisting of alpha-hydroxy alkanoates, beta-hydroxy alkanoates, gamma-hydroxy alkanoates, delta-hydroxy alkanoates, epsilon-hydroxy alkanoates, carbonates, acetals, urethane-containing groups, carbamate-containing groups, and combinations thereof.

10. The polymer of claim 8 wherein at least one other block of the block copolymer is a polyketal block.

11. The polymer of claim 8 wherein at least one other block of the block copolymer is a poly(alkyleneglycol) block comprising alkylene glycol repeat units.

12. The polymer of claim 1 wherein the polymer is biodegradable.

13. The polymer of claim 1 wherein the polymer is a tissue bulking agent, a tissue replacement agent, a tissue repair agent, a surgical void filler, an agent used to prevent surgical adhesions, or a combination thereof.

14. A polymer comprising two or more repeat units selected from the group consisting of:
a repeat unit of the formula (Formula VI):

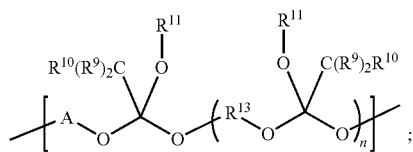

a repeat unit of the formula (Formula VII):

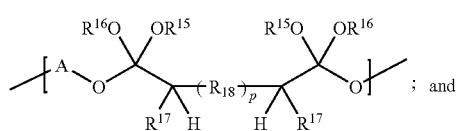

combinations thereof;
wherein:
  each $R^9$, $R^{10}$, and $R^{17}$ independently represents hydrogen or an organic group;
  each $R^{11}$, $R^{13}$, $R^{15}$, and $R^{16}$ independently represents an organic group;
  $R^{18}$ represents oxygen or an organic group and p=0 or 1; n=0 or 1;
  each $R^{11}$ can optionally be joined with $R^{13}$ to form one or more rings;
  geminal $R^{15}$ and $R^{16}$ groups can optionally be joined to each other to form rings; and
  each A independently represents a group of the formula (Formula III) —$Ar^2$—$C(R^8)_2$—$Ar^2$—$(B)_m$—, wherein each $Ar^2$ independently represents an arylene group, each $R^8$ independently represents a methyl group, B represents an aromatic-containing organic group having a linking oxygen attached to the aromatic ring, and m=0 or 1, wherein at least one A represents a structure of the formula:

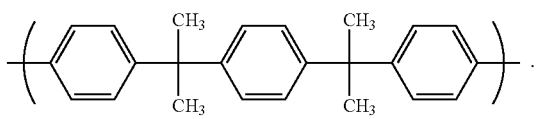

15. The polymer of claim 14 wherein the repeat unit of the formula (Formula VI) is represented by Formula VIa:

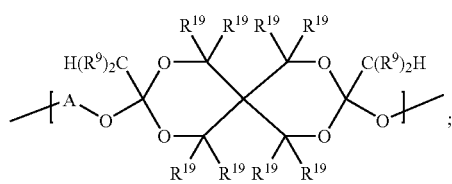

wherein:
  each $R^9$ and $R^{19}$ independently represents hydrogen or an organic group; and
  each A independently represents a group of the formula (Formula III) —$Ar^2$—$C(R^8)_2$—$Ar^2$—$(B)_m$—, wherein each $Ar^2$ independently represents an arylene group, each $R^8$ independently represents a methyl group, B represents an aromatic-containing organic group having a linking oxygen attached to the aromatic ring, and m=0 or 1, wherein at least one A represents a structure of the formula:

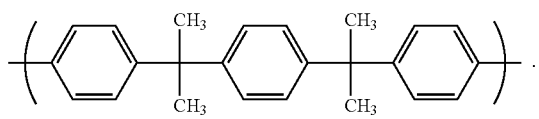

16. The polymer of claim 15 wherein each $R^{19}$ represents hydrogen and each $R^9$ independently represents hydrogen or methyl.

17. The polymer of claim 14 wherein the polymer further comprises repeat units selected from the group consisting of crosslinkable repeat units, crosslinked repeat units, repeat units having imagable groups, repeat units having latent reactive sites, and combinations thereof.

18. The polymer of claim 14 wherein the polymer further comprises repeat units selected from the group consisting of alpha-hydroxy alkanoates, beta-hydroxy alkanoates, gamma-hydroxy alkanoates, delta-hydroxy alkanoates, epsilon-hydroxy alkanoates, gylcols, carbonates, acetals, urethane-containing groups, carbamate-containing groups, and combinations thereof.

19. The polymer of claim 14 wherein the polymer is a copolymer.

20. The polymer of claim 19 wherein the copolymer is selected from the group consisting of random copolymers, alternating copolymers, block copolymers, graft copolymers, and combinations thereof.

21. The polymer of claim 20 wherein the copolymer is a block copolymer, and at least one block of the block copolymer is a poly(orthoester) block comprising the two or more repeat units selected from the group consisting of repeat units of Formula VI, repeat units of Formula VII, and combinations thereof.

22. The polymer of claim 21 wherein at least one other block of the block copolymer is a block comprising repeat units selected from the group consisting of alpha-hydroxy alkanoates, beta-hydroxy alkanoates, gamma-hydroxy alkanoates, delta-hydroxy alkanoates, epsilon-hydroxy alkanoates, carbonates, acetals, urethane-containing groups, carbamate-containing groups, and combinations thereof.

23. The polymer of claim 18 wherein at least one other block of the block copolymer is a polyketal block.

24. The polymer of claim 21 wherein at least one other block of the block copolymer is a poly(alkyleneglycol) block comprising alkylene glycol repeat units.

25. The polymer of claim 14 wherein the polymer is biodegradable.

26. The polymer of claim 14 wherein the polymer is a tissue bulking agent, a tissue replacement agent, a tissue repair agent, a surgical void filler, an agent used to prevent surgical adhesions, or a combination thereof.

* * * * *

UNITED STATES PATENT AND TRADEMARK OFFICE
CERTIFICATE OF CORRECTION

PATENT NO. : 7,875,697 B2  
APPLICATION NO. : 11/824504  
DATED : January 25, 2011  
INVENTOR(S) : Randall V. Sparer, Julie Ann Alkatout and Michael Eric Benz Page 1 of 1

It is certified that error appears in the above-identified patent and that said Letters Patent is hereby corrected as shown below:

Pat. col. 48/Line 33, Appl pg 6/Line 17
Amendment date 6/29/07; Amend claim 7 (112); "...claim 2 wherein..." Should be "...claim 6 wherein..."

Signed and Sealed this
Twentieth Day of March, 2012

David J. Kappos
*Director of the United States Patent and Trademark Office*